United States Patent
Fujiwara et al.

(10) Patent No.: US 12,148,113 B2
(45) Date of Patent: Nov. 19, 2024

(54) INFORMATION PROCESSING SYSTEM AND NON-TRANSITORY COMPUTER READABLE MEDIUM

(71) Applicant: FUJIFILM Business Innovation Corp., Tokyo (JP)

(72) Inventors: Momoko Fujiwara, Kanagawa (JP); Takahiro Okayasu, Kanagawa (JP); Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 238 days.

(21) Appl. No.: 17/644,380

(22) Filed: Dec. 15, 2021

(65) Prior Publication Data
US 2023/0021861 A1  Jan. 26, 2023

(30) Foreign Application Priority Data
Jul. 26, 2021  (JP) .................. 2021-121977

(51) Int. Cl.
G06T 19/20 (2011.01)
G02B 27/01 (2006.01)
G06F 3/01 (2006.01)

(52) U.S. Cl.
CPC ............ *G06T 19/20* (2013.01); *G02B 27/017* (2013.01); *G06F 3/013* (2013.01); *G06F 3/017* (2013.01); *G02B 2027/0178* (2013.01); *G06T 2219/2004* (2013.01)

(58) Field of Classification Search
CPC ...... G06F 3/04815; G06F 3/011; G06F 3/012; G06F 3/013; G06F 3/014; G06F 3/015; G06F 3/017; G06F 3/04817; G06F 3/04842; G06F 3/0482; G02B 27/017; G02B 27/0172; G02B 2027/014; G02B 2027/0178; G02B 2027/0187; G06T 19/20; G06T 2219/2004
See application file for complete search history.

(56) References Cited

U.S. PATENT DOCUMENTS

| | | | |
|---|---|---|---|
| 10,665,027 B2 * | 5/2020 | Leppänen | G06F 3/012 |
| 11,115,747 B2 | 9/2021 | Baba et al. | |
| 11,500,510 B2 * | 11/2022 | Tokuchi | G06F 3/011 |
| 2016/0350973 A1 * | 12/2016 | Shapira | G06F 3/011 |
| 2018/0046874 A1 * | 2/2018 | Guo | G06V 10/507 |
| 2020/0042105 A1 * | 2/2020 | Tanaka | G06F 3/017 |
| 2021/0368257 A1 | 11/2021 | Baba et al. | |
| 2022/0244849 A1 * | 8/2022 | Shoda | G06F 3/0304 |

FOREIGN PATENT DOCUMENTS

| | | |
|---|---|---|
| JP | 2018-075254 A | 5/2018 |
| JP | 2019-46366 A | 3/2019 |
| JP | 2021-90136 A | 6/2021 |

* cited by examiner

Primary Examiner — Vijay Shankar
(74) Attorney, Agent, or Firm — Sughrue Mion, PLLC

(57) ABSTRACT

An information processing system includes a device causing a user to see visual information in which a virtual object is superimposed onto information about a real space, an acquirer that acquires a position of a real object existing in the real space, and a processor configured to move the virtual object in a direction away from the real object in a case where the real object is positioned inside a predetermined range from the device.

41 Claims, 61 Drawing Sheets

(A) CASE WHERE FINGERTIP IS FAR FROM VIRTUAL DISPLAY (B) CASE WHERE FINGERTIP APPROACHES VIRTUAL DISPLAY (C) CASE WHERE FINGERTIP TOUCHES VIRTUAL DISPLAY (A)

CORRECT RANGE BASED ON MEASUREMENT HISTORY (B)

INFORMATION PROCESSING SYSTEM AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-121977 filed Jul. 26, 2021.

BACKGROUND

(i) Technical Field

The present disclosure relates to an information processing system and a non-transitory computer readable medium.

(ii) Related Art

Devices referred to as augmented reality (AR) glasses and mixed reality (MR) glasses exist, which cause a user to see visual information in which a virtual object is superimposed onto information about a real space. Hereinafter, such devices are collectively referred to as "xR devices". Currently, xR devices capable of displaying virtual objects brightly and at a high resolution also exist. As the display of virtual objects increases in brightness and resolution, the level of immersion is also increased for the user wearing the xR device. For example, see Japanese Unexamined Patent Application Publication No. 2019-046366.

SUMMARY

As the level of immersion increases, collisions with surrounding objects become a concern. For example, in the case of touching or tapping a virtual object, the user may collide with and knock over an unseen drink that exists in the real space. Also, nearby persons do not know the position where a virtual object is being displayed, and consequently the user may collide with a person passing by behind the virtual object. Note that although it is possible to provide a time for avoiding collisions with surrounding objects by stopping the display of a virtual object at times when there is a possibility of colliding a surrounding object, manipulation of the virtual object is interrupted.

Aspects of non-limiting embodiments of the present disclosure relate to avoiding collisions with surrounding objects without stopping the display of a virtual object.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing system including a device causing a user to see visual information in which a virtual object is superimposed onto information about a real space, an acquirer that acquires a position of a real object existing in the real space, and a processor configured to move the virtual object in a direction away from the real object in a case where the real object is positioned inside a predetermined range from the device.

BRIEF DESCRIPTION OF THE DRAWINGS

Exemplary embodiments of the present disclosure will be described in detail based on the following figures, wherein:

FIGS. 6A and 6B are diagrams for explaining an example of setting a first range used for a gesture operation and an example of setting a first distance to be secured between a real object positioned within the first range and the virtual display, in which FIG. 6A is a view of the user from above and FIG. 6B is a view of the user from the side;

FIGS. 7A and 7B are diagrams for explaining another example of setting the first range used for a gesture operation, in which FIG. 7A illustrates an example of setting the first range in a state where the user is lying face-up, and FIG. 7B illustrates an example of setting the first range in a state where the user is lying sideways;

FIGS. 8A and 8B are diagrams for explaining an example of setting a second range not used for a gesture operation, in which FIG. 8A is a view of the user from above and FIG. 8B is a view of the user from the side;

FIGS. 11A and 11B are diagrams for explaining the setting of the first range with a gesture, in which FIG. 11A is a view illustrating the setting of the first range from behind the user and FIG. 11B is a view illustrating the setting of the first range from the side of the user;

FIGS. 12A to 12D are diagrams for explaining an example of setting the first range, in which FIG. 12A is a basic example of the first range, FIG. 12B is an example of setting a wider range for the dominant hand compared to the non-dominant hand, FIG. 12C is an example of widening the first range by a margin, and FIG. 12D is an example of narrowing the range on the side opposite from the dominant hand;

FIGS. 27A and 27B are diagrams for explaining an example of retreating in the case where a person is approaching the user, in which FIG. 27A illustrates a state in which the person is moving toward the user from outside the first range, and FIG. 27B illustrates a state in which the person has entered the first range;

FIGS. 28A and 28B are diagrams for explaining an example of retreating in the case where two users are seeing respective virtual displays, in which FIG. 28A illustrates a state in which the first range of one user partially overlaps with the first range of the other user but each other's gesture operations are not recognized as movable objects, and FIG. 28B illustrates a case in which a gesture operation by one user is recognized as a movable object within the first range of the user;

FIGS. 29A and 29B are diagrams for explaining an example of retreating in the case where a movement schedule of a mobile robot is acquirable, in which FIG. 29A illustrates a state in which the robot exists outside the first range and FIG. 29B illustrates a state in which the robot has approached the first range;

FIGS. 30A and 30B are diagrams for explaining an exception to retreating, in which FIG. 30A illustrates the display position of the virtual display in the case where a window curtain is hanging down and FIG. 30B illustrates the display position of the virtual display in the case where the window curtain is blown by wind and spreads out near the virtual display;

FIGS. 39A and 39B are diagrams for explaining a case where a single virtual display is shared by multiple persons, in which FIG. 39A illustrates a state before two users perform gesture operations and FIG. 39B illustrates a state after the two users start performing gesture operations;

FIGS. 40A and 40B are diagrams for explaining an example of a method of notifying a user seeing a virtual display about the existence of a real object, in which FIG. 40A illustrates an example of notification through sound and FIG. 40B illustrates an example of notification through a combined image;

FIGS. 49A to 49C are diagrams for explaining a case where a virtual display that a user is seeing is linked to a display screen on a real monitor, in which FIG. 49A illustrates the virtual display and the display screen of the monitor before linking, FIG. 49B illustrates the virtual display and the display screen of the monitor after linking, and FIG. 49C illustrates a state in which the virtual display is made to retreat such that the virtual display and the monitor are arranged side by side;

FIGS. 52A and 52B are diagrams for explaining an example of the appearance of an xR device used in Exemplary Embodiment 13, in which FIG. 52A illustrates an example of the appearance of the xR device as viewed from the front and FIG. 52B illustrates an example of the appearance of the xR device as viewed from the user's perspective;

FIGS. 55A to 55C are diagrams for explaining an example of the appearance of an xR device used in Exemplary Embodiment 14, in which FIG. 55A illustrates an example of the appearance of the xR device as viewed from the front, FIG. 55B illustrates an example of the configuration of an earphone tip attached to a temple, and FIG. 55C illustrates an example of the configuration of an earphone tip attached to a temple;

FIGS. 60A and 60B are diagrams for explaining a usage example of an information processing system anticipated by Exemplary Embodiment 15, in which FIG. 60A illustrates an example of the appearance of the information system and FIG. 60B is a diagram for explaining a worn state; and FIGS. 61A and 61B are diagrams for explaining a usage example of an information processing system anticipated by Exemplary Embodiment 16, in which FIG. 61A illustrates an example of wearing a headset and FIG. 61B illustrates an example of the arrangement of electrodes disposed on the inner side of the headset for measuring an electrical signal corresponding to a brain wave.

DETAILED DESCRIPTION

Hereinafter, exemplary embodiments of the present disclosure will be described with reference to the drawings.

Exemplary Embodiment 1

<Overall Configuration of System>

Figure 1:
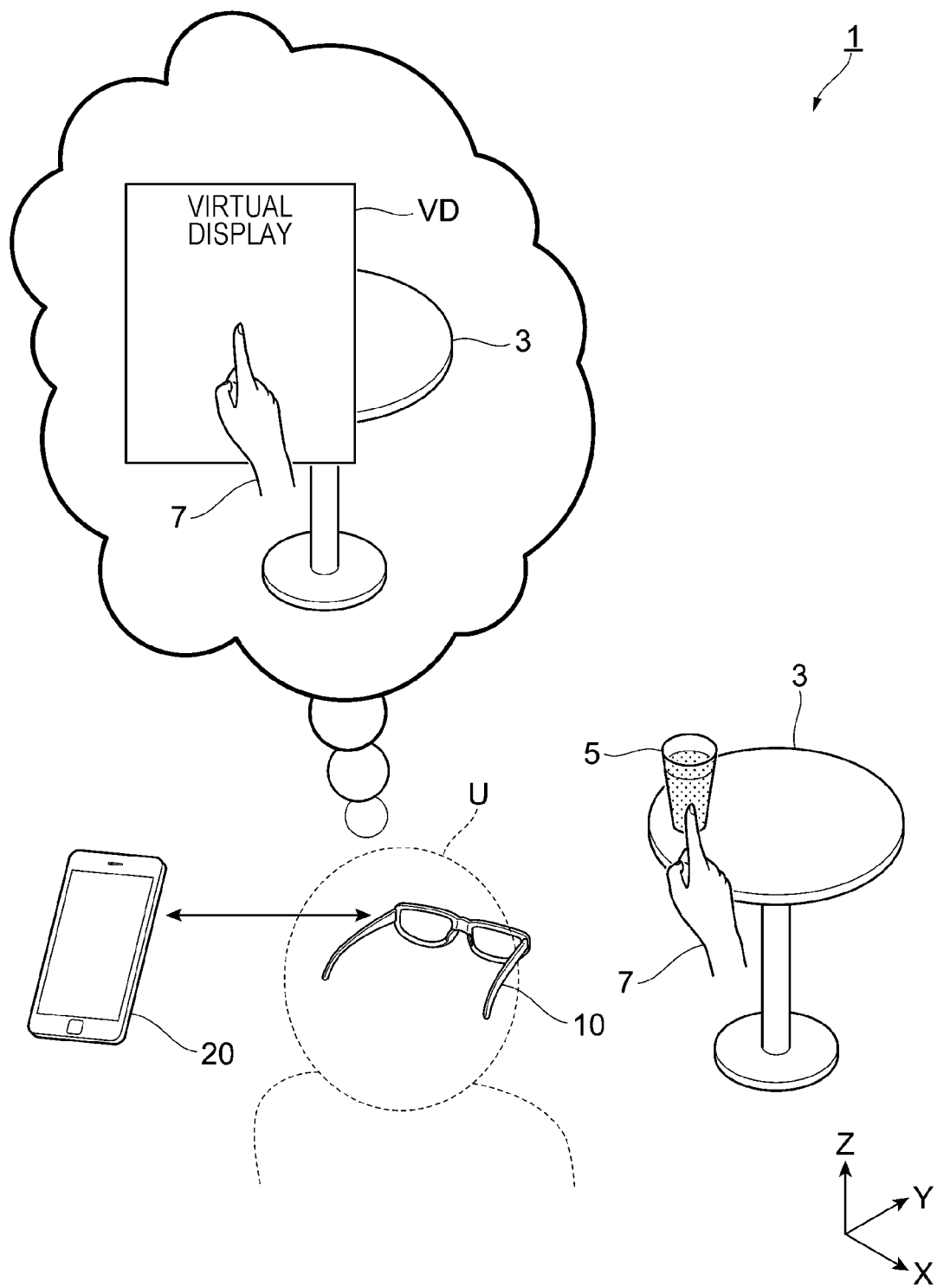
FIG. 1 is a diagram explaining a conceptual configuration of a usage example of an information processing system anticipated by Exemplary Embodiment 1.

FIG. 1 is a diagram explaining a conceptual configuration of a usage example of an information processing system 1 anticipated by Exemplary Embodiment 1. The information processing system 1 illustrated in FIG. 1 includes an xR device 10 and an information terminal 20 connected to one another. Here, "connected" refers to a communicable state. The xR device 10 illustrated in FIG. 1 is a glasses-style device worn on the head of a user U.

The xR device 10 has a mode of displaying a virtual object and a mode of not displaying a virtual object. In the case where the mode of not displaying a virtual object is active, the xR device 10 functions in the same way as a pair of glasses. In the case of FIG. 1, the mode of displaying a virtual object is active. Consequently, the user U sees a virtual display VD as a virtual object in front of a table 3. In FIG. 1, the state of the space seen by the user U wearing the xR device 10 is illustrated with a callout balloon.

Note that a drink 5 is placed on the real table 3, but is hidden behind the virtual display VD and unseen by the user U. FIG. 1 illustrates a situation in which the user U taps the virtual display VD with his or her right hand 7. As described above, a modern xR device 10 is capable of displaying the virtual display VD brightly and at a high resolution. For this reason, there is a possibility that the user will tap the virtual display VD without being aware of the drink 5 on the table 3, and in such cases, there is a possibility that the drink 5 will be knocked over.

FIG. 1 illustrates the positional relationship between the right hand 7 and the drink 5 in the real space and the positional relationship between the right hand 7 and the virtual display VD inside the space seen by the user U. In the case of FIG. 1, the virtual display VD is a two-dimensional image, but may also be a three-dimensional image. Also, in the case of FIG. 1, there is one virtual display VD, but there may also be multiple virtual displays VD. Moreover, the virtual display VD may be a still image or a moving image. The virtual display VD is one example of a virtual object.

The information terminal 20 used in the present exemplary embodiment links with the xR device 10 to provide a function of avoiding collisions with nearby objects during a gesture operation performed on the virtual display VD (hereinafter referred to as a "collision avoidance function"). FIG. 1 illustrates a smartphone as one example of the information terminal 20. However, the information terminal 20 is not limited to a smartphone and may also be a laptop computer, a desktop computer, a tablet computer, or a server on a network. In addition, the information terminal 20 may also be a wearable terminal such as a smartwatch. In the case of FIG. 1, a single xR device 10 is connected to the information terminal 20, but multiple xR devices 10 may also be connected. Furthermore, a single xR device 10 may be connected to multiple information terminals 20.

The xR device 10 and the information terminal 20 according to the present exemplary embodiment are one example of an information processing system. In the present exemplary embodiment, an operation performed by the user U with respect to the virtual display VD is referred to as a "gesture operation". This is because motions in the real space by the user U operating the virtual display VD are recognized as gestures performed with the body and hands or the like. In the present exemplary embodiment, "gesture operation" is used to mean a gesture performed to manipulate the virtual display VD.

<Device Configuration of Each Terminal>
<Configuration of xR Device>

Figure 2:
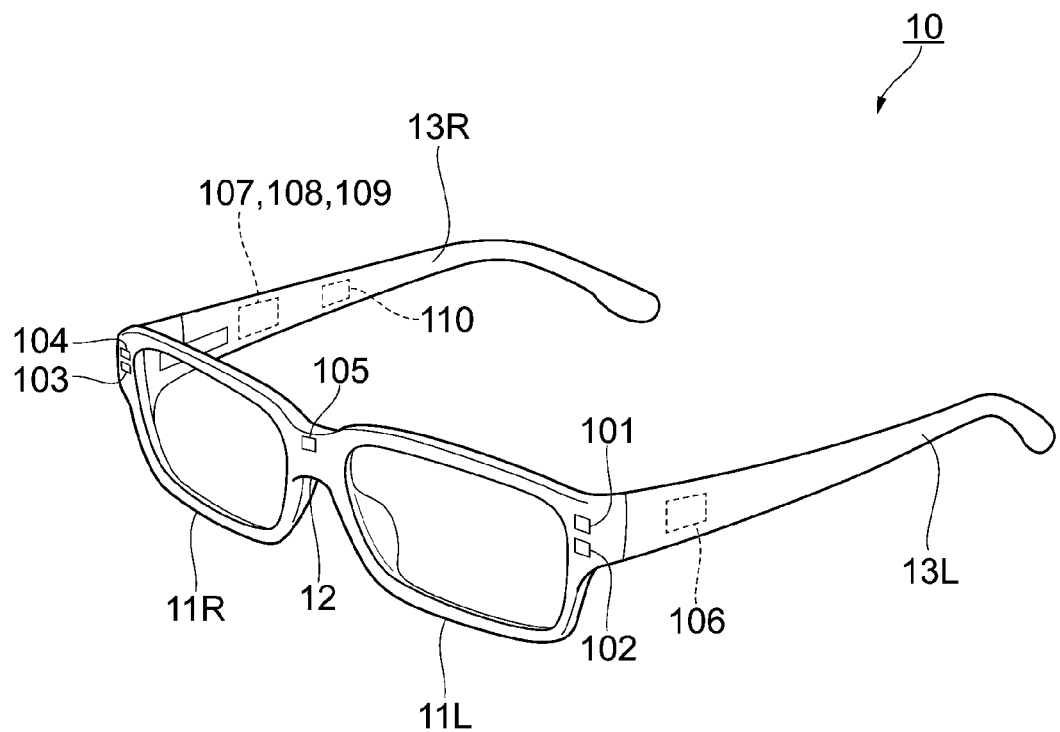
FIG. 2 is a diagram for explaining an example of the appearance of an xR device as viewed from the front.

FIG. 2 is a diagram for explaining an example of the appearance of the xR device 10 as viewed from the front. A glasses frame includes left and right rims 11L and 11R into which lenses are fitted, and a bridge 12. Temples 13L and 13R are attached on either side of the glasses frame through hinges.

In the case of FIG. 2, a microphone 101 and a speaker 102 are attached near the hinge of the left rim 11L. On the other hand, an inertial sensor 103 and a positioning sensor 104 are attached near the hinge of the right rim 11R. Additionally, a camera 105 is attached to the bridge 12. Also, an xR module 106 is attached to the left temple 13L, and a control unit, which includes a processor 107, random access memory (RAM) 108, and flash memory 109, and a communication module 110 are attached to the right temple 13R.

Figure 3:
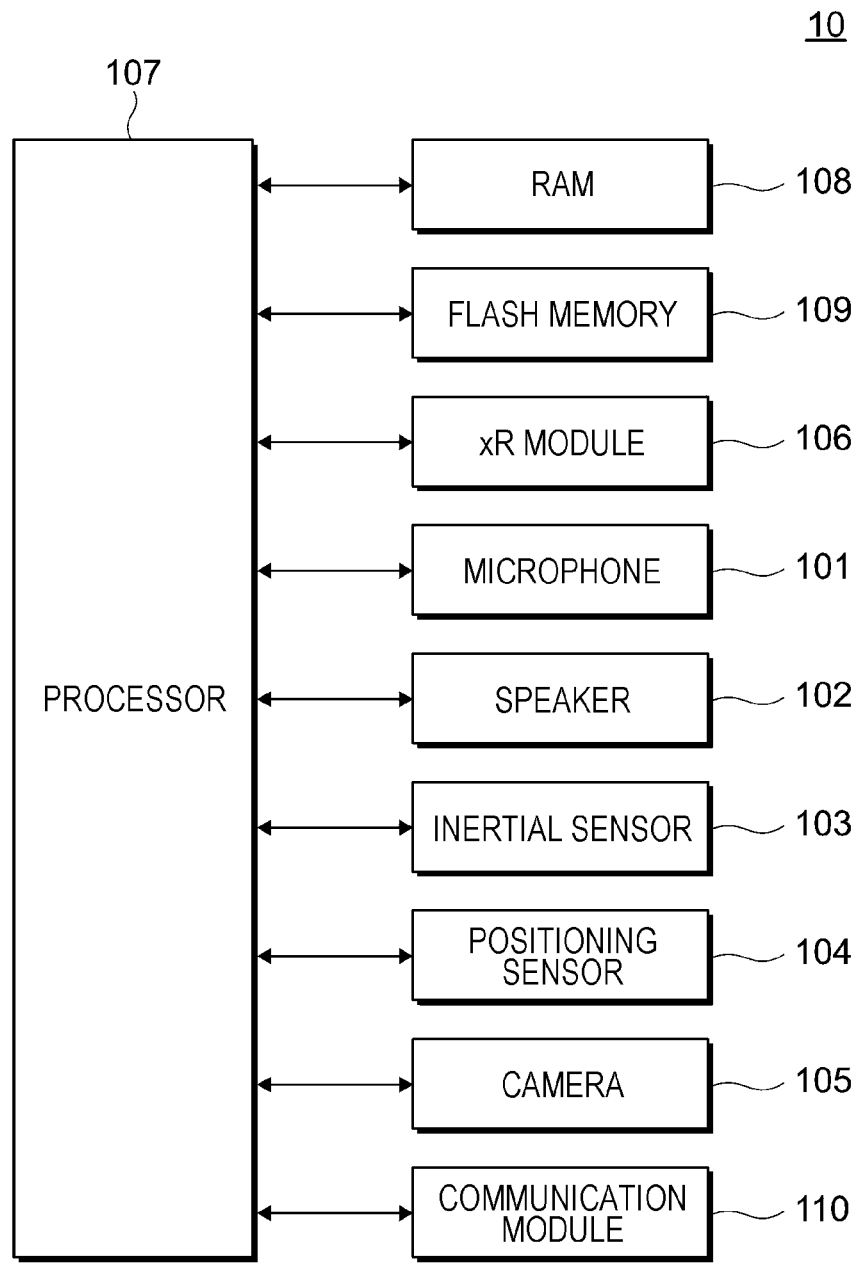
FIG. 3 is a diagram for explaining an example of a hardware configuration of an xR device.

FIG. 3 is a diagram for explaining an example of a hardware configuration of the xR device 10. The xR device 10 illustrated in FIG. 3, the microphone 101, the speaker 102, the inertial sensor 103, the positioning sensor 104, the camera 105, the xR module 106, the RAM 108, the flash memory 109, and the communication module 110 are connected to the processor 107 that forms the control unit. The microphone 101 is a device that converts speech by the user U and ambient sounds into an electrical signal.

The speaker 102 is a device that converts an electrical signal into sound for output. Note that the speaker 102 may also be a bone conduction speaker or a cartilage conduction speaker. Note that the speaker 102 may also be a device independent from the xR device 10, such as a wireless earphone. The inertial sensor 103 includes a 6-axis sensor, for example. A 6-axis sensor includes acceleration sensors on three axes and angular velocity sensors on three axes. From the output of the inertial sensor 103, the motion of the head of the user U wearing the xR device 10 is estimated.

The positioning sensor 104 is a light detection and ranging (LiDAR) module, for example. The LiDAR module emits pulsed laser light and computes the distance to a real object according to the time until reflected light from the real object is detected. The positioning sensor 104 according to the present exemplary embodiment treats the area around the user U, including the area in front of the xR device 10, as the target of positioning. From positioning data acquired by the positioning sensor 104, a three-dimensional map of the surroundings of the user U is created.

The xR device 10 according to the present exemplary embodiment is capable of measuring a range through which an implement that the user U uses to perform a gesture operation moves (that is, a "range of motion"). The implement is at least a body part of the user U, but may also be stationery such as a writing implement or a pointer, or an aid such as a cane, a prosthetic hand, or a prosthetic leg.

However, multiple positioning sensors 104 may also be disposed to measure the distances to objects existing not only in front of the user U, but also to the sides and behind the user U, for example. In the case of the present exemplary embodiment, the positioning sensor 104 is attached to the xR device 10, but may also be attached to a necklace, a pendant, a brooch, a hat, a hair ornament, or an article of clothing. The positioning sensor 104 herein is one example of an acquirer that acquires the position of a real object existing in a real space.

The camera 105 uses a complementary metal-oxide-semiconductor (CMOS) image sensor or a charge-coupled device (CCD) image sensor, for example. By processing image data acquired by the camera 105, it is possible to specify the content of a real object positioned near the user U. In the case of FIG. 2, a single camera 105 is attached to the glasses frame, but two or more cameras 105 may also be attached.

If two cameras 105 are used to acquire a stereo image of the surroundings of the user U, it is possible to estimate the distances to subjects and depth relationships between subjects. The two cameras 105 in this case are one example of an acquirer. Also, in the case of using two cameras 105 to measure distance, a configuration not provided with the positioning sensor 104 is also possible. Note that a configuration in which the camera 105 is not attached to the xR device 10 is also possible. The xR device 10 with the above configuration is also referred to as smart glasses.

The xR module 106 is a collection of functions causing the user U to see an xR image that does not exist in the real space, and includes optical components and electronic components. Representative examples of the xR module 106 include a method of disposing a half-mirror in front of the eyes of the user U, a method of disposing a volume hologram in front of the eyes of the user U, and a method of disposing a blazed diffraction grating in front of the eyes of the user U. In a narrow sense, the xR module 106 herein refers to the portion of the device causing the user to see visual information in which a virtual object is superimposed onto information about a real space. Note that in a broad sense, the xR module 106 refers to a mechanism causing the user to see visual information in which a virtual object is superimposed onto information about a real space.

The processor 107 includes a central processing unit (CPU) or a microprocessing unit (MPU), for example. The processor 107 achieves various functions by executing a program. The random access memory (RAM) 108 and the flash memory 109 are both semiconductor memories. The RAM 108 is a main memory device used to execute a program. The flash memory 109 is a non-volatile auxiliary memory device used to store data such as a basic input/output system (BIOS) and firmware. In the case of the present exemplary embodiment, the control unit is configured by the processor 107, the RAM 108, and the flash memory 109, but the control unit may also be configured by hardware such as an application-specific integrated circuit (ASIC) or a field-programmable gate array (FPGA).

The communication module 110 is a device that achieves communication with the information terminal 20. In the case of the present exemplary embodiment, the communication module 110 uses Wi-Fi (registered trademark) and Bluetooth (registered trademark), for example. In the case of the present exemplary embodiment, computationally intensive processes are executed by the information terminal 20 rather than the processor 107. Note that besides the device described using FIGS. 2 and 3, components such as a vibrator and an illuminance sensor may also be provided, for example. A vibrator that products continuous or intermittent vibration can be used to issue notifications such as an alarm to the user U. An illuminance sensor can be disposed on the inner side of the glasses frame or the temples 13L and 13R, and thereby used to detect whether the xR device 10 is being worn or removed.

Figure 4:
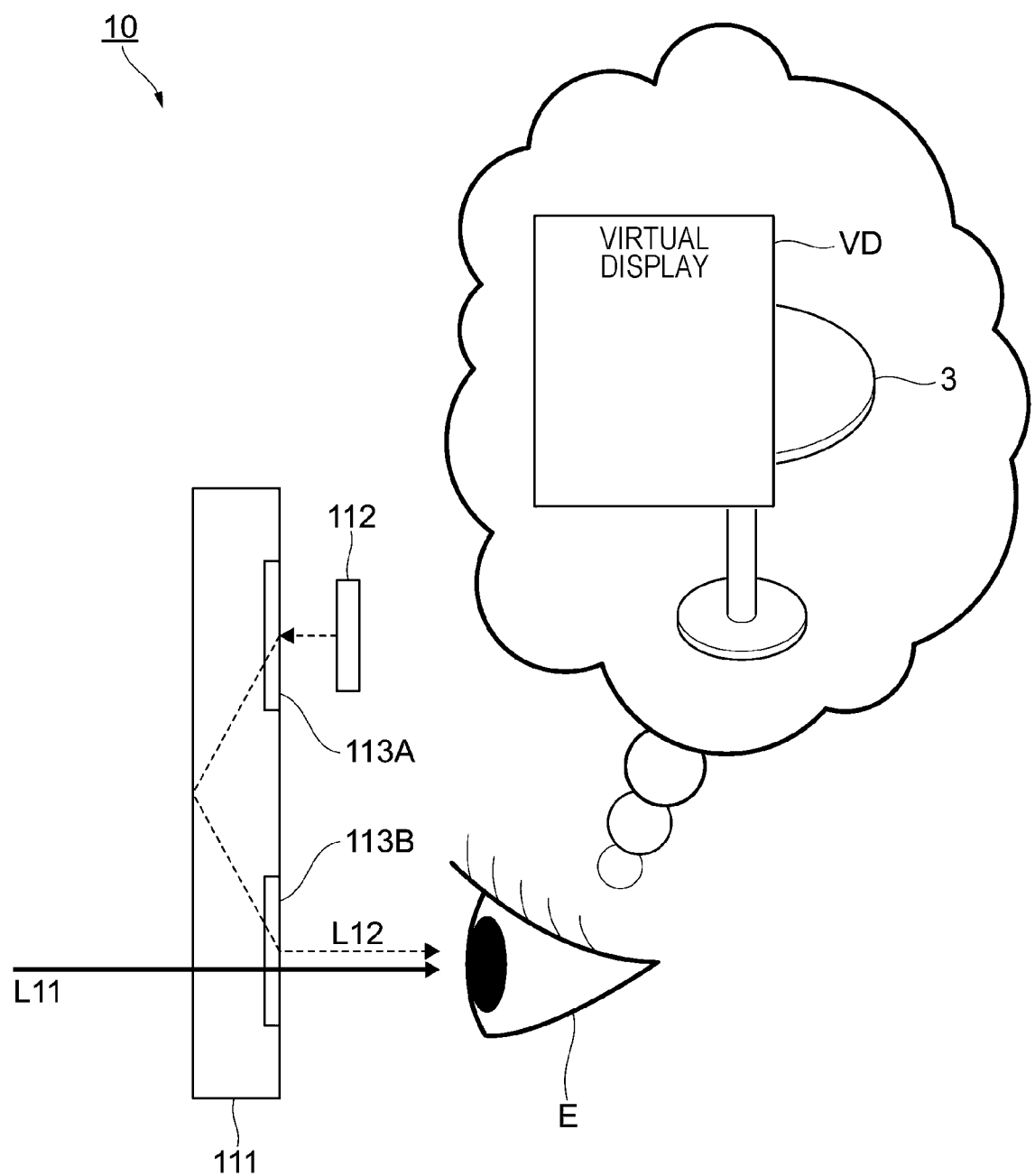
FIG. 4 is a diagram for explaining the principle by which a virtual display is seen by a user.

FIG. 4 is a diagram for explaining the principle by which the virtual display VD is seen by the user U. The xR device 10 illustrated in FIG. 4 corresponds to a method of disposing a blazed diffraction grating in front of the eyes of the user U. The xR device 10 illustrated in FIG. 4 includes a light guide plate 111 corresponding to the lenses of the glasses, a microdisplay 112, a diffraction grating 113A into which image light L12 is inputted, and a diffraction grating 113B from which the image light L12 is outputted. The light guide plate 111 has a transmittance of 85% or higher, for example. Consequently, the user U is able to look through the light guide plate 111 and directly see the scene in front. Outside light L11 is transmitted straight through the light guide plate 111 and the diffraction grating 113B, and enters the eye E of the user U.

The microdisplay 112 is a tiny display on which the virtual display VD to be seen by the user U is displayed. Light from the image displayed on the microdisplay 112 is projected onto the light guide plate 111 as the image light L12. The image light L12 is refracted by the diffraction grating 113A and reaches the diffraction grating 113B while being reflected inside the light guide plate 111. The diffraction grating 113B refracts the image light L12 in the direction of the eye E of the user U. With this arrangement, the outside light L11 and the image light L12 enter the eye E of the user U at the same time. As a result, the user U sees an image in which the virtual display VD appears to exist in front of the table 3, as illustrated in the callout balloon in FIG. 4.

<Configuration Information Terminal>

Figure 5:
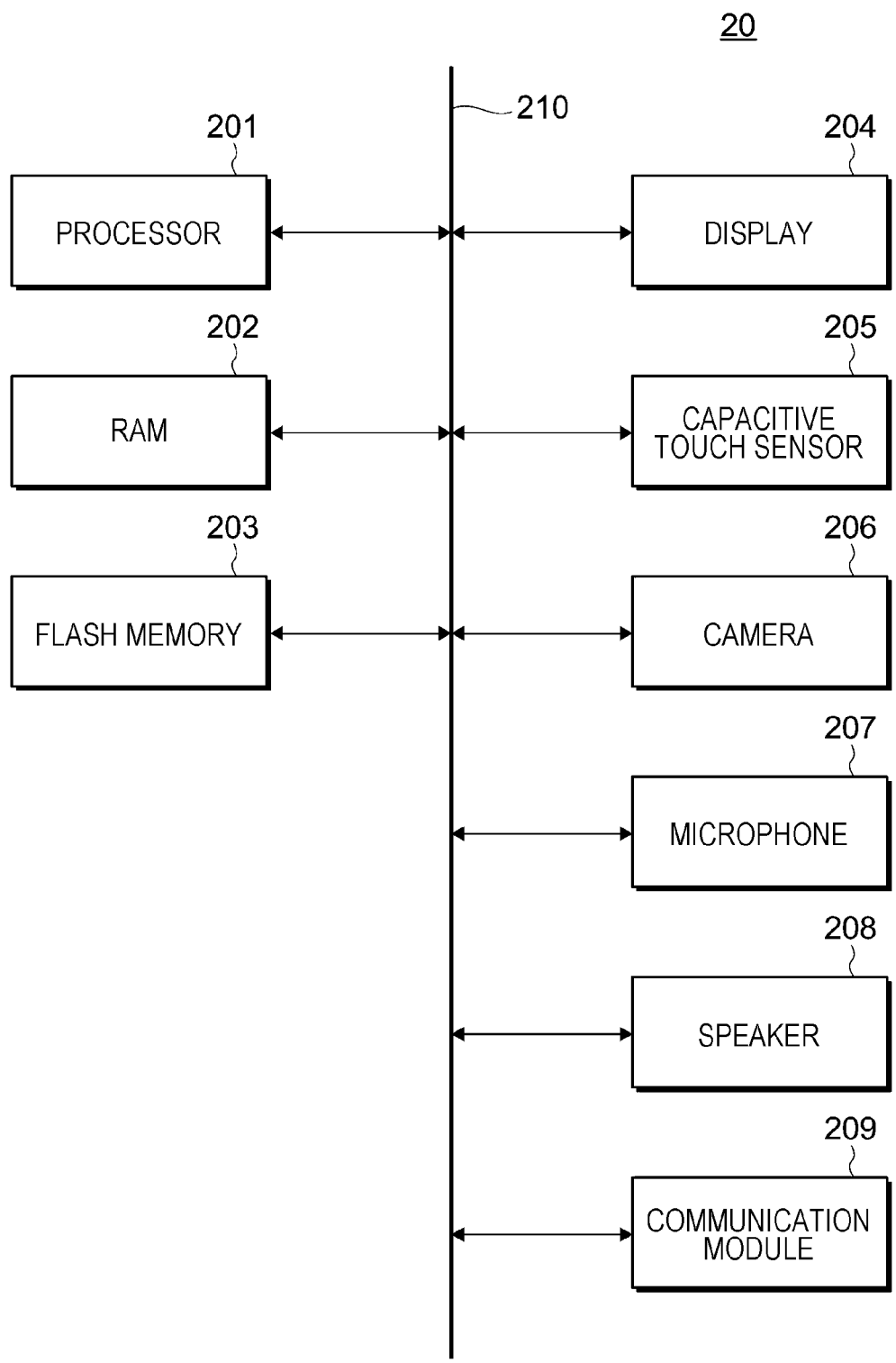
FIG. 5 is a diagram for explaining an example of a hardware configuration of an information terminal.

FIG. 5 is a diagram for explaining an example of a hardware configuration of the information terminal 20. The information terminal 20 illustrated in FIG. 5 includes a processor 201 that forms a control device, RAM 202, flash memory 203, a display 204, a capacitive touch sensor 205, a camera 206, a microphone 207, a speaker 208, a communication module 209, and a signal line 210 connecting the above components.

The processor 201 includes a CPU or MPU, for example. The processor 201 achieves various functions by executing a program. The RAM 202 and the flash memory 203 are both semiconductor memories. The RAM 202 is used as a main memory device used to execute a program. The flash memory 203 is a non-volatile auxiliary memory device used to store data such as a BIOS and firmware. By executing a program, the processor 201 according to the present exemplary embodiment provides a function of avoiding collisions between a nearby real object RO and the user U during a gesture operation performed with respect to the virtual display VD.

For the display 204, an organic light-emitting diode (OLED) display or a liquid crystal display (LCD) is used, for example. The capacitive touch sensor 205 is a thin film sensor applied to the surface of the display 204. The capacitive touch sensor 205 has a translucency that does not obstruct the visibility of the display 204, and detects a position touched by a fingertip or the like of the user U as a change in electrostatic capacitance. An integrated device including the display 204 and the capacitive touch sensor 205 is called a touch panel.

The camera 206 is attached to the main body of the information terminal 20. If the information terminal 20 is a smartphone, multiple cameras 206 are provided on the same face as the display 204 and also on the opposite face. A CMOS image sensor or a CCD image sensor is used for the camera 206, for example. The microphone 207 is a device that converts sound into an electrical signal. The speaker 208 is a device that converts an electrical signal into sound. The communication module 209 supports Wi-Fi (registered trademark) and Bluetooth (registered trademark), for example, and is used to communicate with the xR device 10.

<Basic Parameters>

Figure 6A:
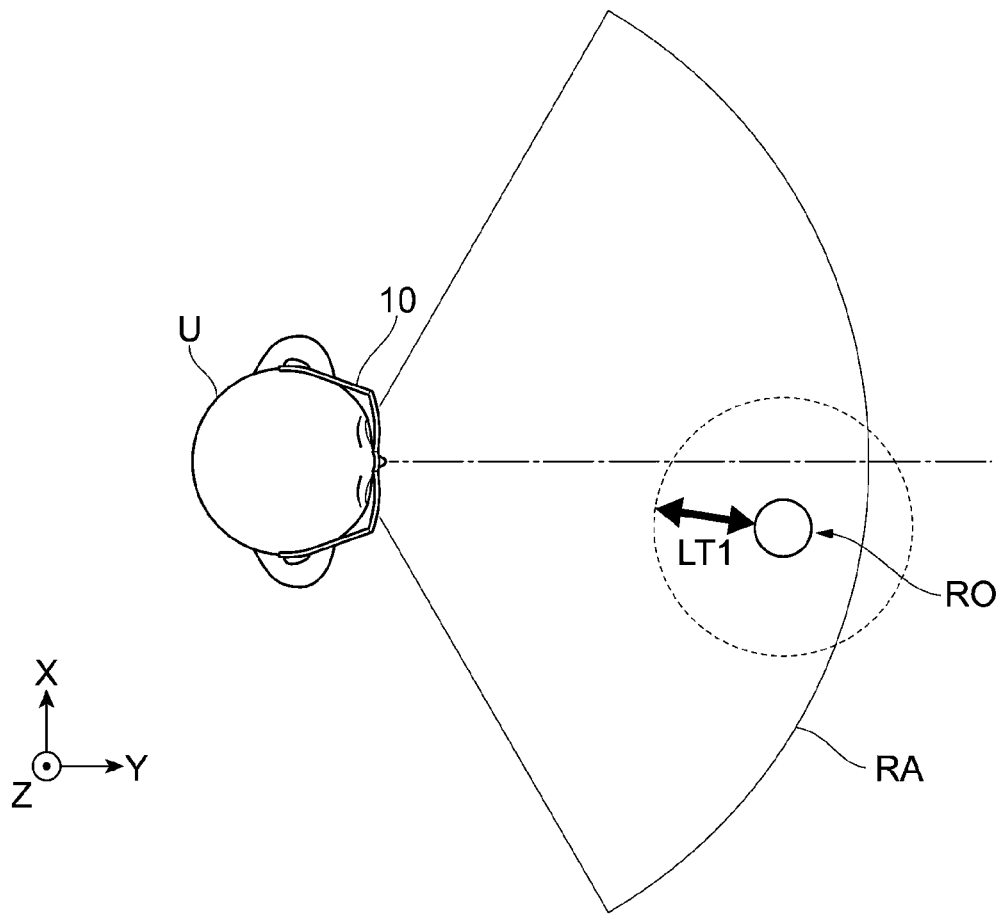
Figure 6B:
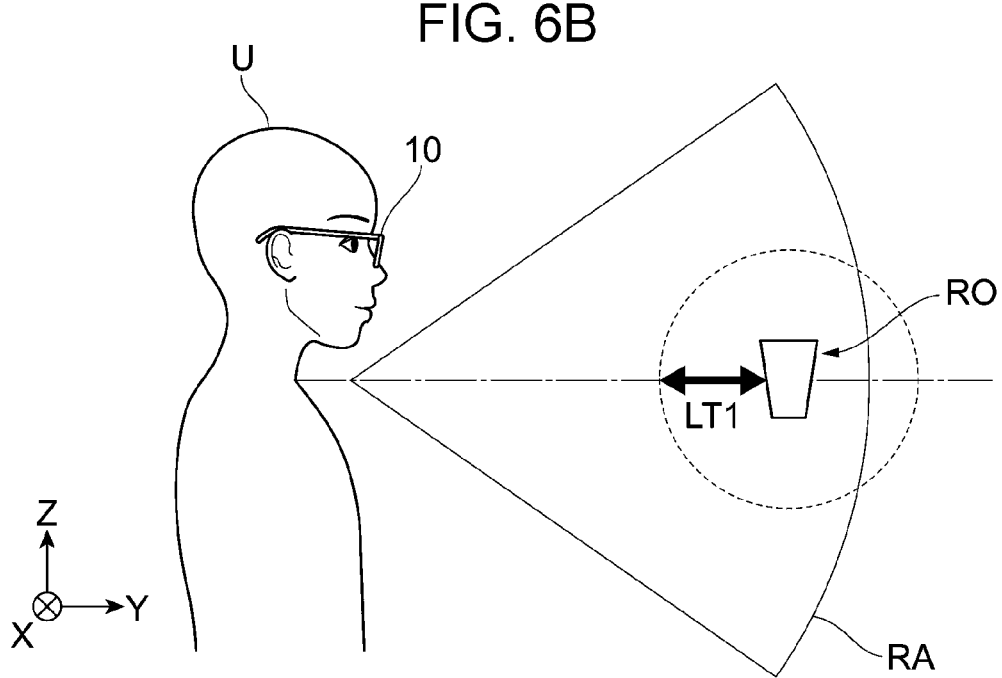

Hereinafter, FIGS. 6A to 12D will be used to describe basic parameters from which a preset is obtained to achieve a function of avoiding collisions or reducing the possibility of collisions between the user U and a nearby object when performing a gesture operation on the virtual display VD (see FIG. 1). FIGS. 6A and 6B are diagrams for explaining an example of setting a first range RA used for a gesture operation and an example of setting a first distance LT1 to be secured between a real object RO positioned within the first range RA and the virtual display VD (see FIG. 1), in which FIG. 6A is a view of the user U from above and FIG. 6B is a view of the user U from the side.

The first range RA used for a gesture operation gives a range used for a gesture operation performed by the user U on the virtual display VD. Specifically, the first range RA gives the maximum range of a positioning range of an implement that the user U uses to perform a gesture operation, the implement being a body part of the user U, stationery such as a writing implement or a pointer, or an aid such as a cane, a prosthetic hand, or a prosthetic leg. However, the first range RA in the present exemplary embodiment is a range of convenience used to determine whether or not to execute a retreat of the virtual display VD by a function that causes the virtual display VD to retreat from the real object RO. Consequently, the set first range RA does not necessarily match the maximum range of motion of the body part or other implement that the user U uses to perform a gesture operation.

However, in the case where the user U uses his or her hand to perform a gesture operation, the first range Ra may be set within arm's reach of the user U. This is because even if the real object RO exists out of reach of the user U, the possibility that a hand of the user U will collide with the real object RO does not exist, barring exceptional circumstances. However, some users U move their body forward or the like when performing a gesture operation. In such cases, it is meaningful to extend the first range RA prescribed in a still state.

In the case of FIG. 6A, the first range RA is defined as a fan shape symmetrical with respect to the Y axis, which is the forward direction of the user U wearing the xR device 10. By the way, it is assumed that the user U in FIG. 6A is standing in the real space. Consequently, the arrow of the Z axis illustrated in the diagram represents the vertically upward direction. Also, the arrow of the Y axis represents the forward direction of the user U, and the arrow of the X axis represents the direction to the left of the user U. The actual range RA is determined as a solid shape. In FIG. 6B, the upper boundary of the range RA is set near eye height and the lower boundary is set near hip height, in anticipation of the range of motion of the hand. The first range RA here is one example of a predetermined range from the xR device 10.

In FIGS. 6A and 6B, a first distance LT1 is also prescribed. The first distance LT1 here gives a minimum distance to be secured between the real object RO and the virtual display VD. The first distance LT1 is given as a generally spherical shape centered on the real object RO. However, the surface shape of the real object RO that is ascertainable by the positioning sensor 104 (see FIG. 3) is only the surface on the side toward the positioning sensor 104, and the overall shape of the real object RO is indeterminate. Consequently, the position on the back side of the real object RO illustrated as an example in FIGS. 6A and 6B is given on the basis of the front side of the real object RO that is measurable by the positioning sensor 104. In a simple system, it is also possible to have a setting that does not manage the first distance LT1 on the back side of the real object RO from the perspective of the user U.

By the way, the first distance LT1 is a rough estimate of a distance for keeping the user U from colliding with the real object RO during a gesture operation. Consequently, the first distance LT1 does not guarantee collision avoidance between a body part or the like of the user U and the real object RO during a gesture operation. The first distance LT1 may be given as an initial value for example or may be set and adjusted individually by the user U, for example.

Figure 7A:
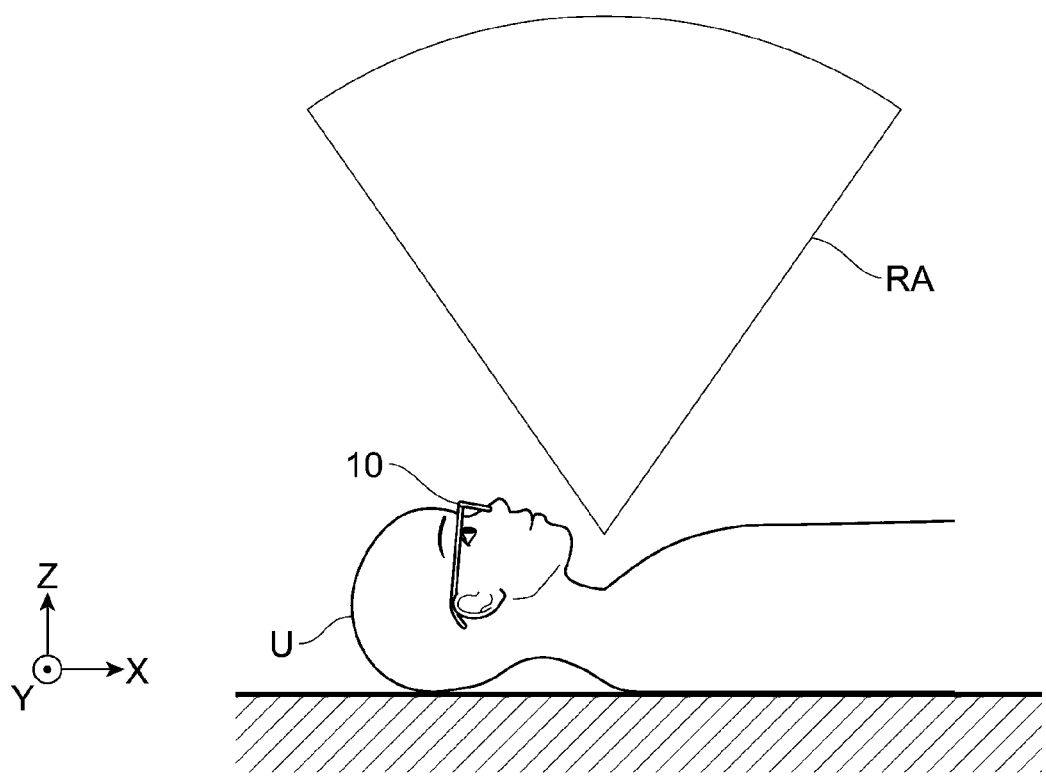
Figure 7B:
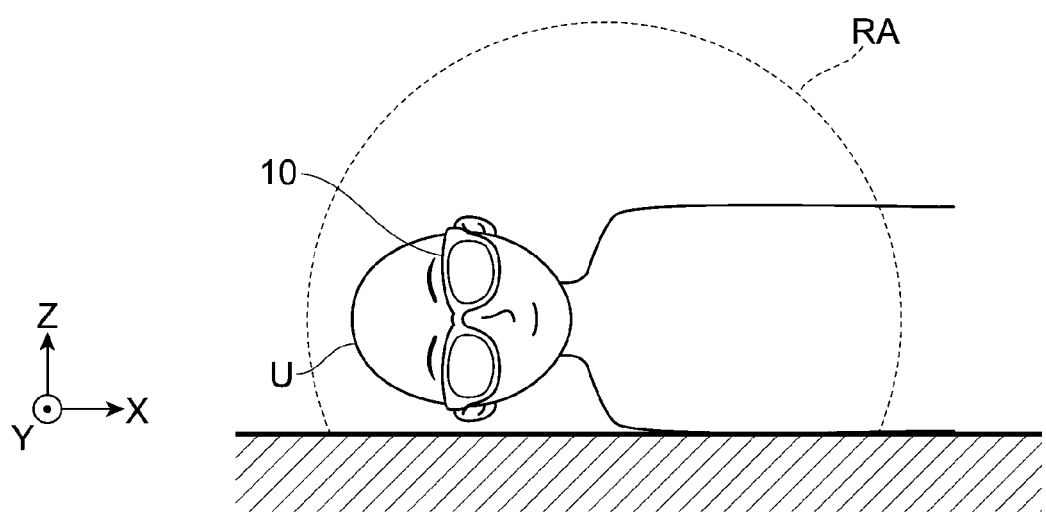

FIGS. 7A and 7B are diagrams for explaining another example of setting the first range RA used for a gesture operation, in which FIG. 7A illustrates an example of setting the first range RA in a state where the user U is lying face-up, and FIG. 7B illustrates an example of setting the first range RA in a state where the user U is lying sideways. Although omitted in FIGS. 7A and 7B, from an overhead view of the user U, the first range RA is fan-shaped like in FIG. 6A. Note that in FIGS. 7A and 7B, the surface on which the user U lies is prescribed by the X axis and the Y axis. In any case, the shape and direction of the first range are prescribed with reference to the xR device 10 worn by the user U.

For example, in FIG. 7A, the arrow of the Z axis points in the depth direction of the user U. Also, in FIG. 7B, the arrow of the Y axis points in the depth direction of the user U. In the case of FIG. 7B, the user U is lying sideways, and therefore the first range RA is set to an asymmetrical shape facing the xR device 10. Note that in FIGS. 6A to 7B, the maximum range of the first range RA is prescribed by the range of motion of a body part of the user U or the like, but the maximum range may also be prescribed by the maximum angle of view of the xR device 10. The virtual display VD is not displayable past the maximum angle of view of the xR device 10 in the first place. For this reason, a real object RO existing outside the maximum angle of view will not be hidden behind the virtual display VD. In other words, the user U is able to notice the real object RO in advance without causing the virtual display VD to retreat.

Figure 8A:
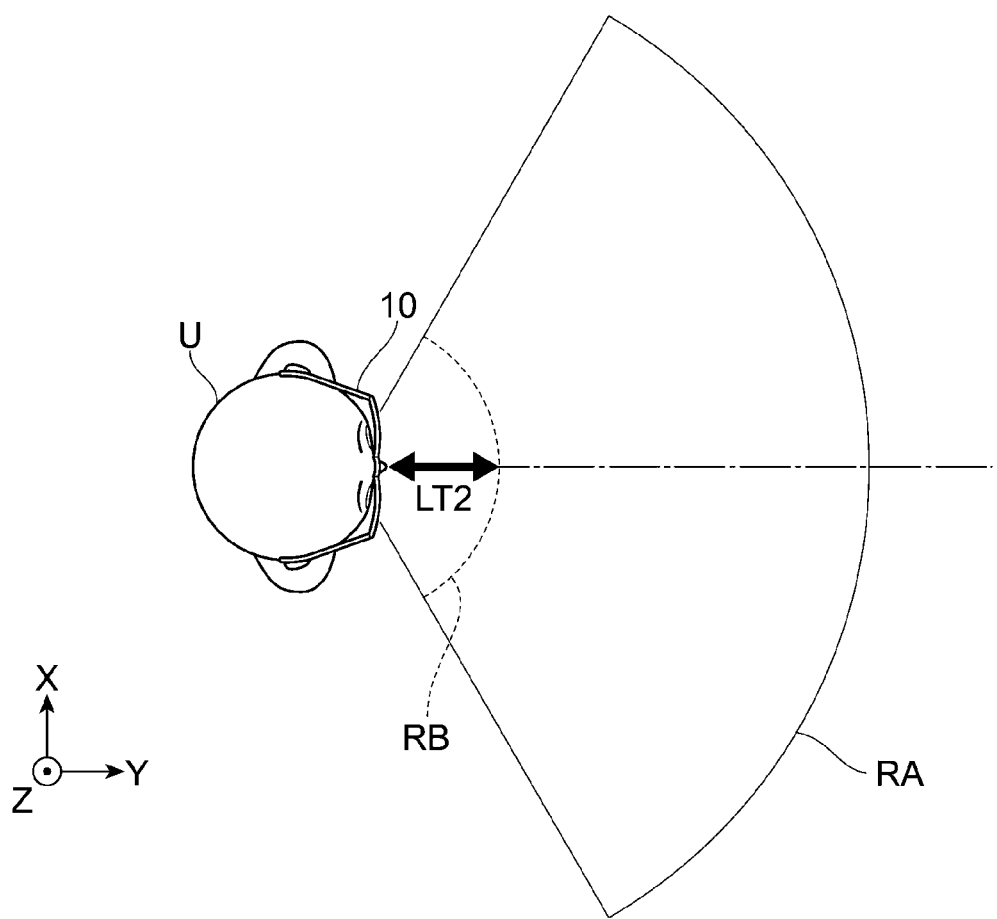
Figure 8B:
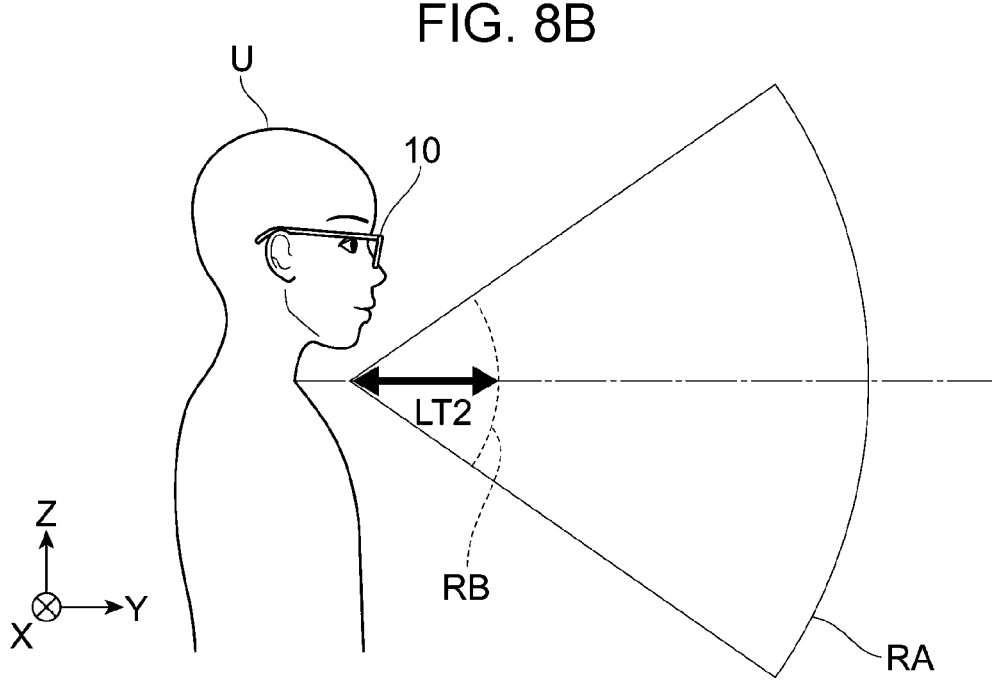

FIGS. 8A and 8B are diagrams for explaining an example of setting a second range RB not used for a gesture operation, in which FIG. 8A is a view of the user U from above and FIG. 8B is a view of the user U from the side. In FIGS. 8A and 8B, portions that correspond to FIGS. 6A and 6B are denoted with the same signs. The second range RB illustrated in FIGS. 8A and 8B gives a range not used for a gesture operation. In other words, the second range RB gives a range in which the virtual display VD is not displayed. This is because if the virtual display VD is too close to the user U, the visibility of the virtual display VD is lowered, and moreover, performing a gesture operation is difficult.

In FIGS. 8A and 8B, the second range RB is prescribed by a second distance LT2. The second distance LT2 is given as a distance from the xR device 10. The second distance LT2 prescribes a minimum distance to be secured between the xR device 10 and the virtual display VD (see FIG. 1). Hereinafter, the second distance LT2 is also referred to as the "closest position". Hereinafter, the information prescribing the first range RA, the first distance LT1 prescribing the retreat distance, the second distance LT2 prescribing the second range RB, and the like are collectively referred to as the basic parameters.

<Setting of Basic Parameters and the Like>

Figure 9:
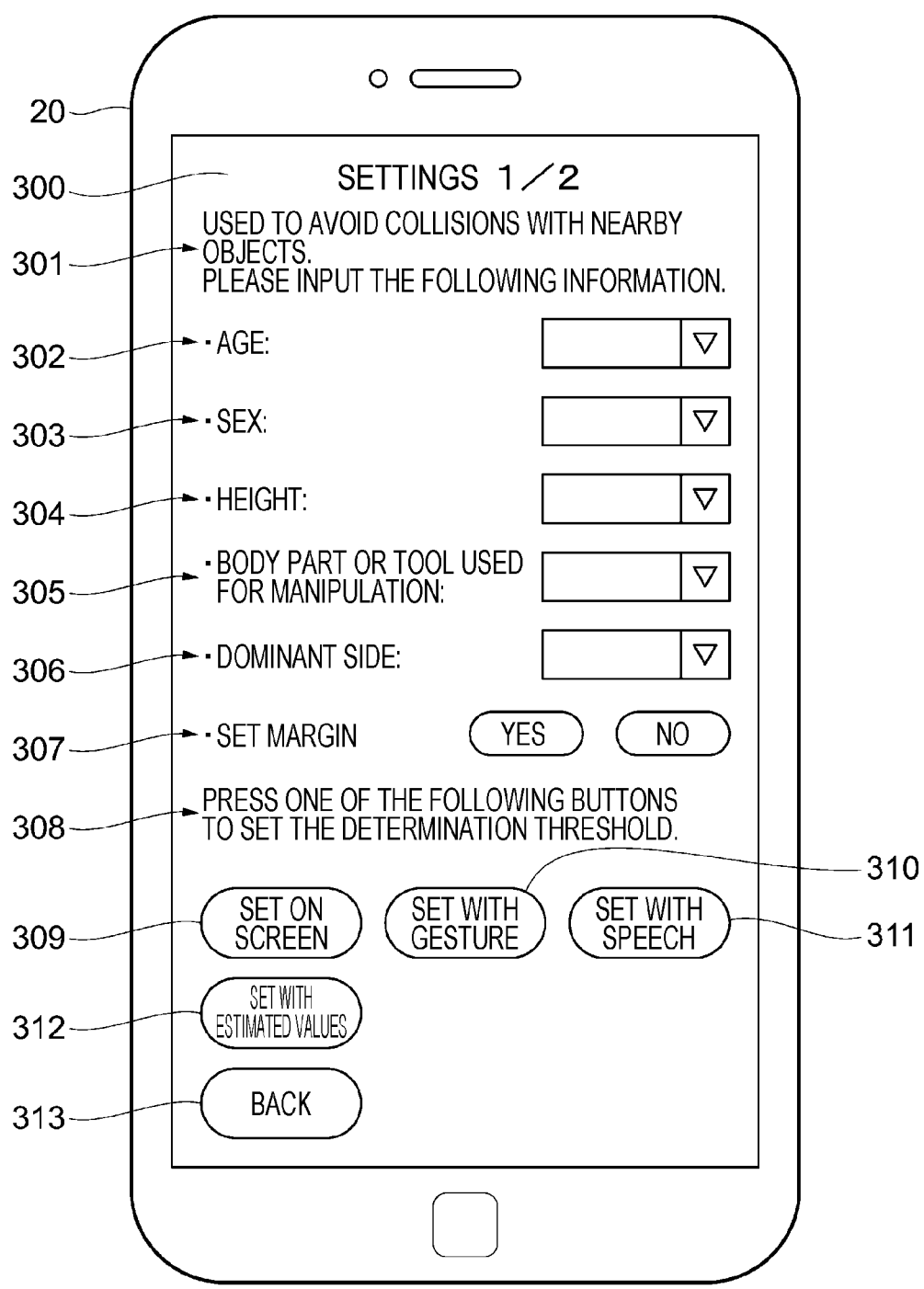
FIG. 9 is a diagram for explaining an example of a settings screen for basic parameters.

FIG. 9 is a diagram for explaining an example of a settings screen 300 for basic parameters. The settings screen 300 illustrated in FIG. 9 is used to select a specific method of setting information such as information related to the user and information prescribing the first range RA. The set information is stored in the xR device 10 (see FIG. 1) or the information terminal 20 as one example of registration information.

In the case of the settings screen 300, guidance text 301 is placed below the title "Settings (1/2)". In FIG. 9, "Used to avoid collisions with nearby objects." and "Please input the following information." are displayed as the guidance text 301 to prompt the user U to set each item. Note that each item may be a required setting or an optional setting.

In the case of the settings screen 300, Age 302, Sex 303, Height 304, Body part or tool used for manipulation 305, Dominant side 306, and Set margin 307 are arranged as items asking for input, below which second guidance text 308 and selection buttons 309 to 313 are arranged. In the case of FIG. 9, pull-down menus are made available for the items of Age 302, Sex 303, Height 304, Body part or tool used for manipulation 305, and Dominant side 306. Among these items, input fields may also be available to enable the input of numerical values for age and height.

The pull-down menu for the item of Body part or tool used for manipulation 305 lists body parts such as finger, hand, elbow, leg, knee, and foot as well as writing implement and aids such as cane as selectable options. The Dominant side 306 setting allows the user U to select whether he or she will mainly use the right side of the body, the left side of the body, or both sides of the body to manipulate the virtual display VD. Set margin 307 allows the user U to set "Yes" or "No" with regard to extending the first range RA set according to the first distance LT1.

In the case where Set margin 307 is "Yes", the first range RA is extended farther out than the first distance LT1. Note that the extension distance may be predetermined, or may be set specifically or adjusted by the user according to a sub-setting. Also, the extension direction references the Dominant side 306 setting. For example, if the Dominant side 306 setting is right-handed, the first range RA is widened on the right side. If Set margin 307 is "No", the first range RA is given by the first distance LT1.

"Press one of the following buttons to set the determination threshold." is displayed as the second guidance text 308. The button 309 is labeled "Set on screen". If the button 309 is operated, the display switches to a screen for setting thresholds. Here, the thresholds are the arm's reach of the user, the first distance LT1, and the second distance LT2, for example. The button 310 is labeled "Set with gesture". If the button 310 is operated, the thresholds are set according to measurement values for properties such as the range of motion of the arm, leg, or the like used for manipulation.

The button 311 is labeled "Set with speech". If the button 311 is operated, the user speaks in response to questions to set the thresholds. The button 312 is labeled "Set with estimated values". If the button 312 is operated, each threshold is estimated on the basis of properties such as age, sex, and height selected from the pull-down menus, and the thresholds are set according to the estimated values. When estimating the thresholds, each threshold is read out from a table prepared for standard body types corresponding to age, sex, and height, for example. Note that if the button 313 is operated, the settings screen 300 switches to a home screen or the like.

Figure 10:
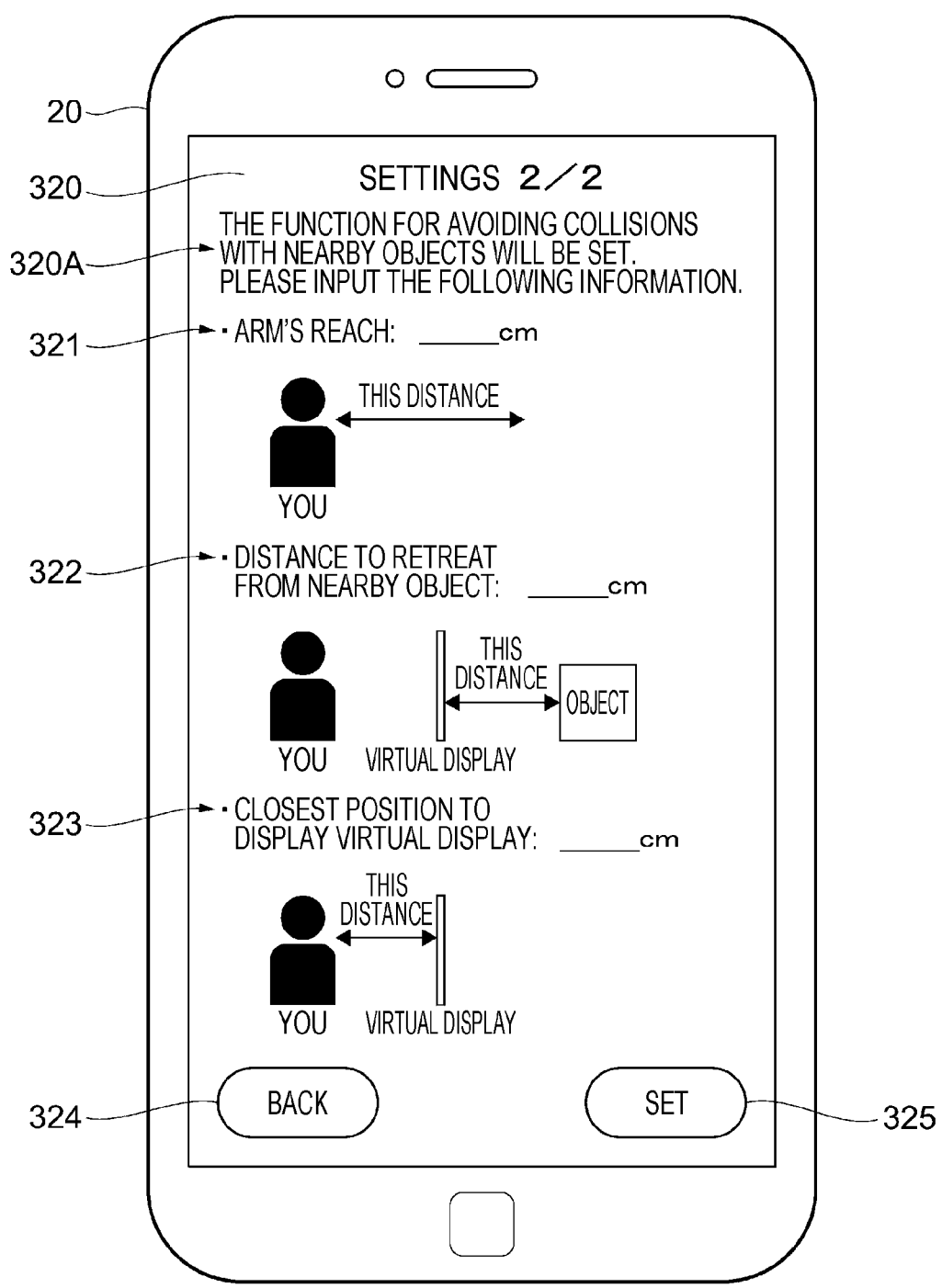
FIG. 10 is a diagram for explaining an example of a settings screen used to set thresholds.

FIG. 10 is a diagram for explaining an example of a settings screen 320 used to set thresholds. In the case of the settings screen 320 illustrated in FIG. 10, guidance text 320A is placed below the title "Settings (2/2)". In FIG. 10, "The function for avoiding collisions with nearby objects will be set." and "Please input the following information." are displayed as the guidance text 320A. In FIG. 10, "Arm's reach" 321, "Distance to retreat from nearby object" 322, and "Closest position to display virtual display" 323 are illustrated as the items to be set.

"Arm's reach" 321 is a distance used to set the first range RA. In FIG. 10, an illustration indicating the horizontal distance from the user in the depth direction is illustrated. In the case where the user U is standing on the ground or a floor, the horizontal distance is a distance parallel to the ground or the like. Note that because the first range RA is prescribed not only by the distance in the depth direction but also the angle in the horizontal direction and the angle in the vertical direction, fields for setting these numerical values may also be provided. In the case of FIG. 10, the units of distance are centimeters, but may also be inches.

"Distance to retreat from nearby object" 322 is a distance that gives the first distance LT1. In FIG. 10, an illustration indicating the distance secured between the real object RO and the virtual display VD is illustrated. In the case of FIG. 10, the units of distance are centimeters, but may also be inches. "Closest position to display virtual display" 323 is a distance that gives the second distance LT2. In FIG. 10, an illustration indicating the distance secured between the user and the virtual display VD is illustrated. In the case of FIG. 10, the units of distance are centimeters, but may also be inches.

Of the above, "Arm's reach" 321 is used to determine whether or not to cause the virtual display VD to retreat, while "Distance to retreat from nearby object" 322 and "Closest position to display virtual display" 323 are used in the case of causing the virtual display VD to retreat from the real object RO. If the distance between the virtual display VD and the real object RO is within the first distance LT1, a retreat of the virtual display VD is executed. However, the distance between the position after retreating (hereinafter referred to as the "retreat position") and the user is set to be the second distance LT2 or greater.

Besides the above, a button 324 labeled "Back" and a button 325 labeled "Set" are arranged on the settings screen 320. If the button 324 is operated, the settings screen 320 switches to the settings screen 300 (see FIG. 9). In this case, the numerical values inputted on the settings screen 320 are not set. If the button 325 is operated, the numerical values inputted on the settings screen 320 are set.

Figure 11A:
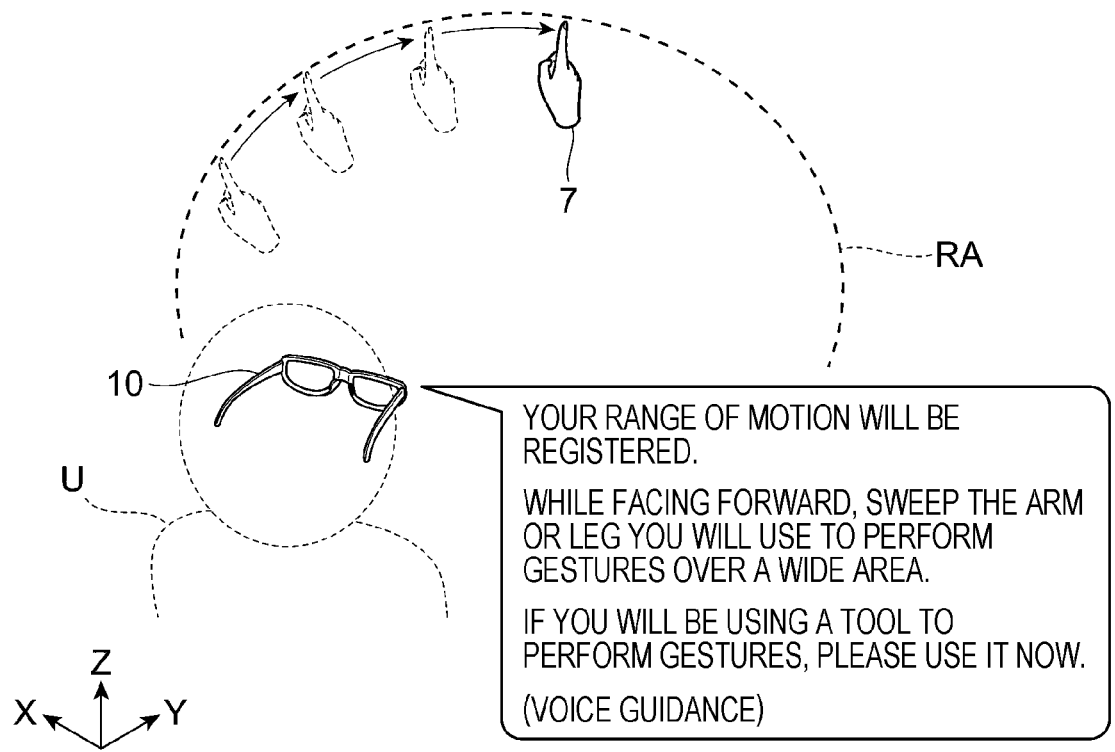
Figure 11B:
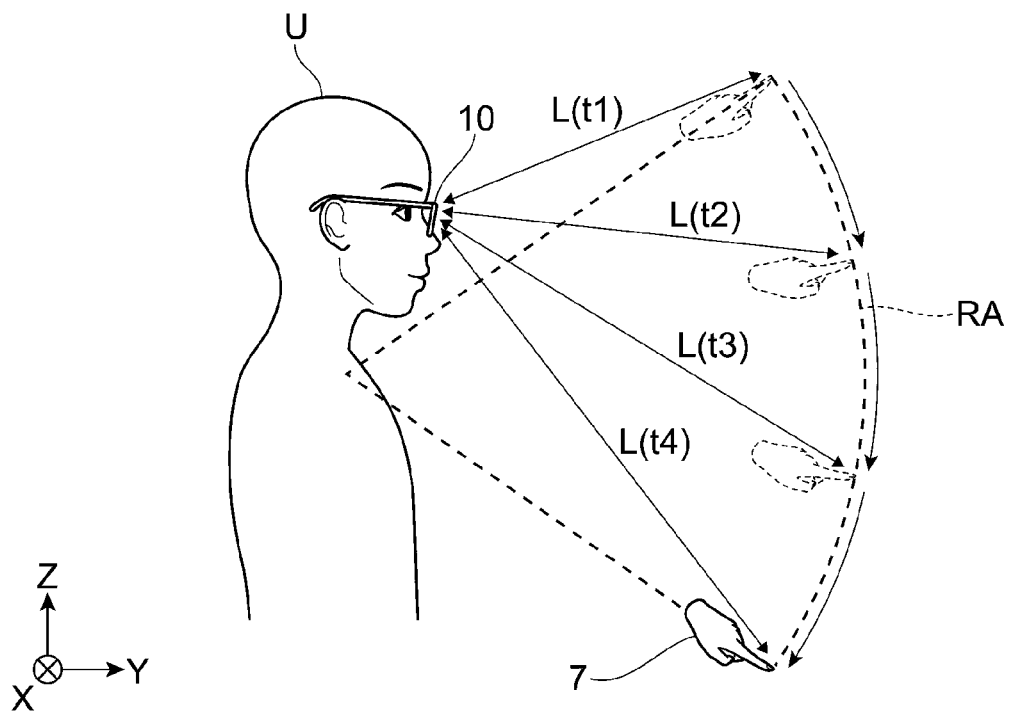

FIGS. 11A and 11B are diagrams for explaining the setting of the first range RA with a gesture, in which FIG. 11A is a view illustrating the setting of the first range from behind the user U and FIG. 11B is a view illustrating the setting of the first range from the side of the user U. The process of setting the first range RA with a gesture is executed in the case where the button 310 (see FIG. 9) is operated. Setting with a gesture is executed according to guidance text displayed on the virtual display VD or voice guidance played from the speaker 102 (see FIG. 2).

In the case of FIG. 11A, voice guidance saying, "Your range of motion will be registered.", "While facing forward, sweep the arm or leg you will use to perform gestures over a wide area.", and "If you will be using a tool to perform gestures, please use it now." is played from the xR device 10. The user U in FIG. 11A is drawing a large circle in midair. The range enclosed by the circle is set as the first range RA. FIG. 11B illustrates a situation in which the first range RA is prescribed by a distance L(t) from the xR device 10. The term tn in parentheses expresses the distance L(t) measured at the time tn.

In the case of using a gesture, the first range RA that may possibly be used the user U to perform an actual gesture can be set accurately. Note that the first distance LT1 and the second distance LT2 may also be set with a gesture. For example, the first distance LT1 and the second distance LT2 may be set as the distance between the left hand and the right hand. However, the first distance LT1 and the second distance LT2 may also be set with speech. For example, the user U may set the first distance LT1 and the second distance LT2 by saying "Set to 5 cm".

Example of Setting First Range

Figure 12A:
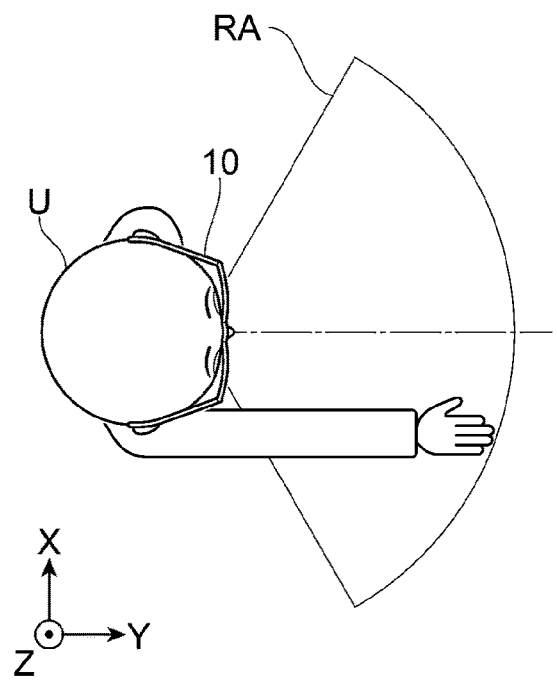
Figure 12B:
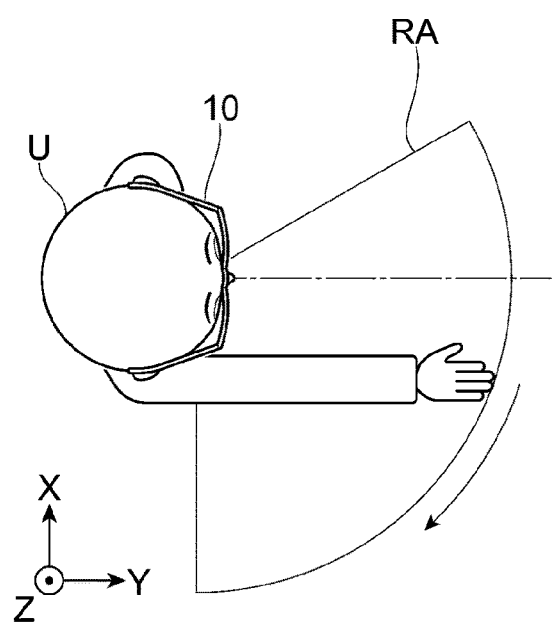
Figure 12C:
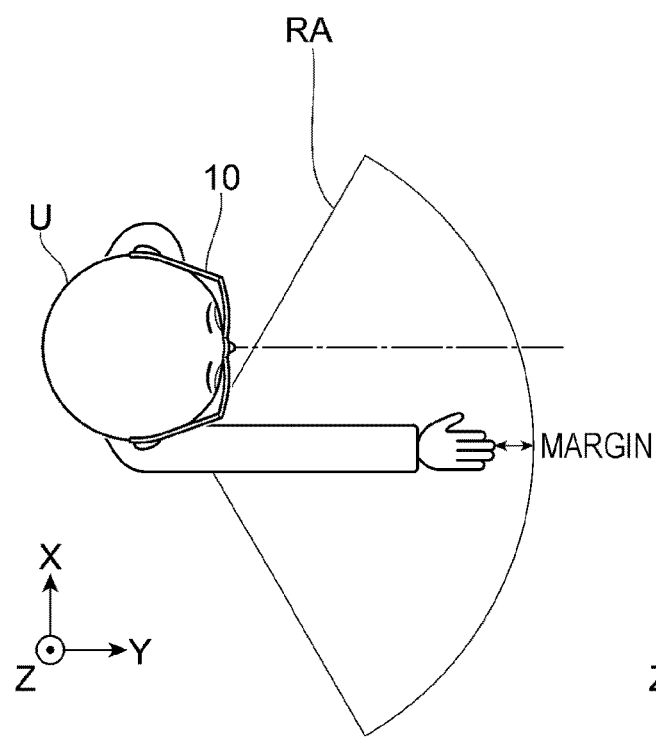
Figure 12D:
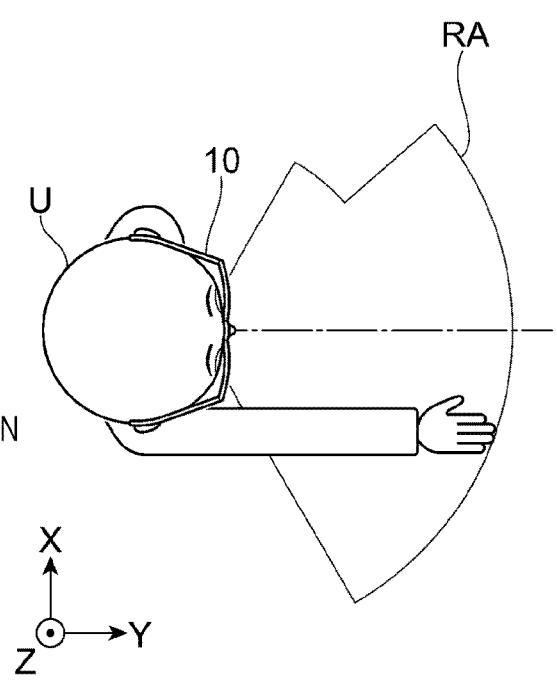

FIGS. 12A to 12D are diagrams for explaining an example of setting the first range RA, in which FIG. 12A is a basic example of the first range RA, FIG. 12B is an example of setting a wider range for the dominant hand compared to the non-dominant hand, FIG. 12C is an example of widening the first range RA by a margin, and FIG. 12D is an example of narrowing the range on the side opposite from the dominant hand. In FIGS. 12A to 12D, portions that correspond to FIG. 6A are denoted with the same signs. In other words, FIGS. 12A to 12D all illustrate overhead views of the user U.

FIG. 12A illustrates the basic shape of the first range RA, which is symmetrical with respect to the forward direction of the user U. FIGS. 12B to 12D illustrate examples of setting the first range RA in the case where the right hand is set as the dominant hand. In the case of FIG. 12B, the shape of the first range RA is rotated clockwise as seen from above the user U while keeping the basic shape illustrated in FIG. 12A.

The first range RA illustrated in FIG. 12C is the case where the right hand is set as the dominant hand and Set margin is also set to "Yes". The first range RA illustrated in FIG. 12C is wider than the first range RA illustrated in FIG. 12B by an amount equal to the margin. In the first range RA illustrated in FIG. 12D, the portion ahead and to the left of the user U, which is hard to reach with the right hand, has been removed from the basic shape illustrated in FIG. 12A. As illustrated in FIGS. 12A to 12D, the first range RA takes a variety of shapes depending on whether or not a dominant hand is set and also whether or not a margin is set. In other words, it is possible not only to widen the range on the side of the dominant hand, but also to narrow the range on the side opposite from the dominant hand.

<Processing Operations>

Hereinafter, processing operations executed by the information terminal 20 (see FIG. 1) on which a function of causing the virtual display VD to retreat is executed will be described. The processing operations and functions indicated hereinafter are achieved through the execution of a program by the processor 201 (see FIG. 5).

<Basic Parameter Setting Operations>

Figure 13:
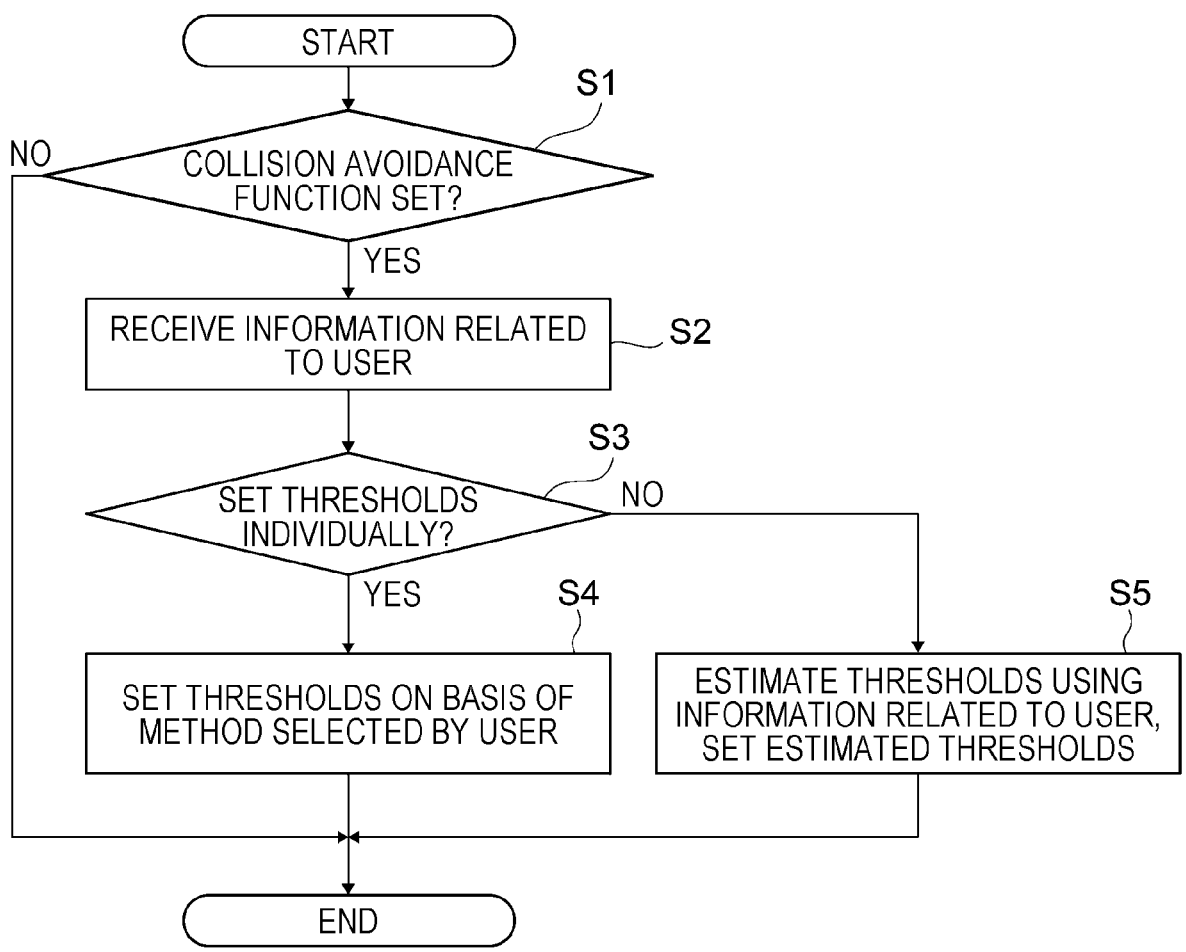
FIG. 13 is a flowchart for explaining an example of operations for setting basic parameters.

FIG. 13 is a flowchart for explaining an example of operations for setting basic parameters. The symbol S in the diagram means "step". First, the processor 201 determines whether or not to set the collision avoidance function (step 1). If a negative result is obtained in step 1, the processor 201 ends the process. If a positive result is obtained in step 1, the processor 201 receives information related to the user (step 2). This process corresponds to inputting information on the settings screen 300 (see FIG. 9).

Next, the processor 201 determines whether or not to set thresholds individually (step 3). If a positive result is obtained in step 3, the processor 201 sets thresholds on the basis of a method selected by the user U (step 4). Step 4 is executed in the case where one of the settings "Set on screen", "Set with gesture", or "Set with speech" is selected. If a negative result is obtained in step 3, the processor 201 estimates thresholds using the information related to the user U, and sets the estimated thresholds (step 5). Through the execution of step 4 or step 5, the initial setting of the thresholds ends.

<Virtual Display Retreat Operations>

Figure 14:
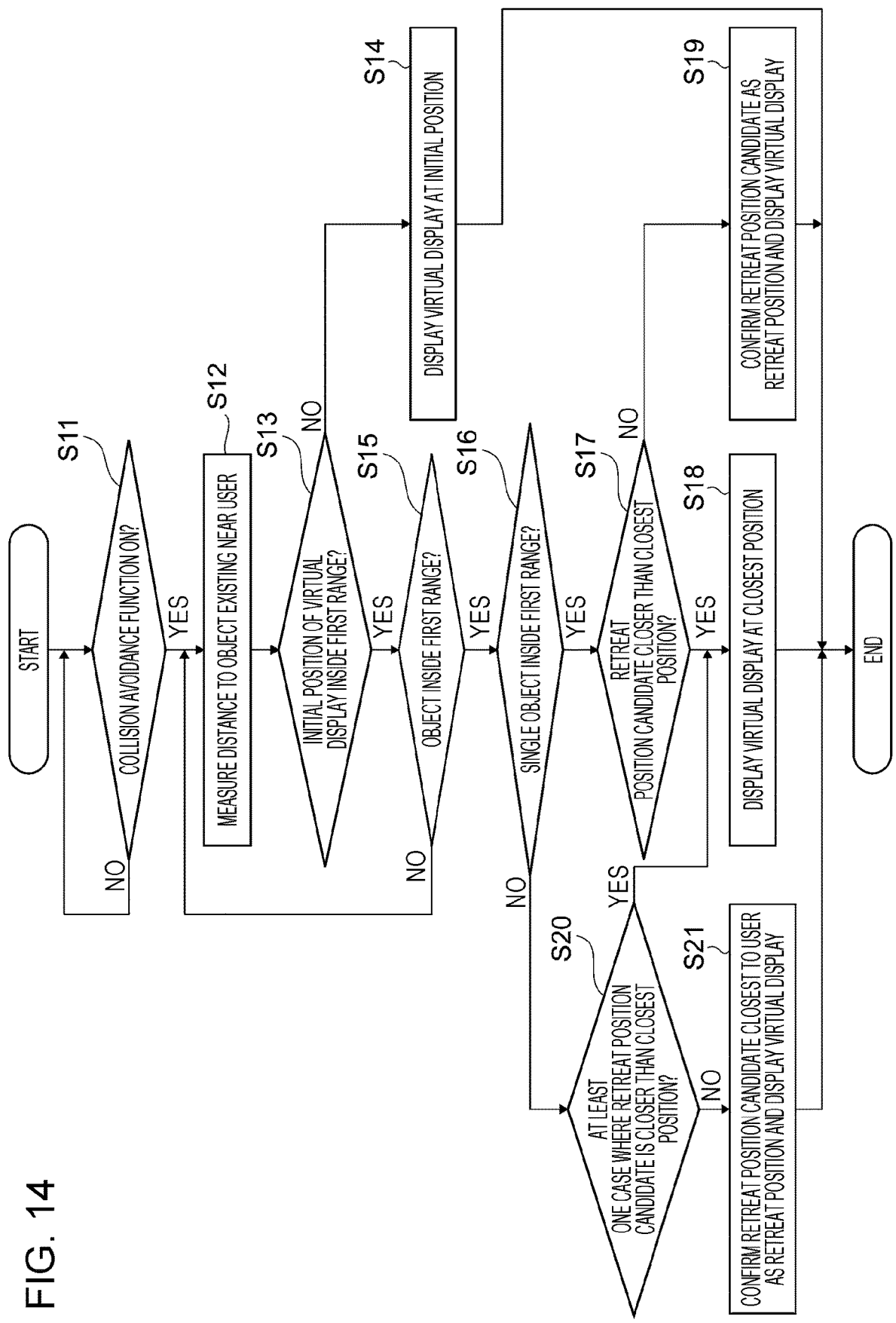
FIG. 14 is a flowchart for explaining an example of retreat operations for a virtual display according to Exemplary Embodiment 1.

FIG. 14 is a flowchart for explaining an example of retreat operations for the virtual display VD according to Exemplary Embodiment 1. The symbol S in the diagram means "step". First, the processor 201 (see FIG. 5) determines whether or not the collision avoidance function is on (step 11). The processor 201 repeats the determination in step 11 while a negative result is obtained in step 11. If a positive result is obtained in step 11, the processor 201 measures the distance to a real object RO existing near the user U (step 12).

When the measurement of the distance to the real object RO near the user U ends, the processor 201 determines whether or not the initial position of the virtual display VD is inside the first range RA (step 13). If a negative result is obtained in step 13, the processor 201 displays the virtual display VD at the initial position (step 14). The initial position is prescribed as a position 50 cm away from the xR device 10 (see FIG. 1) in the forward direction, for example. Obviously, the initial position here is one example, and may also be individually adjustable by the user U.

If a positive result is obtained in step 13, the processor 201 determines whether or not the real object RO is inside the first range RA (step 15). If a negative result is obtained in step 15, collision avoidance with the virtual display VD is unnecessary, and therefore the processor 201 returns to step 12. If a positive result is obtained in step 15, the processor 201 determines whether or not the real object inside the first range RA is singular (step 16).

In the case where there is a single target real object RO, the processor 201 obtains a positive result in step 16. In this case, the processor 201 determines whether or not a retreat position candidate is closer than the closest position (step 17). Here, the retreat position is the position after the virtual display VD is moved the first distance LT1 in a predetermined direction. The direction of retreat is set to the direction approaching the user U, for example. Note that the distance used for the retreat of the virtual display VD does not have to be the same as the first distance LT1. However, by setting the distance used for the retreat of the virtual display VD to the first distance LT1, there is an increased possibility that the retreat position will be at least the first distance LT1 away from the real object RO.

However, even if the distance used for the retreat of the virtual display VD is shorter than the first distance LT1, it is sufficient to repeat the retreat until the retreat position is at least the first distance LT1 away. Also, the distance to retreat may be different depending on the direction of retreat. For example, the distance may be different between the case of retreating in the direction approaching the user U and the case of retreating in the direction going away from the user U. For example, the distance in the direction going away from the user U may be shorter than the distance to retreat in the direction approaching the user U. This is because if the virtual display VD is made to retreat the same distance in the direction going away from the user U as the direction approaching the user U, there is a possibility that a body part or the like of the user U will no longer reach the virtual display VD. Also, if the virtual display VD is made to retreat behind the real object RO, the real object RO will be positioned in front of the virtual display VD, thereby making it possible to preemptively avoid a collision between the user U and the real object RO.

If a positive result is obtained in step 17, the processor 201 displays the virtual display VD at the closest position (step 18). In other words, the virtual display VD is displayed at the position a minimum distance away as close to the user U as possible. In this case, there remains a possibility that the first distance LT1 may not be secured between the retreated virtual display VD and the real object RO, but the virtual display VD is made to retreat from the initial position in the direction approaching the user U. For this reason, compared to the initial position, there is less of a possibility that a body part or the like will collide with the real object RO during a gesture operation.

If a negative result is obtained in step 17, the processor 201 confirms the retreat position candidate as the retreat position and displays the virtual display VD (step 19). This display lowers the possibility of a collision with the real object RO existing near the user U when the user U performs a gesture operation on the virtual display VD. Returning to the description of step 16, if a negative result is obtained in step 16, the processor 201 determines whether or not there is at least one case where the retreat position candidate is closer than the closest position (step 20).

In this case, a plurality of retreat position candidates exist for each of the plurality of objects RO existing near the user U. For example, if there are three objects RO existing inside the first range RA, three retreat position candidates exist. In the case where at least one of these three candidates is closer to the user U than the closest position, the processor 201 obtains a positive result in step 20. In this case, the processor 201 proceeds to step 18.

On the other hand, if a negative result is obtained in step 20, the processor 201 confirms the retreat position candidate closest to the user U as the retreat position and displays the virtual display VD (step 21). This retreat makes it possible to cause the virtual display VD to retreat as far away from as possible from the real object RO closest to the user U for which the possibility of a collision exists. Obviously, the possibility of colliding with a real object RO positioned farther away is also lowered substantially by causing the virtual display VD to retreat from the initial position.

In the case of FIG. 14, after the execution of step 18, step 19, or step 21, the processor 201 temporarily ends the series of processes illustrated in FIG. 14. In this case, the processor 201 executes the determination in step 11 again. However, the processor 201 may also return to step 12 after the execution of step 18, step 19, or step 21. Separately from the operations for causing the virtual display VD to retreat illustrated in FIG. 14, the processor 201 executes a process such as receiving a gesture operation with respect to the virtual display VD and executing a process corresponding to the received gesture operation.

By the way, the retreat position of the virtual display VD computed by the processor 201 satisfies the following conditions. One condition is that the retreat position is included in the field of view of the user U. This follows from the assumption that the visibility of the virtual display VD is to be maintained. A similar condition is that the retreat position is included in the angle of view of the xR device 10 (see FIG. 1). This is because the display of the virtual display VD is constrained by the physical capabilities of the xR device 10. Even if the retreat position of the virtual display VD is inside the field of view of the user U, it is not possible to make the user U see the virtual display VD outside the angle of view of the xR device 10.

Another condition is that the retreat position is inside a range where a gesture operation is performable by the user U. Here, the range where a gesture operation is performable means the range that is within reach of a body part or the like of the user U. In other words, the retreat position is set inside the first range RA. This is because in the present exemplary embodiment, an operation of virtually touching the virtual display VD is treated as a gesture operation. For example, in the case of causing the virtual display VD to retreat 2 m away from the user U, there is an increased possibility that the user U will not be able to touch the surface of the virtual display VD even if the user U uses an aid or the like. Also, the retreat operations illustrated in FIG. 14 assume the case where a single virtual display VD is displayed in midair by the xR device 10, but are also applicable to cases where multiple virtual displays VD are displayed. In such cases, the retreat of the virtual display VD may be interpreted as executing the retreat by treating the multiple virtual displays VD as one.

Virtual Display Retreat Examples

Hereinafter, FIGS. 15 to 23 will be used to describe specific examples of causing the virtual display VD to retreat.

Retreat Example 1

Figure 15:
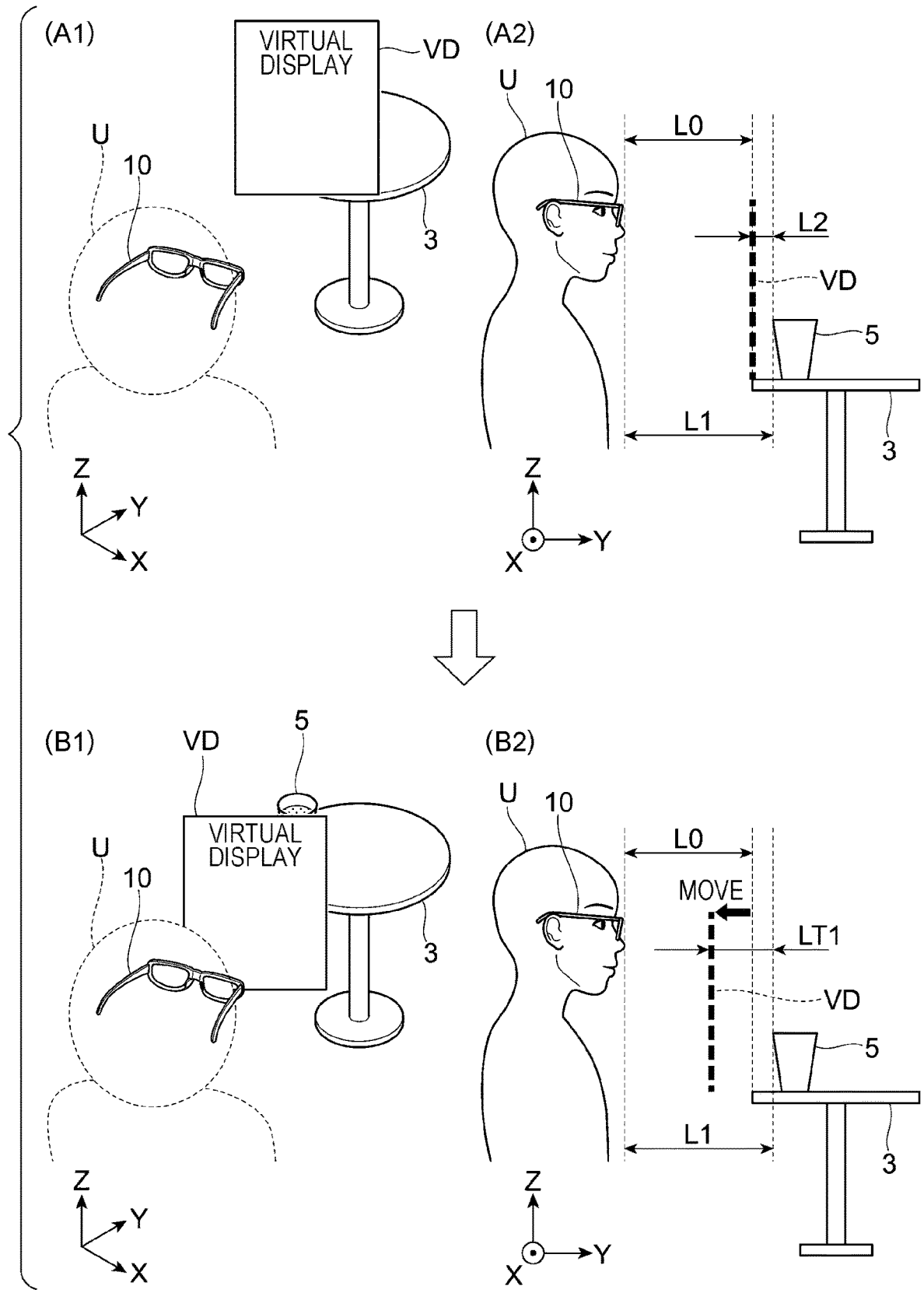
FIG. 15 is a diagram for explaining an example of causing the display position of the virtual display to retreat from a real object in the direction approaching the user, in which (A1) and (A2) illustrate the positional relationship between the virtual display and the user at the initial position, and (B1) and (B2) illustrate the positional relationship between the retreated virtual display and the user.

FIG. 15 is a diagram for explaining an example of causing the display position of the virtual display VD to retreat from the real object RO in the direction approaching the user U, in which (A1) and (A2) illustrate the positional relationship between the virtual display VD and the user U at the initial position, and (B1) and (B2) illustrate the positional relationship between the retreated virtual display VD and the user U.

In the case of (A1) of FIG. 15, the virtual display VD is visible on top of the table 3, but the drink 5 positioned behind the virtual display VD is not visible. According to (A2) of FIG. 15, the distance from the xR device 10 to the virtual display VD is L0, and the distance from the xR device 10 to the drink 5 is L1. Also, L2 is the difference between the distance L0 and the distance L1. Incidentally, L2<LT1. With this positional relationship, there is a high possibility of contacting the drink 5 when performing an operation such as tapping a button placed on the surface of the virtual display VD or swiping the virtual display VD. Also, in this example, the real object RO hidden behind the virtual display VD is the relatively lightweight and easily movable drink 5, but if the real object RO is a hard object fixed in place, there is also a possibility that the user U may be injured by contact with the real object RO.

On the other hand, in (B1) and (B2) of FIG. 15, the display position of the virtual display VD is retreated in the direction of the user U. In this example, the display position of the virtual display VD is moved to a position the first distance LT1 away from the drink 5. The first distance LT1 is determined with consideration for the distance that the finger or the like used to perform a gesture operation moves on the back side of the virtual display VD, and consequently the possibility of contacting the drink 5 is reduced compared to the case where the virtual display VD is displayed at the initial position. Note that in the case of (B2) of FIG. 15, the virtual display VD is moved a distance equal to LT1−L2 in the direction of the user U, but it is also possible to move the virtual display VD the first distance LT1. In this case, the distance between the virtual display VD and the drink 5 is LT1+L2.

Retreat Example 2

Figure 16:
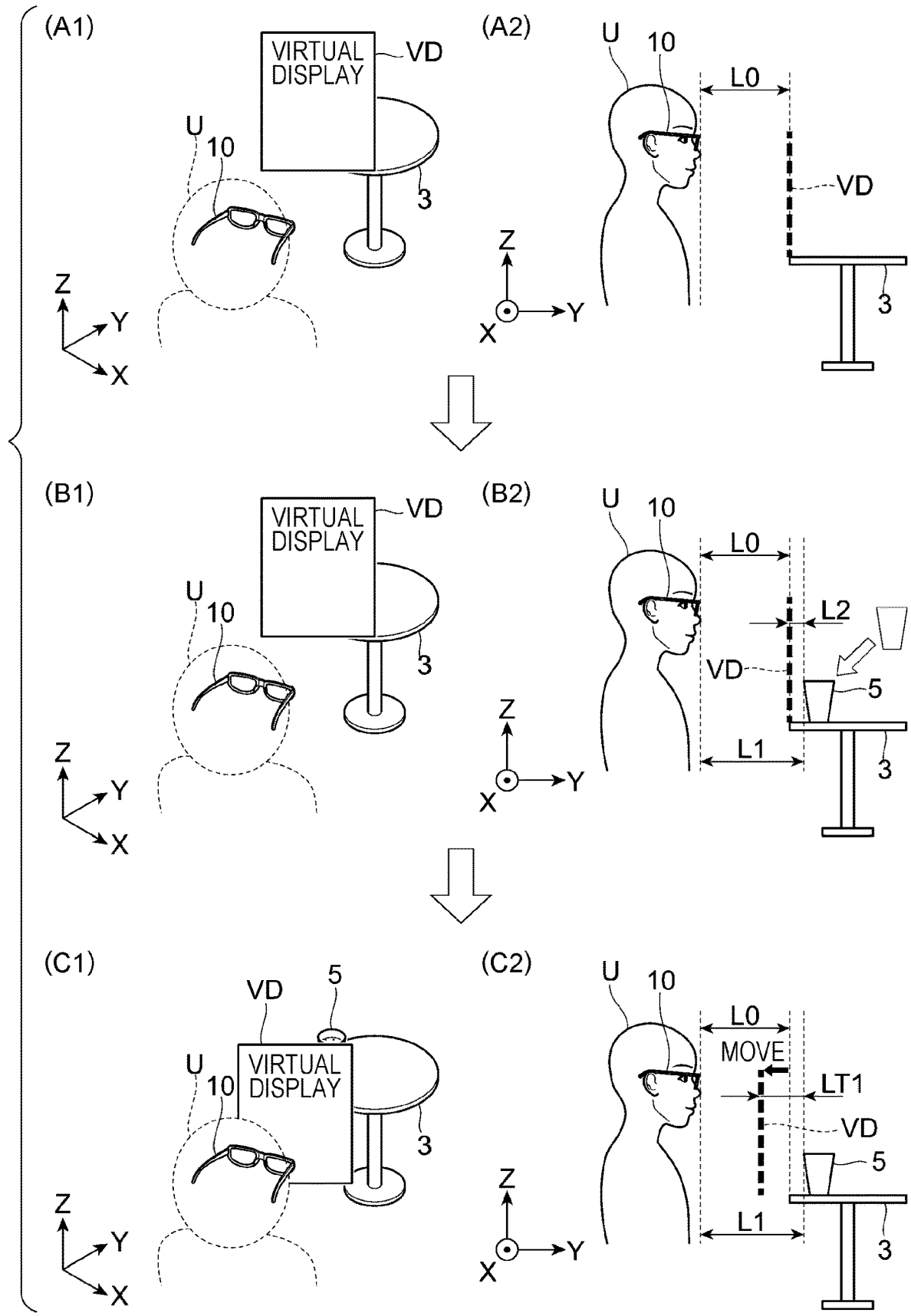
FIG. 16 is a diagram for explaining an example of retreating in the case where a real object is subsequently placed behind the virtual display, in which (A1) and (A2) illustrate the positional relationship between the virtual display and the user at the initial position, (B1) and (B2) illustrate a state in which a drink treated as the real object is placed on a table, and (C1) and (C2) illustrate the positional relationship between the retreated virtual display and the user.

FIG. 16 is a diagram for explaining an example of retreating in the case where the real object RO is subsequently placed behind the virtual display VD, in which (A1) and (A2) illustrate the positional relationship between the virtual display VD and the user U at the initial position, (B1) and (B2) illustrate a state in which the drink 5 treated as the real object RO is placed on the table 3, and (C1) and (C2) illustrate the positional relationship between the retreated virtual display VD and the user U. In FIG. 16, portions that correspond to FIG. 15 are denoted with the same signs.

The case of Retreat Example 1 anticipates the case where the drink 5 is placed on the table 3 and the display position of the virtual display VD subsequently brought close to the drink 5, but Retreat Example 2 is for the case where the real object RO such as the drink 5 is placed at the location where the virtual display VD is being displayed. In this case, too, at the time when the new real object RO is detected, the virtual display VD is made to retreat to a position where the possibility of collision is low. (C1) and (C2) of FIG. 16 illustrate the retreat after the real object RO such as the drink 5 is detected. On the other hand, there is a possibility that movement of the virtual display VD not based on a gesture operation by the user U may confuse the user U.

For this reason, the user U may also be notified in the case where the display position of the virtual display VD is moved by the collision avoidance function while the virtual display VD is being displayed. The notification here may be issued by using playback sounds or speech from the speaker 102 (see FIG. 3) or vibration produced by a vibrator, a warning message or the like may be displayed on the virtual display VD being displayed, or a virtual display VD for alerting the user U may be displayed separately from the virtual display VD being displayed.

Retreat Example 3

Figure 17:
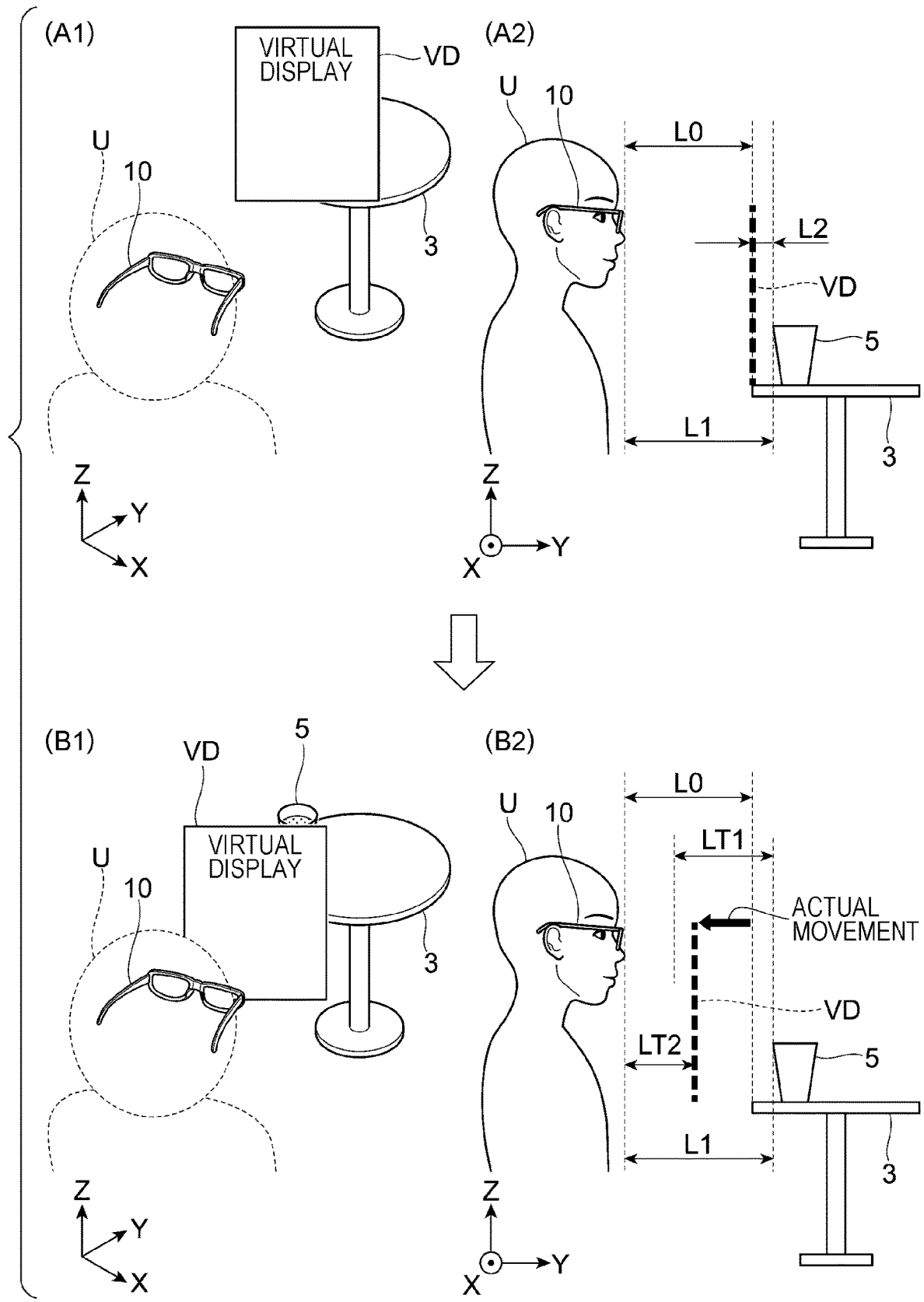
FIG. 17 is a diagram for explaining an example of retreating in the case where a retreat position candidate is closer than a second distance to the user, in which (A1) and (A2) illustrate the positional relationship between the virtual display and the user at the initial position, and (B1) and (B2) illustrate the positional relationship between the retreated virtual display and the user.

FIG. 17 is a diagram for explaining an example of retreating in the case where a retreat position candidate is closer than the second distance LT2 to the user U, in which (A1) and (A2) illustrate the positional relationship between the virtual display VD and the user U at the initial position, and (B1) and (B2) illustrate the positional relationship between the retreated virtual display VD and the user U. In FIG. 17, portions that correspond to FIG. 15 are denoted with the same signs. Here, the first distance LT1 used in Retreat Example 3 is assumed to be longer than the first distance LT1 used in Retreat Example 1. In this case, the position closer to the user U by the first distance LT1 from the drink 5 is included in the second distance LT2 within which the display of the virtual display VD is prohibited. In other words, the retreat position candidate is included inside the second range RB.

Accordingly, in Retreat Example 3, the position the second distance LT2 away from the user U is set as the retreat position of the virtual display VD. In this case, the distance between the retreated virtual display VD and the drink 5 is shorter than the first distance LT1. However, the distance between the virtual display VD and the drink 5 is increased compared to the initial position. Consequently, although there is a higher possibility of collision with the real object RO such as the drink 5 during a gesture operation compared to Retreat Example 1, the possibility of collision is lower compared to the case of the initial position.

Retreat Example 4

Figure 18:
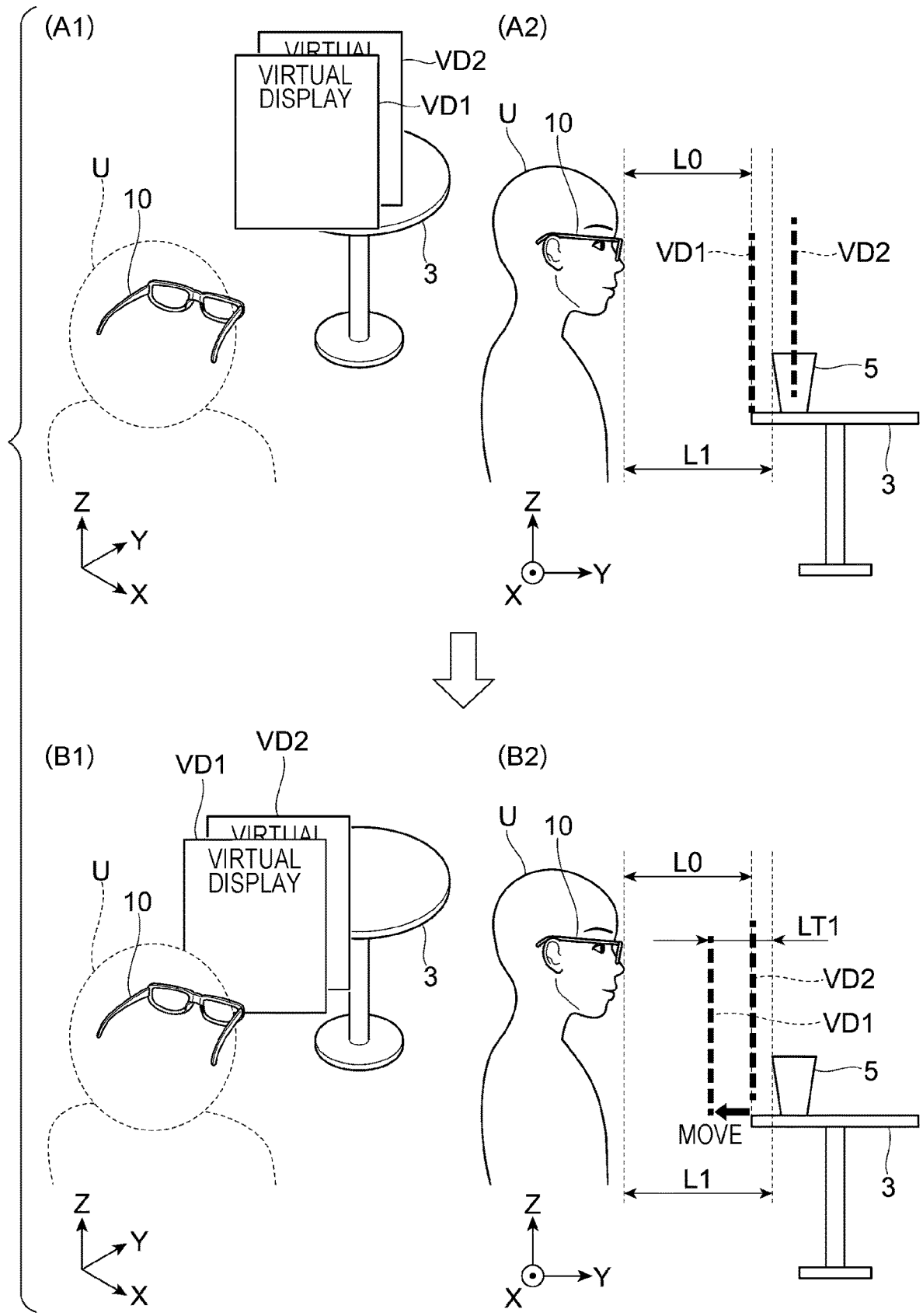
FIG. 18 is a diagram for explaining an example of retreating in the case where multiple virtual displays are organized in the depth direction, in which (A1) and (A2) illustrate the positional relationship between the virtual displays and the user at the initial position, and (B1) and (B2) illustrate the positional relationship between the retreated virtual displays and the user.

FIG. 18 is a diagram for explaining an example of retreating in the case where multiple virtual displays VD1 and VD2 are organized in the depth direction, in which (A1) and (A2) illustrate the positional relationship between the virtual displays VD1 and VD2 and the user U at the initial position, and (B1) and (B2) illustrate the positional relationship between the retreated virtual displays VD1 and VD2 and the user U. In FIG. 18, portions that correspond to FIG. 15 are denoted with the same signs.

In the case of Retreat Example 4, two virtual displays VD1 and VD2 are displayed, and the display position of the virtual display VD2 positioned behind from the perspective of the user U is overlapping the drink 5. However, because the other virtual display VD1 is being displayed in front of the virtual display VD2 positioned behind, the user U does not know that the virtual display VD2 positioned behind is overlapping the drink 5. However, of the two virtual displays VD1 and VD2, the virtual display VD2 positioned behind is displayed at a height offset higher than the height at which the virtual display VD1 in front is displayed. This enables the user U to perceive the existence of the other virtual display VD2 behind the virtual display VD1 displayed in front.

In the case of Retreat Example 4, the target of a gesture operation is the virtual display VD1 positioned in front with respect to the user U. Consequently, the virtual display VD1 positioned in front with respect to the user U is made to retreat from the drink 5. In other words, the virtual display VD1 is made to retreat the first distance LT1 in the direction going away from the drink 5. The retreat reduces the possibility of contact with the drink 5 in association with a gesture operation. Note that in the example of (B1) and (B2) of FIG. 18, the virtual display VD2 positioned behind is also made to retreat together with the virtual display VD1 in coordination with the retreat of the virtual display VD1. Consequently, the overlap between the virtual display VD2 and the drink 5 is resolved. However, because the target of a gesture operation is the virtual display VD1 in front, it is also possible to cause only the display position of the virtual display VD1 to retreat while leaving the virtual display VD2 at the initial position.

Also, in the case where the display positions of the virtual displays VD1 and VD2 are made to retreat together, the virtual display VD2 positioned behind and the drink 5 may be separated by the first distance LT1. In this case, the distance between the virtual display VD1 and the drink 5 is even longer than the first distance LT1. For this reason, the possibility of collision with the drink 5 by a body part or the like during a gesture operation performed on the virtual display VD1 in front is lowered further compared to the case in (B1) and (B2) of FIG. 18. However, the virtual display VD1 positioned in front is brought closer to the user U. For this reason, the possibility that the distance between the virtual display VD1 positioned in front and the user U will be shorter than the second distance LT2 is higher than in the case where the virtual display VD1 positioned in front is moved the first distance LT1 away from the drink 5.

Retreat Example 5

Figure 19:
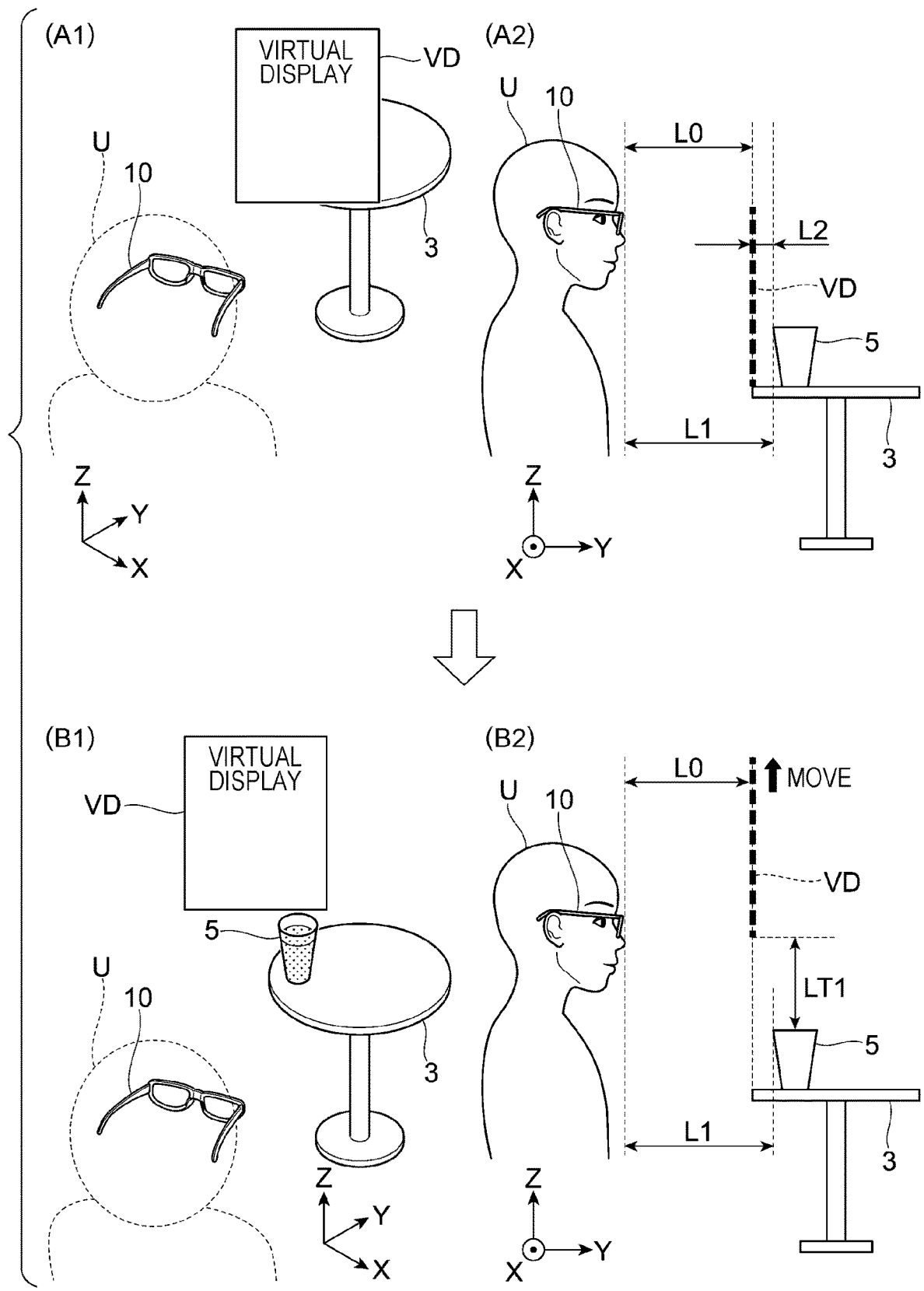
FIG. 19 is a diagram for explaining an example of causing the virtual display to retreat upward, in which (A1) and (A2) illustrate the positional relationship between the virtual display and the user at the initial position, and (B1) and (B2) illustrate the positional relationship between the retreated virtual display and the user.

FIG. 19 is a diagram for explaining an example of causing the virtual display VD to retreat upward, in which (A1) and (A2) illustrate the positional relationship between the virtual display VD and the user U at the initial position, and (B1) and (B2) illustrate the positional relationship between the retreated virtual display VD and the user U. In FIG. 19, portions that correspond to FIG. 15 are denoted with the same signs. In the case of Retreat Example 5, as illustrated in (B2) of FIG. 19, the horizontal distance between the user U and the virtual display VD does not change as a result of causing the virtual display VD to retreat. However, because the virtual display VD is moved the first distance LT1 upward from the top edge of the drink 5, there is a reduced possibility that a body part or the like of the user U will collide with the drink 5 when performing a gesture operation on the virtual display VD.

In the case of Retreat Example 5, by causing the virtual display VD to retreat as illustrated in (B1) of FIG. 19, the drink 5 that had been positioned behind becomes visible to the user U. However, although the virtual display VD is moved the first distance LT1 with reference to the top edge of the drink 5 in (B2) of FIG. 19, it is also possible to simply move the virtual display VD the first distance LT1 upward from the initial position.

However, in the case of moving the virtual display VD upward from the initial position, if the height dimension of the real object RO such as the drink 5 positioned behind the virtual display VD is long, there remains a possibility of overlap between the moved virtual display VD and the real object RO such as the drink 5. In such a case, the virtual display VD may not only be moved upward as seen from the xR device 10, but also moved toward the user U by a predetermined distance such as the first distance LT1, for example. However, in a situation in which moving the virtual display VD upward enables the user U to notice the drink 5 that had been hidden behind the virtual display VD, even if the distance between the retreated virtual display VD and the drink 5 is short, there is a reduced possibility of collision compared to the case of continuing to display the virtual display VD at the initial position. Note that the retreat direction of the virtual display VD is not limited to the upward direction and may also be the downward direction.

Retreat Example 6

Figure 20:
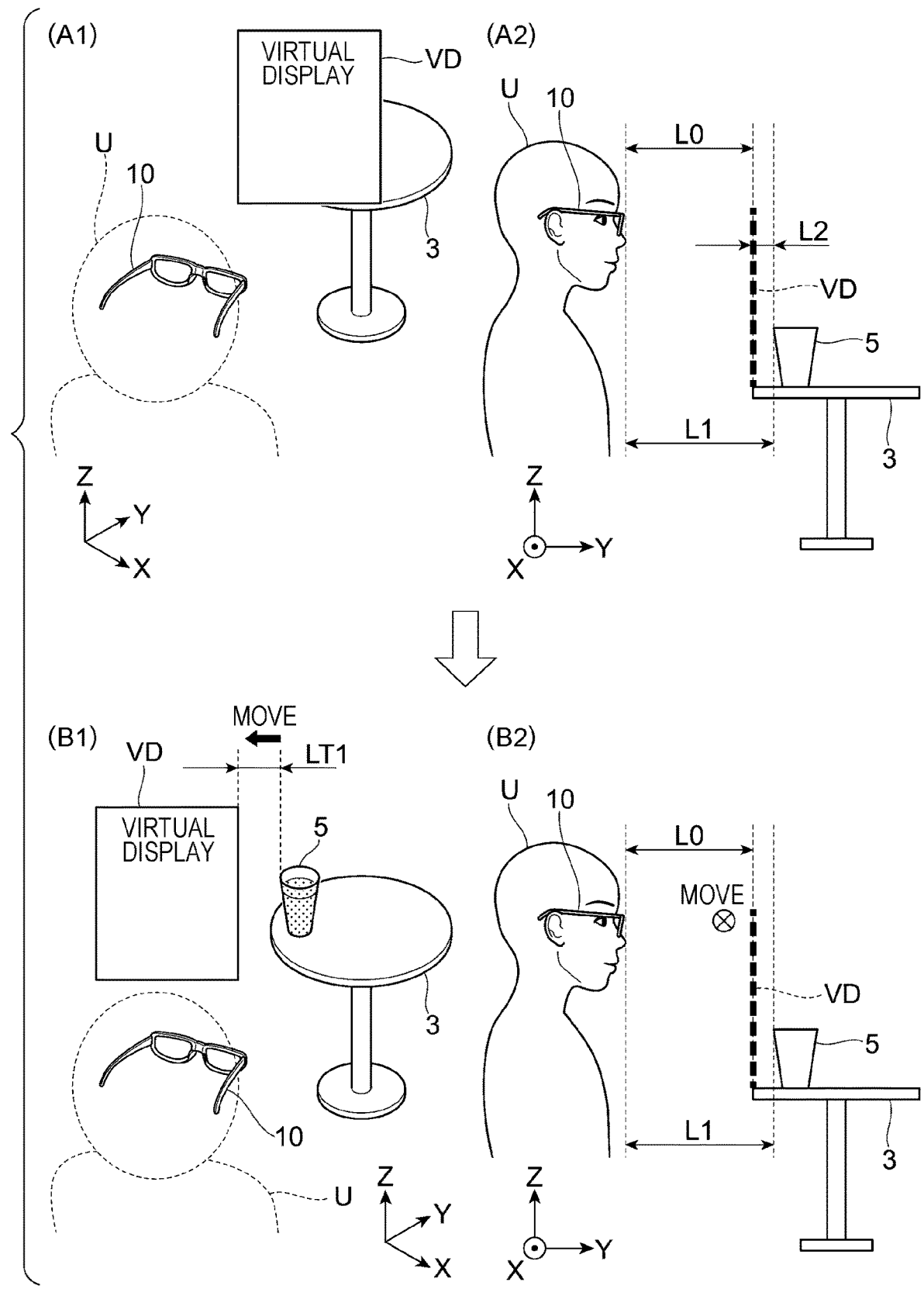
FIG. 20 is a diagram for explaining an example of causing the virtual display to retreat to the side, in which (A1) and (A2) illustrate the positional relationship between the virtual display and the user at the initial position, and (B1) and (B2) illustrate the positional relationship between the retreated virtual display and the user.

FIG. 20 is a diagram for explaining an example of causing the virtual display to retreat to the side, in which (A1) and (A2) illustrate the positional relationship between the virtual display VD and the user U at the initial position, and (B1) and (B2) illustrate the positional relationship between the retreated virtual display VD and the user U. In FIG. 20, portions that correspond to FIG. 15 are denoted with the same signs. In the case of Retreat Example 6, as illustrated in (B1) of FIG. 20, the virtual display VD is moved to the left of the drink 5 from the perspective of the user U. Consequently, as illustrated in (B2) of FIG. 20, the horizontal distance between the user U and the virtual display VD does not change as a result of causing the virtual display VD to retreat.

However, the virtual display VD is not only moved the first distance LT1 to the left from the left edge of the drink 5, but also the entire drink 5 that had been hidden behind the virtual display VD in the initial position becomes visible. For this reason, the user U is able to perform a gesture operation on the virtual display VD while being aware of the existence of the drink 5. In other words, the possibility that a body part or the like of the user U will collide with the drink 5 is lowered.

Note that although the virtual display VD is moved the first distance LT1 with reference to the left edge of the drink 5 in (B2) of FIG. 20, it is also possible to simply move the virtual display VD the first distance LT1 to the left from the initial position. However, in the case of moving the virtual display VD to the left from the initial position, if the leftward dimension of the real object RO such as the drink 5 positioned behind the virtual display VD is long, there remains a possibility of overlap between the moved virtual display VD and the real object RO such as the drink 5. In such a case, the virtual display VD may not only be moved to the left as seen from the xR device 10, but also moved toward the user U by a predetermined distance such as the first distance LT1, for example.

However, in a situation where moving the virtual display VD to the left enables the user U to notice the drink 5 that had been hidden behind the virtual display VD, even if the distance between the retreated virtual display VD and the drink 5 is short, there is a reduced possibility of collision compared to the case of continuing to display the virtual display VD at the initial position. Note that the retreat direction of the virtual display VD is not limited to the left and may also be to the right. Otherwise, the retreat direction may also be any of diagonally up and to the left, diagonally down and to the left, diagonally up and to the right, or diagonally down and to the right. Furthermore, by combining the above with another retreat example, it is possible to move the virtual display VD in any direction, such as diagonally forward and to the left, diagonally backward and to the left, diagonally forward and upward, diagonally backward and upward, diagonally forward and to the right, diagonally backward and to the right, diagonally forward and downward, or diagonally backward and downward.

Retreat Example 7

Figure 21:
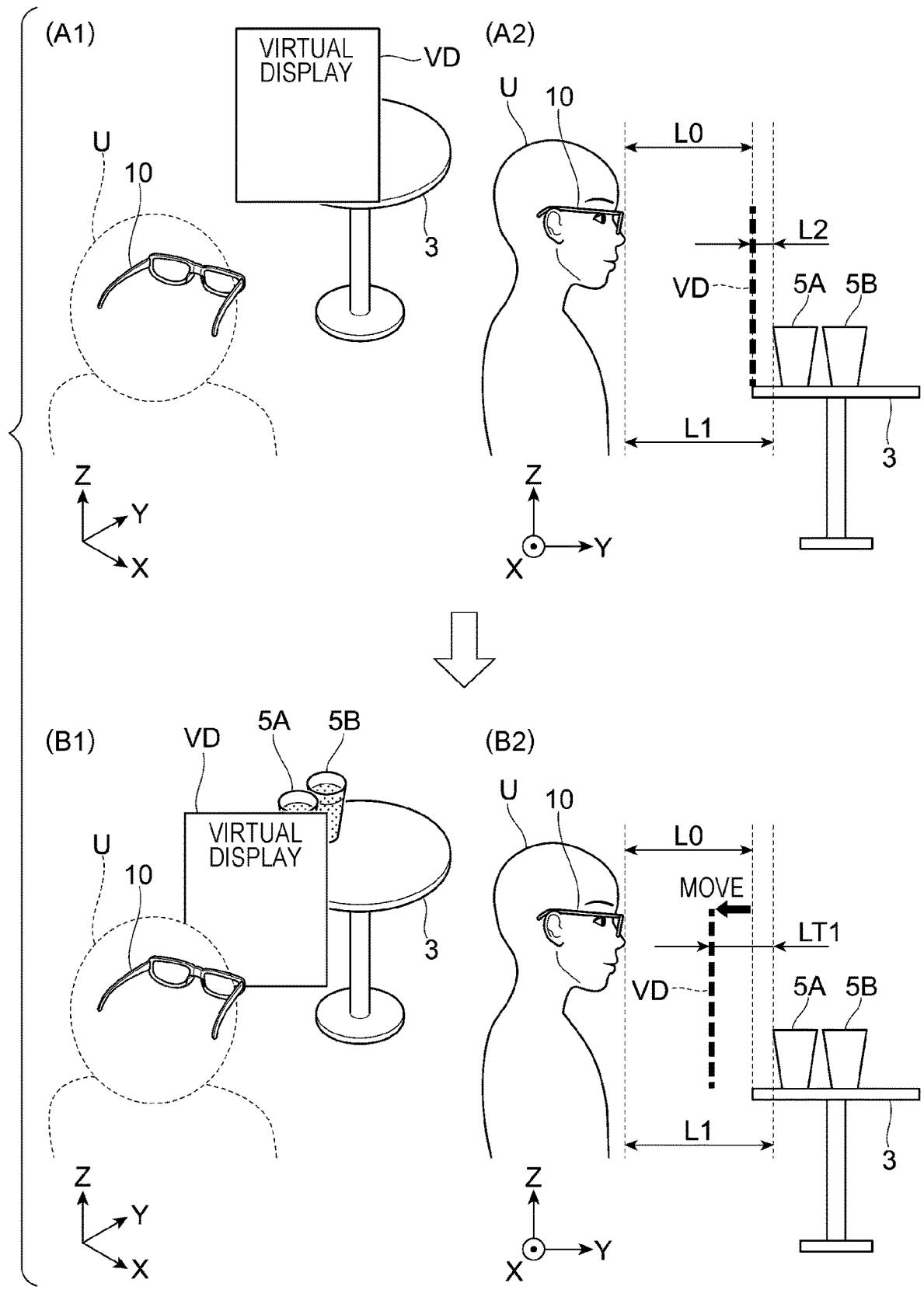
FIG. 21 is a diagram for explaining an example of causing the virtual display to retreat in the case where multiple drinks are placed on a table in front of the user, in which (A1) and (A2) illustrate the positional relationship between the virtual display, the user, and the drinks at the initial position, and (B1) and (B2) illustrate the positional relationship between the retreated virtual display, the user, and the drinks.

FIG. 21 is a diagram for explaining an example of causing the virtual display VD to retreat in the case where multiple drinks 5A and 5B are placed on the table 3 in front of the user U, in which (A1) and (A2) illustrate the positional relationship between the virtual display VD, the user U, and the drinks 5A and 5B at the initial position, and (B1) and (B2) illustrate the positional relationship between the retreated virtual display VD, the user U, and the drinks 5A and 5B. In FIG. 21, portions that correspond to FIG. 15 are denoted with the same signs.

In the case of (A2) and (B2) of FIG. 21, the two drinks 5A and 5B are arranged in the depth direction from the perspective of the user U. With this arrangement, the possibility of collision when performing a gesture operation is higher for the drink 5A positioned in front. Consequently, like Retreat Example 1, if the distance between the drink 5A positioned in front and the virtual display VD is the first distance LT1 or less, a retreat of display position of the virtual display VD is executed. The retreat of the virtual display VD illustrated in (B1) and (B2) of FIG. 21 is the same as Retreat Example 1 except for the number of objects RO that are the cause of the retreat. Note that in the case where the distance L1 between the user U and the drink 5A and the distance L1 between the user U and the drink 5B are the same, it is determined whether or not the retreat position candidate of the virtual display VD satisfies a reference with respect to both of the drinks 5A and 5B.

Retreat Example 8

Figure 22:
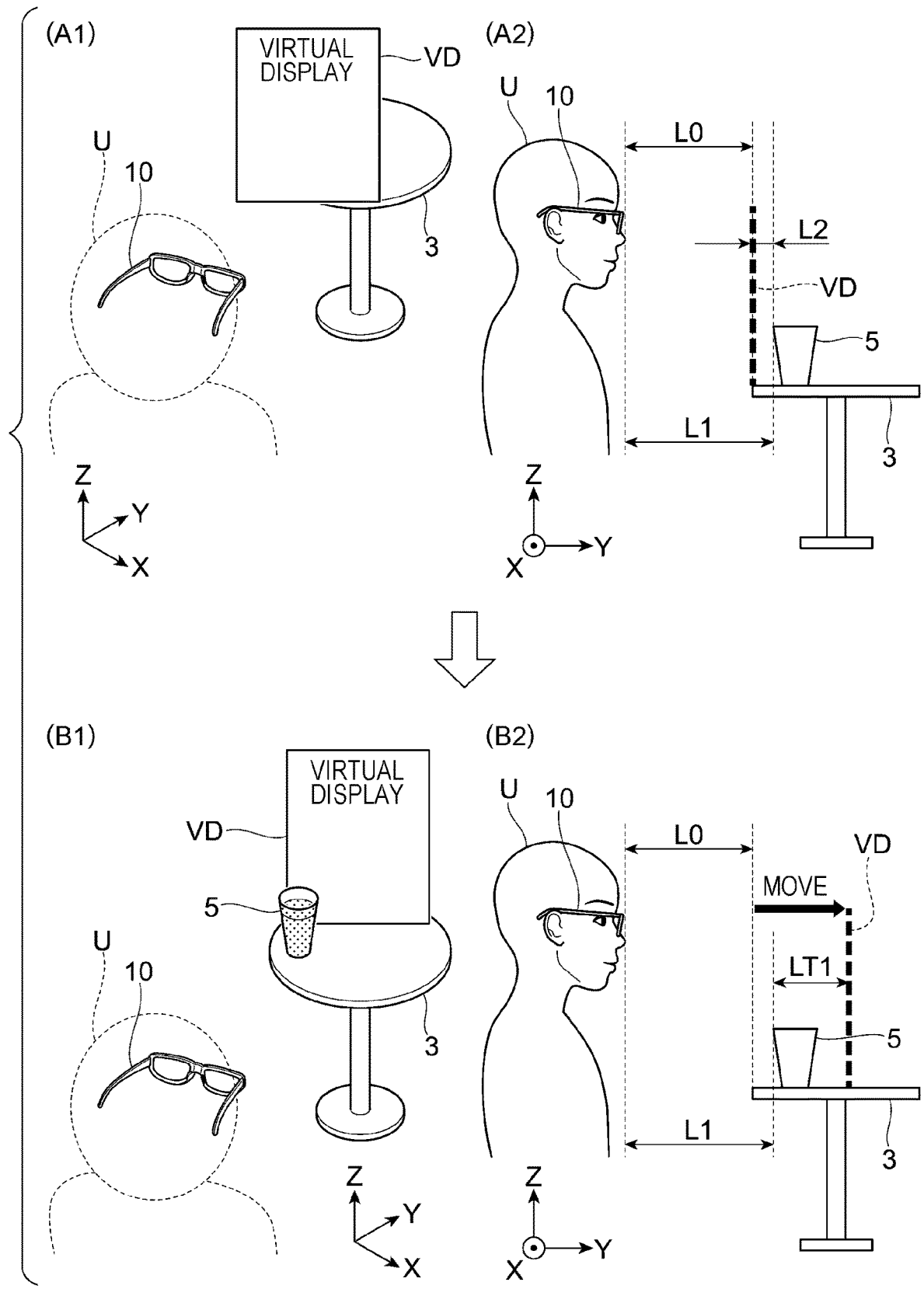
FIG. 22 is a diagram for explaining an example of causing the display position of the virtual display to retreat behind a real object from the perspective of the user, in which (A1) and (A2) illustrate the positional relationship between the virtual display and the user at the initial position, and (B1) and (B2) illustrate the positional relationship between the retreated virtual display and the user.

FIG. 22 is a diagram for explaining an example of causing the display position of the virtual display VD to retreat behind the real object RO from the perspective of the user U, in which (A1) and (A2) illustrate the positional relationship between the virtual display VD and the user U at the initial position, and (B1) and (B2) illustrate the positional relationship between the retreated virtual display VD and the user U. In FIG. 22, portions that correspond to FIG. 15 are denoted with the same signs. In Retreat Example 8, as illustrated in (B2) of FIG. 22, the virtual display VD is moved the first distance LT1 farther behind with reference to the distance L1 to the drink 5. Obviously, like the other retreat examples, the virtual display VD may also be moved the first distance LT1 with reference to the initial position of the virtual display VD.

In the case of (B1) and (B2) of FIG. 22, the entire drink 5 appears in front of the virtual display VD. Consequently, the user U is able to execute a gesture operation while being aware of the existence of the drink 5. However, in the case where the distance L2 between the display position of the retreated virtual display VD and the drink 5 is short or the case where display position of the retreated virtual display VD overlaps with the drink 5, there is a possibility that the virtual display VD will be less visible to the user U. However, in such cases, the user U is able to make the virtual display VD less hard to see by changing the direction of his or her head to change the position where the virtual display VD is displayed.

Also, in the case where an operation button or the like on the retreated virtual display VD is positioned immediately behind the drink 5 from the perspective of the user U, it may be difficult to operate the operation button or the like even though the user U does not collide with the drink 5 without noticing the drink 5 when performing a gesture operation. In such a case, the user U likewise is able to perform a gesture operation safely on the operation button or the like on the virtual display VD by changing the direction of his or her head to change the position where the virtual display VD is displayed. Note that depending on factors such as the physical limitations of the user U and the environment in which the xR device 10 is used, it is conceivable that the user U may have difficulty changing the direction of his or her head freely in some cases.

However, in such cases, the display position of the virtual display VD may be movable from the initial position according to an instruction from the user U. For example, the user U may give a voice instruction to increase the movement distance or change the display position of the virtual display VD. Additionally, the display position of the virtual display VD may also be changed from the initial position by performing a gesture operation of pushing the partial region of the virtual display VD not overlapping with the drink 5 back in the depth direction, a gesture operation of sweeping the side of the partial region not overlapping with the drink 5 in the opposite direction, a gesture operation of picking up and moving the virtual display VD to a different location, or the like. Obviously, the virtual display VD is moved to a position within a range where a gesture operation is performable by the user U.

Retreat Example 9

Figure 23:
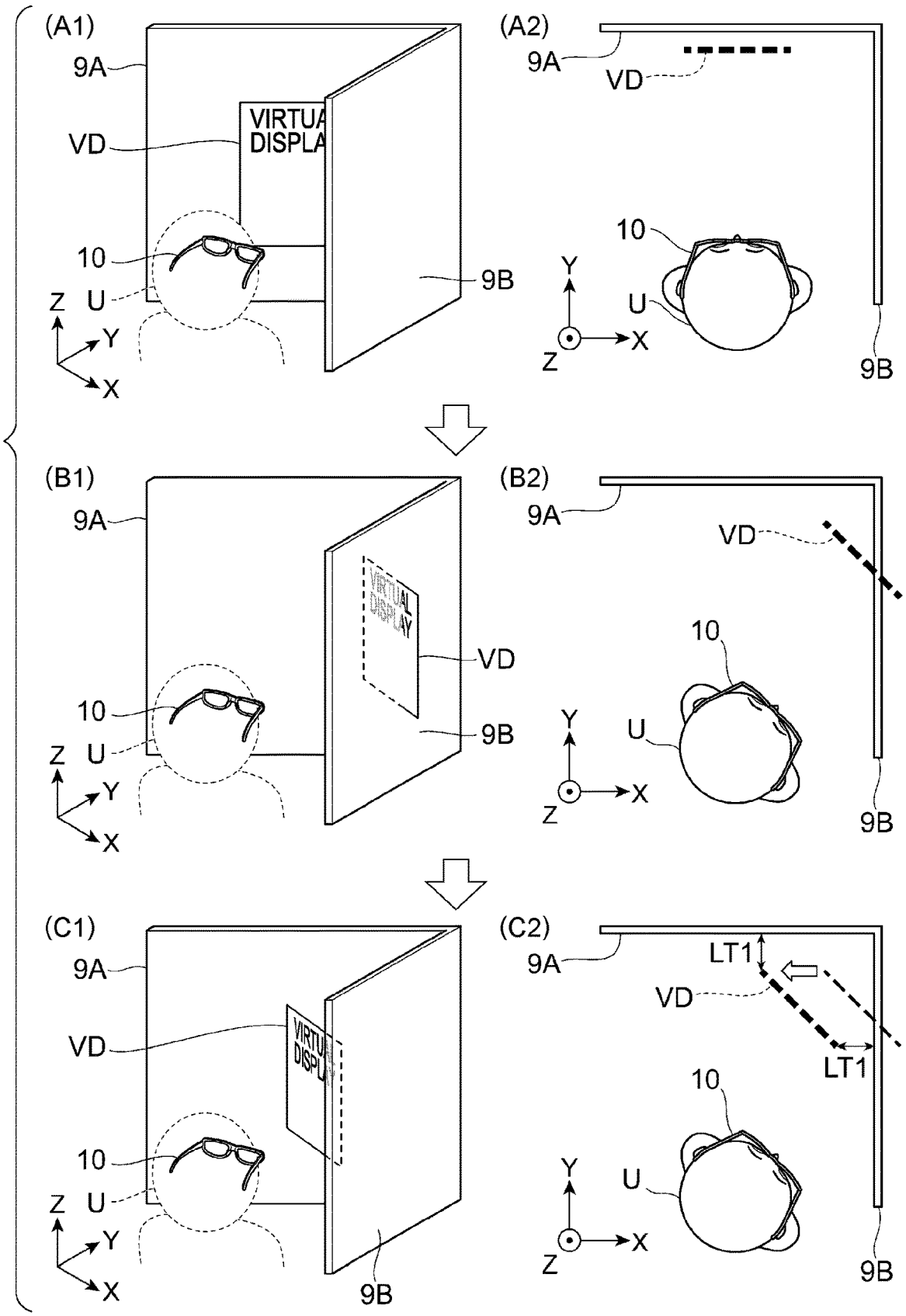
FIG. 23 is a diagram for explaining an example of retreating in the case where the virtual display overlaps with a nearby object, in which (A1) and (A2) illustrate the positional relationship between the virtual display and the user at the initial position, (B1) and (B2) illustrate the positional relationship between the virtual display and the user immediately after the user's head changes direction, and (C1) and (C2) illustrate the positional relationship between the retreated virtual display and the user.

FIG. 23 is a diagram for explaining an example of retreating in the case where the virtual display VD overlaps with the nearby real object RO, in which (A1) and (A2) illustrate the positional relationship between the virtual display VD and the user U at the initial position, (B1) and (B2) illustrate the positional relationship between the virtual display VD and the user U immediately after the head of the user U changes direction, and (C1) and (C2) illustrate the positional relationship between the retreated virtual display VD and the user U. In FIG. 23, portions that correspond to FIG. 15 are denoted with the same signs. Note that (A2), (B2), and (C2) of FIG. 23 all illustrate overhead views of the user U.

FIG. 23 assumes a case where the user U is positioned in a corner enclosed by two partitions 9A and 9B. However, the partitions 9A and 9B are an example, and the same situation may also occur near the walls of a room or the like. In addition, the case where all or part of the display position of the virtual display VD overlaps with the nearby real object RO may also occur in the other retreat examples described above. In the case of (A1) and (A2) of FIG. 23, the user U is facing the partition 9A, and the virtual display VD is also positioned in front of the partition 9A. Note that the other partition 9B exists to the right of the user U, but is visible to the user U and does interfere with the ability of the user U to perform a gesture operation on the virtual display VD.

(B1) and (B2) of FIG. 23 illustrate a case where the user U changes the direction of his or her body clockwise as seen from above. In this case, since the display of the virtual display VD is not constrained by the real space, the virtual display VD is still displayed directly in front of the user U. For this reason, in the example illustrated in (B2) of FIG. 23, a portion of the virtual display VD is at a position cutting through the partition 9B. With a real display, the arrangement in (B2) of FIG. 23 would not occur, but because the virtual display VD is a virtual object being perceived in the mind of the user U, the virtual display VD appears to exist inside the partition 9B.

In the case of a high level of immersion, there is a possibility that the user U may forget about the existence of the real partition 9B and attempt to perform a gesture operation on the portion of the virtual display VD overlapping with the partition 9B, and a body part or the like will collide with the partition 9B. However, if the virtual display VD is made to retreat the first distance LT1 horizontally from both of the partitions 9A and 9B like in (C1) and (C2) of FIG. 23, the user U is able to see the virtual display VD and continue performing gesture operations unimpeded without changing the direction of his or her head.

However, in the case of (C1) and (C2) of FIG. 23, it is attempted to move the display position of the virtual display VD the first distance LT1 away from both of the partitions 9A and 9B. As a result, there is a possibility that the retreat position candidate will be positioned inside the second range RB. In this case, a position the second distance LT2 away from the user U may be set as the retreat position where the virtual display VD is displayed, like in Retreat Example 3. In this case, there is a possibility that the distance between the virtual display VD and either or both of the partitions 9A and 9B will be shorter than the first distance LT1, but the possibility of a collision with a nearby real object RO when the user U performs a gesture operation is at least reduced compared to the initial position.

Additionally, there is a possibility that an overlap between a partial region of the virtual display VD and either or both of the partitions 9A and 9B may not be resolved even if the virtual display VD is displayed at a position the second distance LT2 away from the user U. In this case, it is desirable to use voice or the like to recommend that the user U move to a different position. For example, by outputting a voice message such as "Could you step back another 5 cm?" or "Could you turn your head counterclockwise a little more?", the possibility of a collision with a nearby real object RO when performing a gesture operation is reduced.

Note that the user U may also be alerted by changing the brightness or color tone of the portion of the virtual display VD that is overlapping with a nearby real object RO. For example, the brightness may be lowered to reduce the visibility so that the overlapping portion is not recognized as a target of a gesture operation. The affected region may also be displayed with a reddish color tone to inform the user U that the region is not suitable for receiving a gesture operation. On the other hand, it is also possible to provide a function of stopping the display of the virtual display VD in the case where a suitable retreat position for displaying the virtual display VD is not found. Note that if it becomes possible to display the virtual display VD again due to a change in the direction or the position of the user U, the display of the virtual display VD is resumed immediately.

Exemplary Embodiment 2

Figure 24:
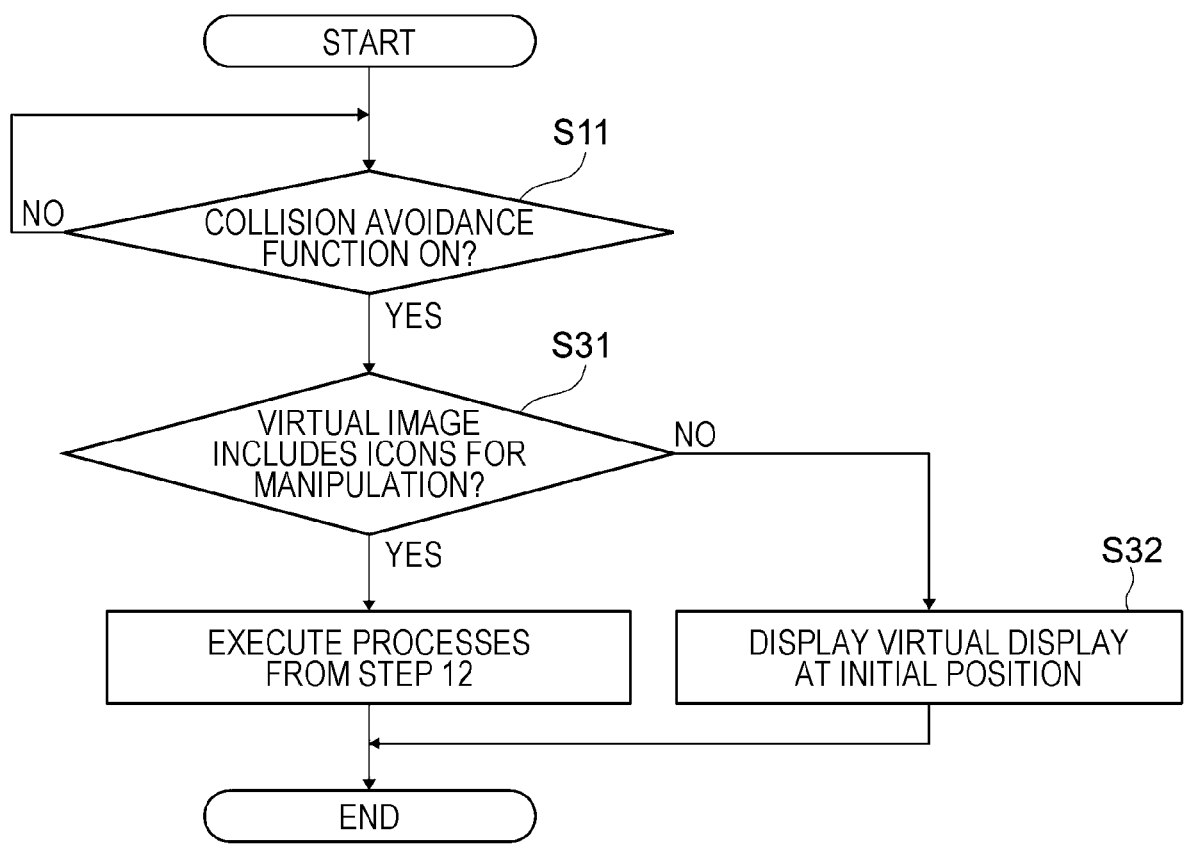
FIG. 24 is a flowchart for explaining an example of retreat operations for a virtual display according to Exemplary Embodiment 2.

The present exemplary embodiment describes a case of adding a function of not executing a retreat of the virtual display VD according to the collision avoidance function. FIG. 24 is a flowchart for explaining an example of retreat operations for the virtual display VD according to Exemplary Embodiment 2. In FIG. 24, portions that correspond to FIG. 14 are denoted with the same signs. In the present exemplary embodiment, if a positive result is obtained in step 11, the processor 201 (see FIG. 5) determines whether or not the virtual display VD includes icons for manipulation (step 31).

The icons for manipulation may be, for example, a slider bar, a keypad, a function key, the keys of a keyboard, an operation panel, a function button, a pull-down menu, a taskbar, a file icon, a folder icon, a thumbnail, an avatar, or a character. The icons may be a part of a virtual object in some cases, and may be standalone objects in other cases. The examples of the icons given above have various names, but the icons for manipulation include displays related to a user interface for inputting and outputting information with respect to a computer, calling functions, and representing differences between data files.

Consequently, an icon not associated with a function for performing operations, such as a portion of a display pattern or image, is not considered to be an icon for manipulation. Note that the determination in step 31 may also be considered to be a determination of whether or not the virtual display VD is display-only. Display-only refers to the case where only image or video content is displayed on the virtual display VD or the case where an editing function is off, for example.

If a positive result is obtained in step 31, the processor 201 executes the processes from step 12 in FIG. 14. On the other hand, if a negative result is obtained in step 31, the processor 201 displays the virtual display VD at the initial position (step 32). In other words, if a negative result is obtained in step 31, the processor 201 does not cause the virtual display VD to retreat. As a result, the virtual display VD continues to be displayed at a specific position in front of the xR device 10 (see FIG. 1). Note that a retreat of the display position is not executed, but if the user U changes the direction of his or her head for example, the virtual display VD moves to a predetermined position with respect to the xR device 10.

Figure 25A:
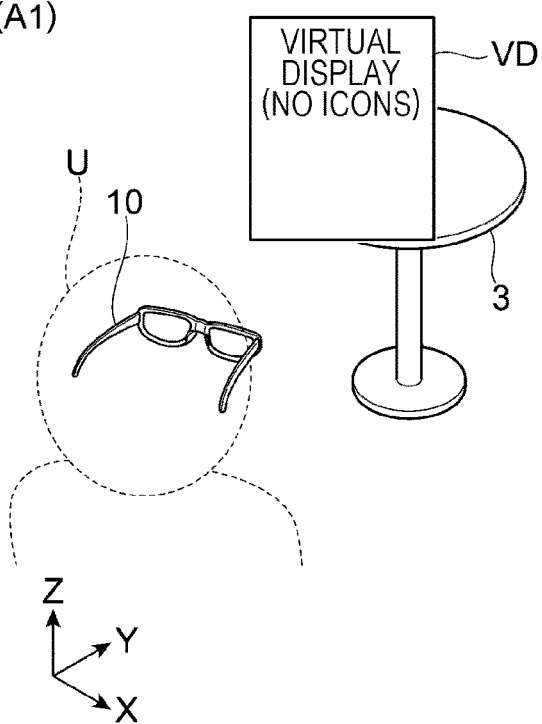
FIGS. 25A and 25B are diagrams for explaining processing operations in the case where the virtual display does not include icons for manipulation, in which (A1) and (A2) of FIG. 25A illustrate the positional relationship between the virtual display and the user at the initial position, and (B1) and (B2) of FIG. 25B illustrate the positional relationship between the virtual display and the user in the case where the virtual display does not include icons for manipulation.
Figure 25A:
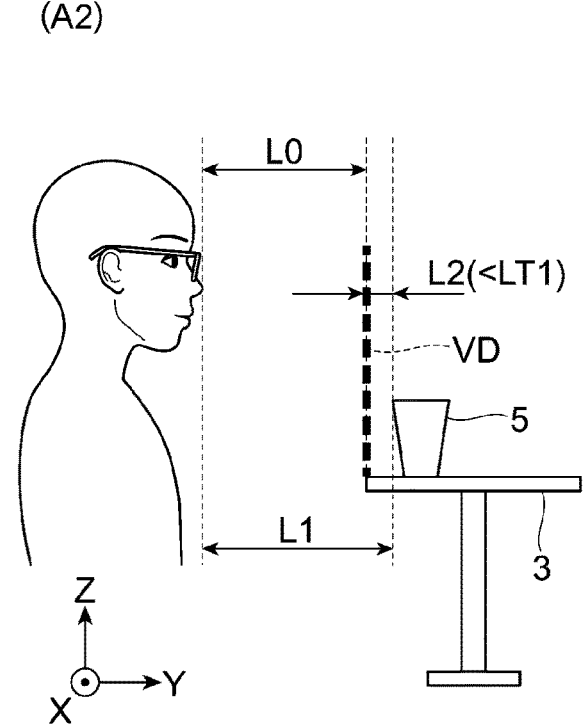
Figure 25B:
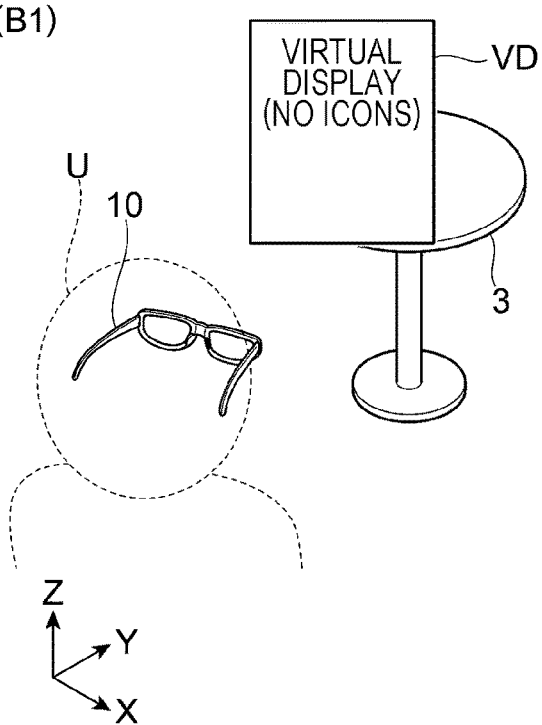
Figure 25B:
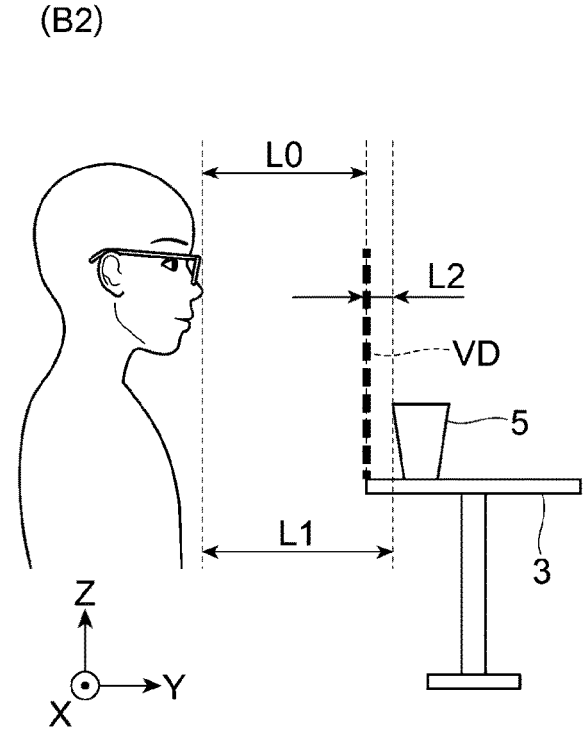

FIGS. 25A and 25B are diagrams for explaining processing operations in the case where the virtual display VD does not include icons for manipulation, in which (A1) and (A2) of FIG. 25A illustrate the positional relationship between the virtual display VD and the user U at the initial position, and (B1) and (B2) of FIG. 25B illustrate the positional relationship between the virtual display VD and the user U in the case where the virtual display VD does not include icons for manipulation. In FIGS. 25A and 25B, portions that correspond to FIG. 15 are denoted with the same signs. In the case of (A1) and (A2) of FIG. 25A, the distance L2 between the virtual display VD and the drink 5 is equal to or shorter than the first distance LT1. However, the virtual display VD does not include icons for manipulation. For this reason, the display position of the virtual display VD in (B1) and (B2) of FIG. 25B is the same as in (A1) and (A2) of FIG. 25A.

Exemplary Embodiment 3

Figure 26:
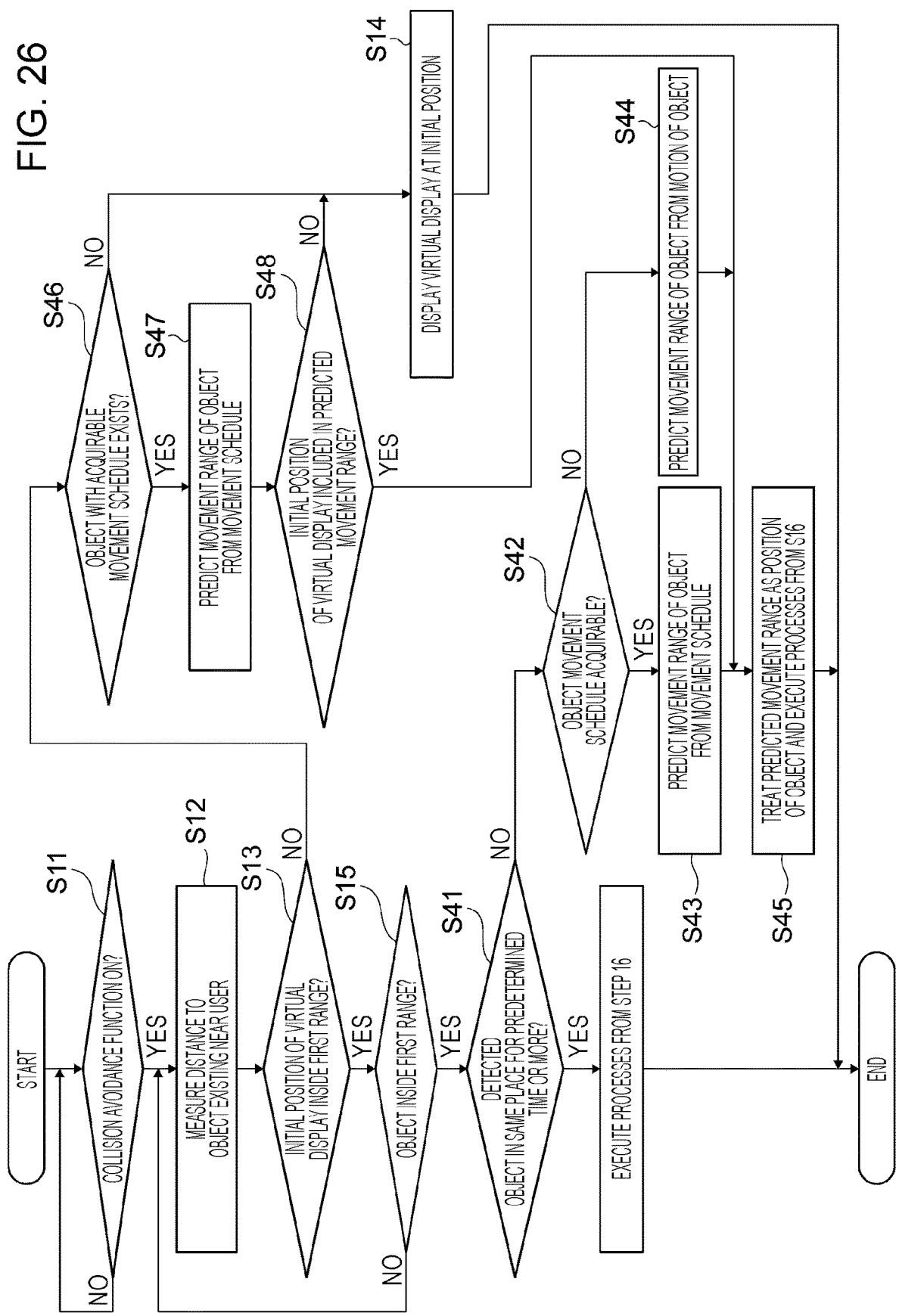
FIG. 26 is a flowchart for explaining an example of retreat operations for a virtual display according to Exemplary Embodiment 3.

The present exemplary embodiment describes a characteristic function in the case where the real object targeted for collision avoidance is a movable object. FIG. 26 is a flowchart for explaining an example of retreat operations for the virtual display VD according to Exemplary Embodiment 3. In FIG. 26, portions that correspond to FIG. 14 are denoted with the same signs. In the present exemplary embodiment, in the case where the collision avoidance function is on (that is, in the case of a positive result in step 11), the processor 201 (see FIG. 5) likewise measures the distance to a real object existing near the user (step 12).

Next, the processor 201 determines whether or not the initial position of the virtual display VD is inside the first range RA (step 13). If a positive result is obtained in step 13, the processor 201 determines whether or not the real object RO is inside the first range RA (step 15). If a negative result is obtained in step 15, the processor 201 returns to step 12. On the other hand, if a positive result is obtained in step 15, the processor 201 according to the present exemplary embodiment determines whether or not the detected real object RO has existed in the same place for a predetermined time or more (step 41).

The determination at this point roughly corresponds to a determination of whether or not the real object RO is a stationary object. The time used as a threshold may be an initial value or a value given by the user U. The threshold time may also be corrected after the fact. If a positive result is obtained in step 41, such as in the case where the real object RO is the drink 5 (see FIG. 1) for example, the processor 201 executes the processes from step 16 in FIG. 14. The processes in this case are for the case where the real object RO is a stationary object, and consequently are shared in common with Exemplary Embodiment 1.

If a negative result is obtained in step 41, the processor 201 proceeds to step 42. The case where a negative result is obtained in step 41 is the case where the real object RO existing inside the first range RA is determined to be a movable object. However, the range of a movable object is broad, and includes a drink 5 subsequently placed on the table 3 like in Retreat Example 2 described using FIG. 16, for example. However, a drink 5 that has been placed on the table 3 and has remained positioned in the same place for a certain time or longer is determined to be a stationary object. Moreover, movable objects also include objects such as a cleaning robot and curtains or tree branches swaying in the wind. In this way, there is a broad range of objects RO determined to be a movable object.

The processor 201 proceeding to step 42 determines whether or not a movement schedule of the real object RO is acquirable. A movement schedule is information prescribing estimated a movement path and estimated times when the real object RO will pass through each spot. However, a movement schedule in the broad sense may also be information that only provides a movement path. The case where a movement schedule is acquirable is the case where a movement schedule associated with the real object RO determined to be a movable object is presumed to exist and is acquirable by communication with the targeted real object RO directly or through another terminal, or is acquirable from a server or the like that manages the movement schedule.

Also, in the case where multiple movable objects having a movement schedule exist, the acquisition of a movement schedule demands that the real object RO determined to be a movable object is identifiable. In the case where any one of these conditions is not satisfied, the processor 201 obtains a negative result in step 42. Note that if a positive result is obtained in step 42, the processor 201 predicts the movement range of the real object RO from the movement schedule (step 43).

Because the movement range is a prediction, the position of the real object RO is predicted as a range with some degree of spread. The same also applies to the predictions in step 44 and step 47. On the other hand, if a negative result is obtained in step 42, the processor 201 predicts the movement range of the real object RO from the motion of the real object RO (step 44). For example, a movement range is predicted from the motion of curtains or tree branches.

If a movement range is predicted through the execution of step 43 or step 44, the processor 201 executes the processes from step 16 (see FIG. 14) by treating the predicted movement range as the position of the real object RO (step 45). Note that in the case where multiple objects RO are determined to be movable objects, the processes from step 42 are executed for each real object RO.

Returning to the description of step 13, if a negative result is obtained in step 13, the processor 201 determines whether or not a real object RO with an acquirable movement schedule exists (step 46). The real object RO in this case may be any real object RO positioned outside the first range RA, irrespectively of whether the real object RO exists at a position measurable by the positioning sensor 104 (see FIG. 2) or a position capturable by the camera 105 (see FIG. 2). If a positive result is obtained in step 46, the processor 201 predicts the movement range of the real object RO from the movement schedule (step 47).

Thereafter, the processor 201 determines whether or not the initial position of the virtual display VD is included in the predicted movement range (step 48). Although the term initial position is used here, this includes the display position at the time of the determination. If a positive result is obtained in step 48, the processor 201 proceeds to step 45. In other words, the processor 201 executes the processes from step 16 by treating the predicted movement range as the position of the real object. Note that if a negative result is obtained in step 46 or step 48, the processor 201 displays the virtual display VD at the initial position (step 14).

Retreat Example 1

Figure 27A:
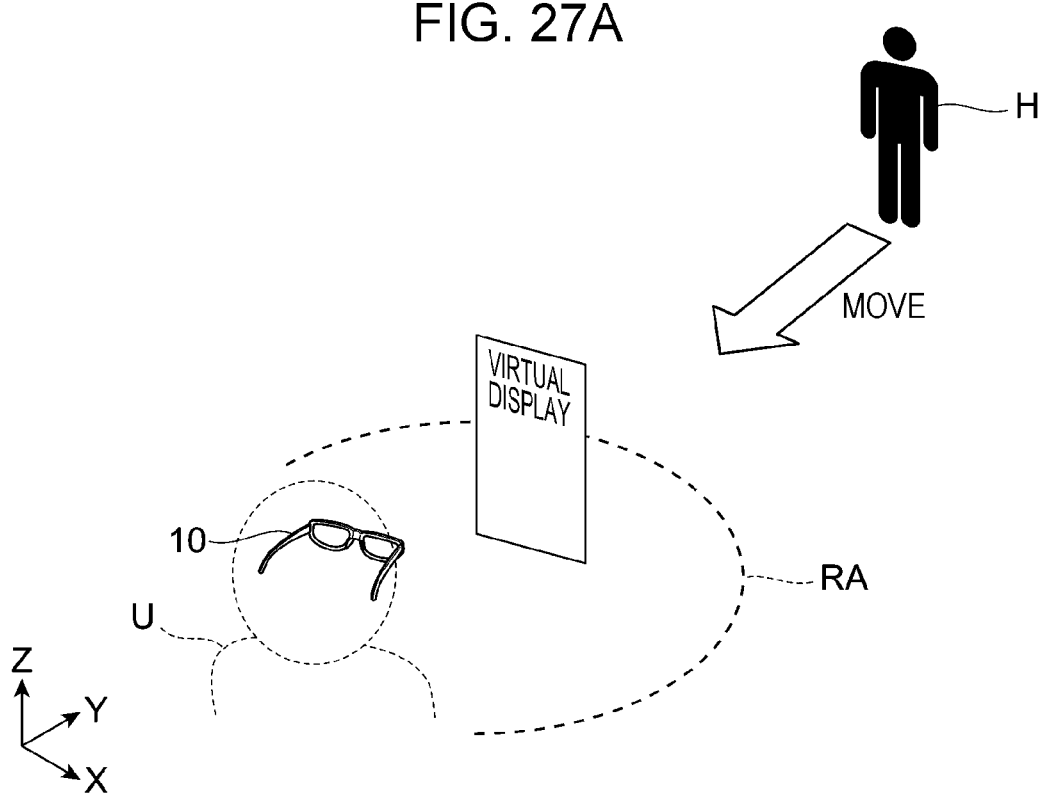
Figure 27B:
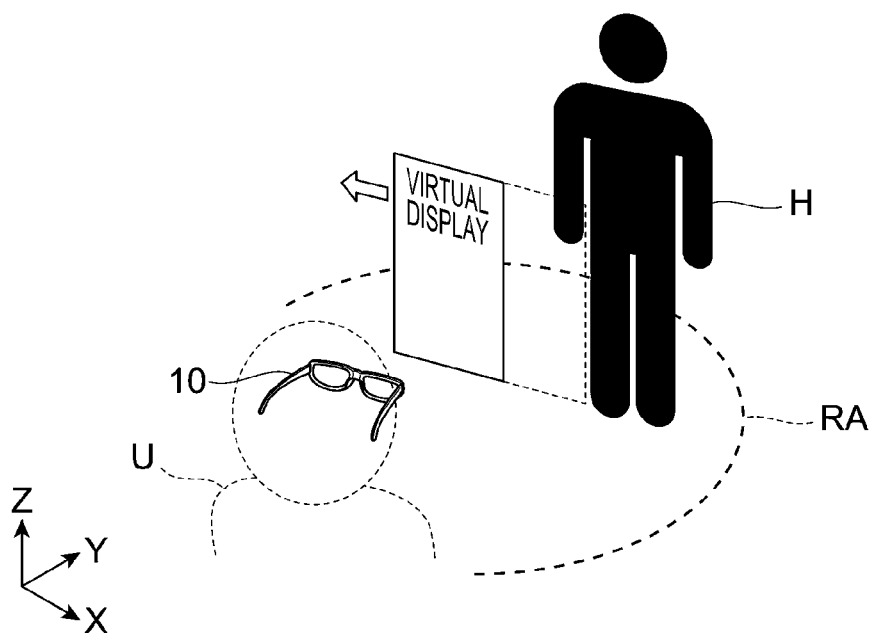

FIGS. 27A and 27B are diagrams for explaining an example of retreating in the case where a person H is approaching the user U, in which FIG. 27A illustrates a state in which the person H is moving toward the user U from outside the first range RA, and FIG. 27B illustrates a state in which the person H has entered the first range RA. In FIGS. 27A and 27B, portions that correspond to FIG. 15 are denoted with the same signs. In the case of FIG. 27A, there is no possibility of collision with the person H when a gesture operation is performed. For this reason, the virtual display VD is displayed at the initial position. Note that the case illustrated in FIG. 27A corresponds to the case where a negative result is obtained in step 46 (see FIG. 26) and step 14 (see FIG. 26) is executed.

On the other hand, in the case of FIG. 27B, the person H has entered the first range RA. In this case, the processor 201 detects the person H as a movable object. In other words, a negative result is obtained in step 41 (see FIG. 26). The movement schedule of the person H does not exist, and consequently a movement range is predicted from the motion of the person H, and a retreat of the virtual display VD is executed. This case corresponds to the case where a negative result is obtained in step 42 (see FIG. 26). In FIG. 27B, the virtual display VD is retreated in the direction away from the person H. In FIG. 27B, as a result of causing the virtual display VD to retreat to the left side of the user U, the user U is able to see the person H who has approached from behind the virtual display VD. Note that although Retreat Example 1 assumes the case where the person H approaches the user U, a similar retreat process is also executed in the case where the person H passes by the user U.

Retreat Example 2

Figure 28A:
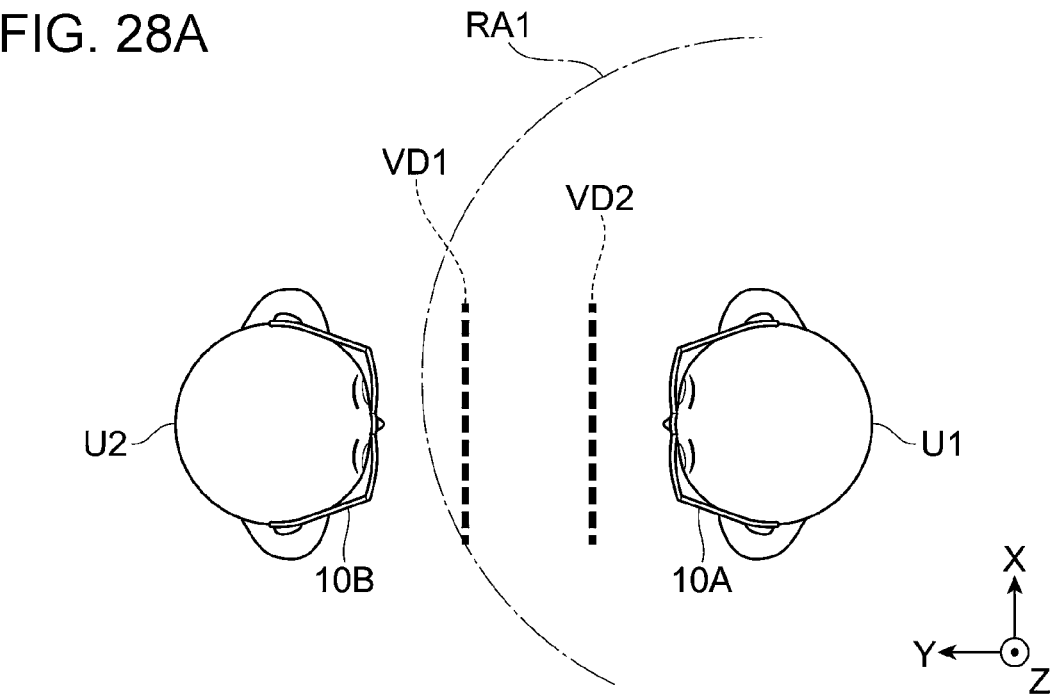
Figure 28B:
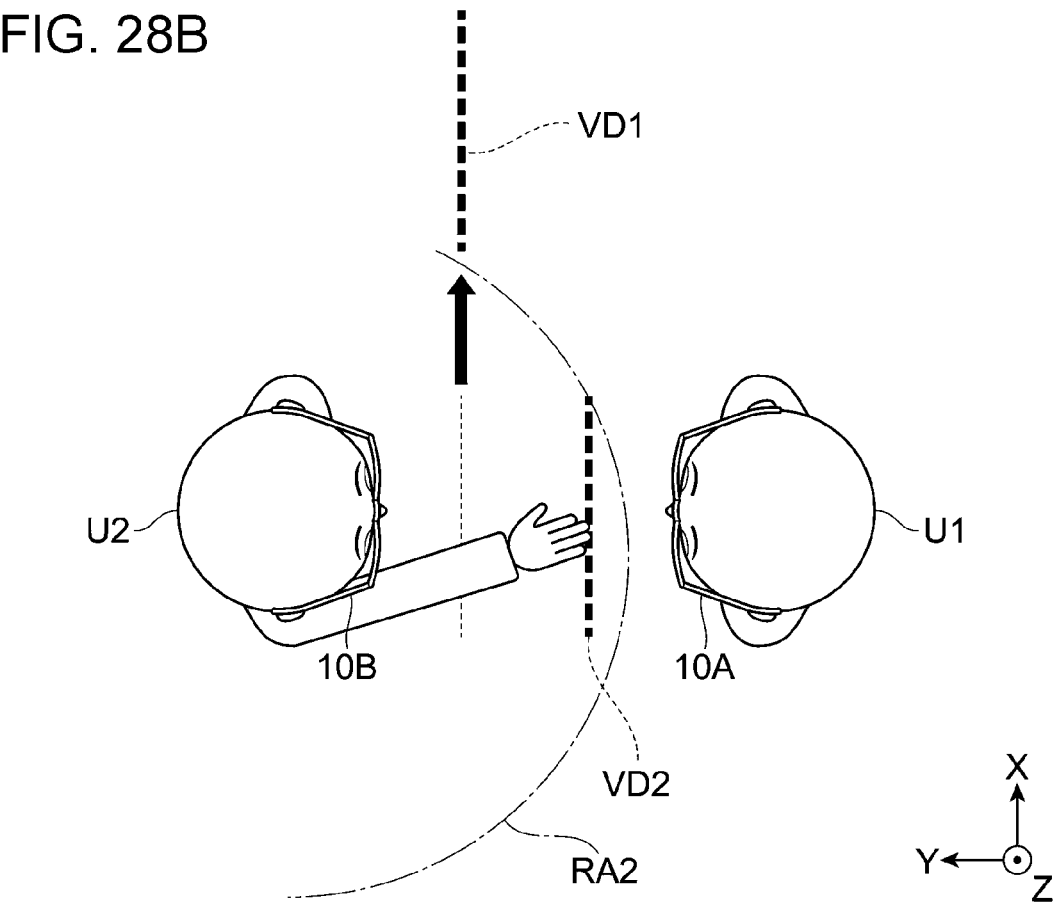

FIGS. 28A and 28B is a diagram for explaining an example of retreating in the case where two users U1 and U2 are seeing respective virtual displays VD1 and VD2, in which FIG. 28A illustrates a state in which the first range RA1 of the user U1 partially overlaps with the first range RA2 of the user U2 but each other's gesture operations are not recognized as movable objects, and FIG. 28B illustrates a case in which a gesture operation by the user U2 is recognized as a movable object within the first range RA1 of the user U1. In FIGS. 28A and 28B, portions that correspond to FIG. 15 are denoted with the same signs.

As illustrated in FIG. 28A, the user U1 and the user U2 are wearing respective xR devices 10A and 10B and are seeing respectively different virtual displays VD1 and VD2. The user U1 sees the virtual display VD1 and the user U2 sees the virtual display VD2. In other words, the user U1 does not perceive the existence of the virtual display VD2 and the user U2 does not perceive the existence of the virtual display VD1. In the case of FIG. 28A, neither the user U1 nor the user U2 is performing a gesture operation. For this reason, in FIG. 28A, the virtual displays VD1 and VD2 remain displayed at the initial position of each. This case corresponds to the case where a negative result is obtained in step 15 (see FIG. 26).

FIG. 28B illustrates a situation in which the right hand of the user U2 performing a gesture operation is included in the first range RA1 on the user U1 side and is consequently recognized as a movable object, and a process of causing the virtual display VD1 to retreat is executed. In FIG. 28B, the position of the virtual display VD1 seen by the user U1 before the retreat is illustrated with a dashed line. In the case where the virtual display VD1 is not retreated, the right hand of the user U1 and the right hand of the user U2 have overlapping ranges of motion, and there is a possibility that the hands will collide with one another. However, by causing the display position of the virtual display VD1 to retreat from the initial position before a gesture operation by the user U1 starts, a collision between the right hand of the user U1 and the right hand of the user U2 is preemptively avoided. This case corresponds to the case where a negative result is obtained in step 42 (see FIG. 26). Obviously, if a gesture operation by the user U1 enters the first range RA2 on the user U2 side, a retreat process is executed for the virtual display VD2.

Retreat Example 3

Figure 29A:
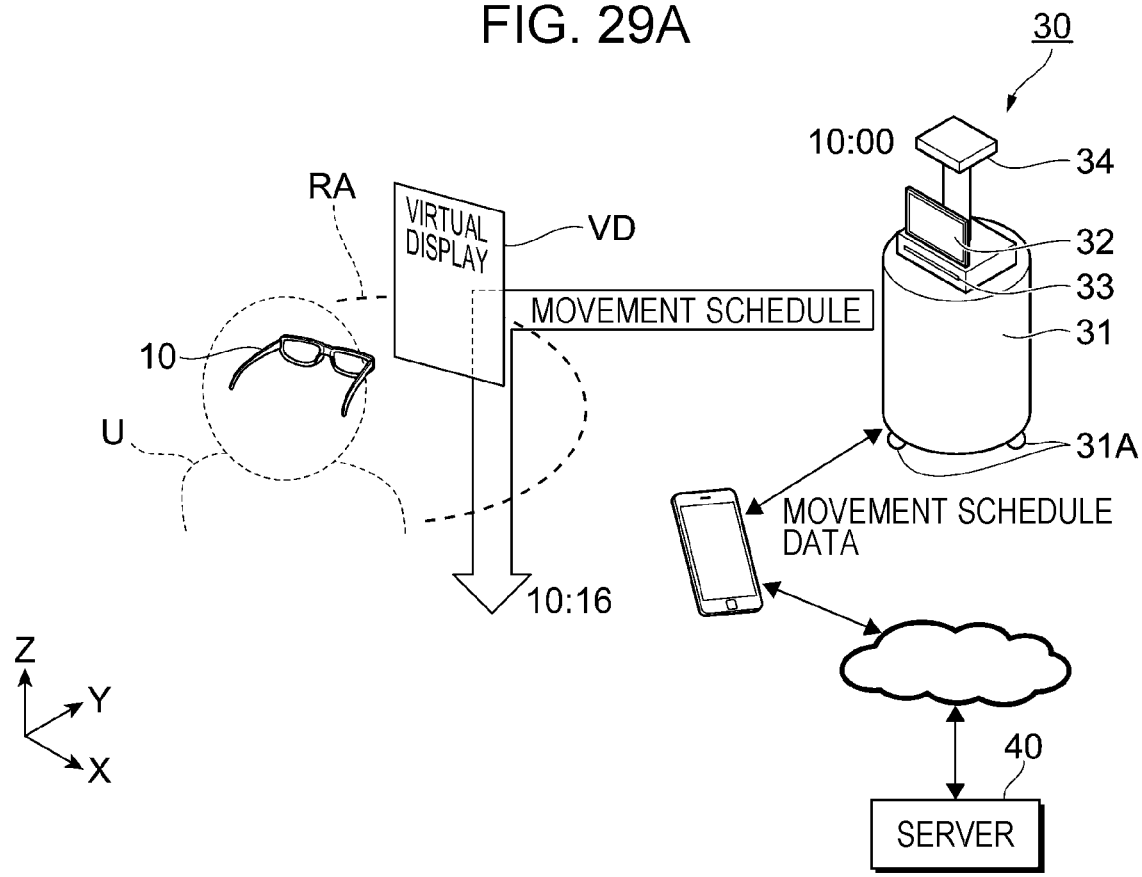
Figure 29B:
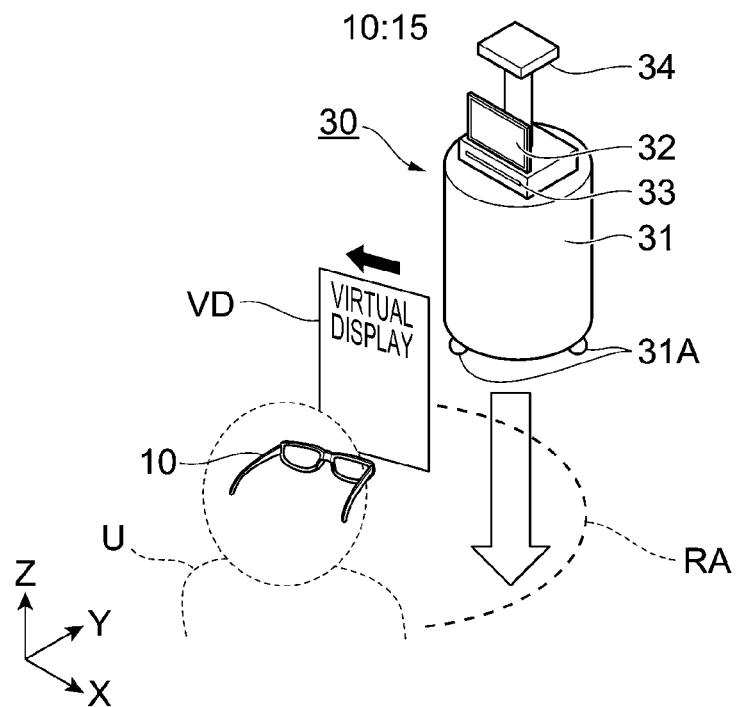

FIGS. 29A and 29B are diagrams for explaining an example of retreating in the case where a movement schedule of a mobile robot 30 is acquirable, in which FIG. 29A illustrates a state in which the robot 30 exists outside the first range RA and FIG. 29B illustrates a state in which the robot 30 has approached the first range RA. In FIGS. 29A and 29B, portions that correspond to FIG. 15 are denoted with the same signs. The robot 30 illustrated in FIG. 29A is a printing device provided with a movement function. Multiple wheels 31A are disposed on the bottom of a main body 31, and a driving motor is attached to at least one of the wheels 31A. Inside the main body 31, a mechanism that acts as a print engine as well as a control board and a communication device are disposed.

On the top of the main body 31, a display 32 used as a user interface and an output tray 33 for printed material are disposed. Additionally, a LiDAR unit 34 used to detect obstacles on a movement path and the like is installed above the main body 31. A processor provided on the control board determines a movement path on the basis of information from the LiDAR unit 34, and moves autonomously according to a movement schedule. Note that in addition to the movement schedule, a print schedule is also managed in the main body 31.

The robot 30 illustrated in FIG. 29A is capable of communicating with the information terminal 20 linked to the xR device 10. For this reason, the information terminal 20 is capable of acquiring the movement schedule from the robot 30. Note that the information terminal 20 is also capable of communicating with a server 40 that manages the movement schedule of the robot 30. For this reason, the information terminal 20 is also capable of acquiring movement schedule data from the server 40. The position of the robot 30 illustrated in FIG. 29A is the position for the time 10:00. According to the movement schedule, the robot 30 will move to be near the user U at 10:16.

The example in FIG. 29B illustrates the position of the robot 30 and the state of a process of causing the virtual display VD to retreat at 10:15. According to the movement schedule, the robot 30 moves to be near the user U at 10:15, and at this time, there is a possibility of approaching the display position of the virtual display VD. Accordingly, in FIG. 29B, the virtual display VD is made to retreat in anticipation of the approach of the robot 30. Note that in the case where the robot 30 enters the first range RA of the user U earlier than scheduled, a movement range is predicted from the motion of the robot 30 and a retreat of the virtual display VD is executed. This case corresponds to the case where a negative result is obtained in step 42 (see FIG. 26).

Retreat Example 4

Figure 30A:
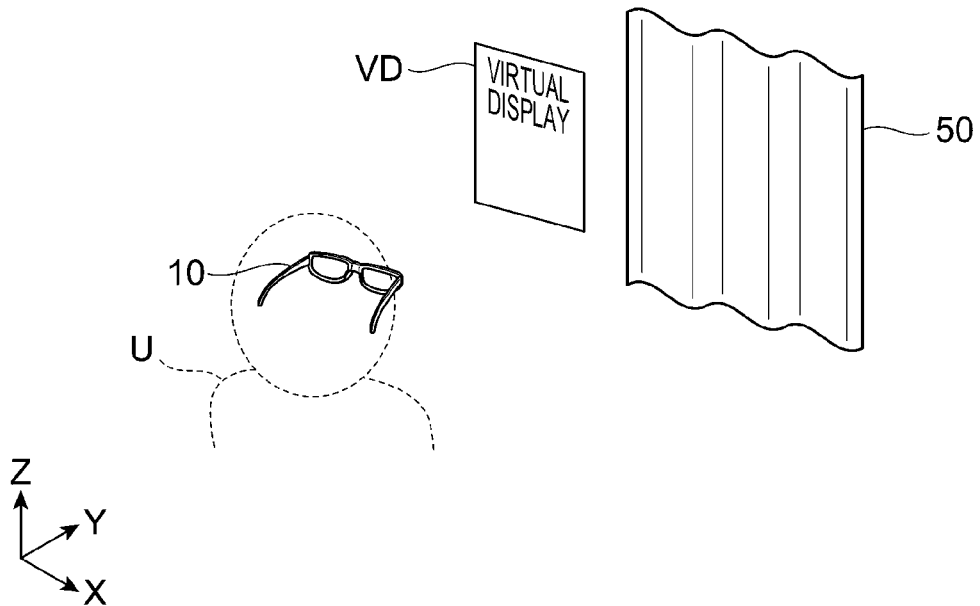
Figure 30B:
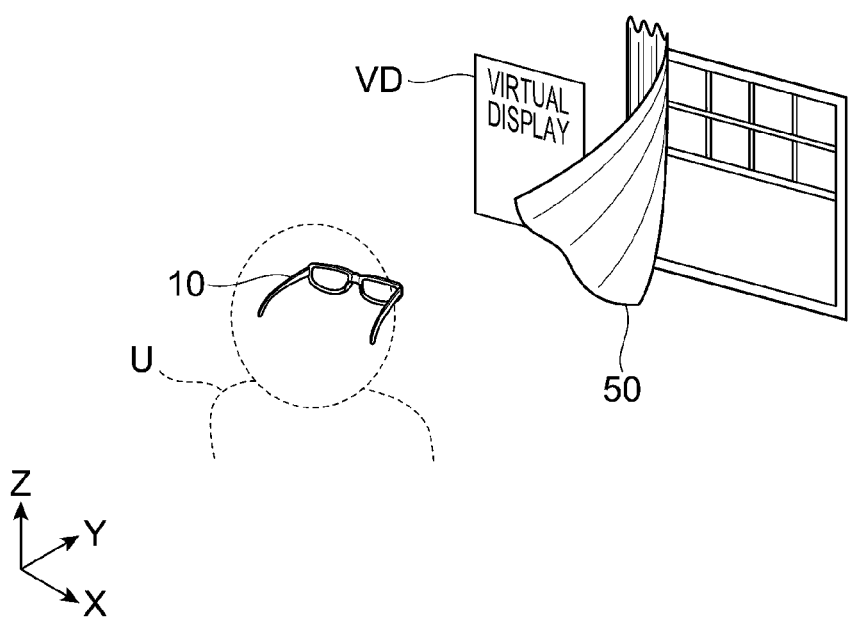

FIGS. 30A and 30B are diagrams for explaining an exception to retreating, in which FIG. 30A illustrates the display position of the virtual display VD in the case where a window curtain 50 is hanging down and FIG. 30B illustrates the display position of the virtual display VD in the case where the window curtain 50 is blown by wind and spreads out near the virtual display VD. In FIGS. 30A and 30B, portions that correspond to FIG. 15 are denoted with the same signs. In the processing operations described with reference to FIG. 26, in the case where a real object is determined to be a movable object, the retreat operations for the virtual display VD are executed on the basis of a movement range predicted from the motion of the real object.

However, even if the user U touches the curtain 50 when performing a gesture operation on the virtual display VD, the user U will not be injured, nor will the curtain 50 be damaged. The same also applies to the case of touching the slender branches and leaves of a tree outside. Accordingly, certain objects may be registered in advance as exceptions to the avoidance function, and in the case where a movable object is confirmed to be a real object registered as an exception through recognition processing performed on an image captured by the camera 105 (see FIG. 3), the avoidance function of the virtual display VD is disabled. In FIG. 30B, the movable object is the curtain 50 treated as an exception, and therefore the virtual display VD remains in the same display position even if the curtain 50 comes near the virtual display VD.

Exemplary Embodiment 4

Figure 31:
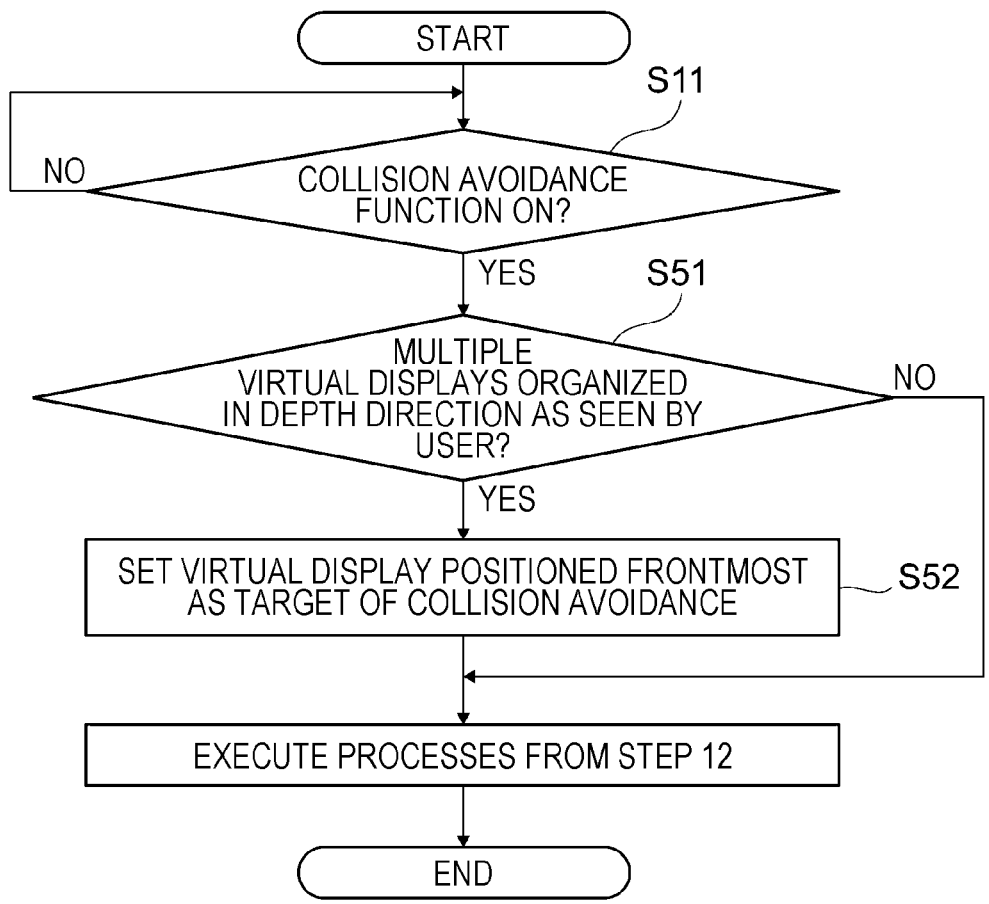
FIG. 31 is a flowchart for explaining an example of retreat operations for a virtual display according to Exemplary Embodiment 4.

The present exemplary embodiment describes a characteristic function in the case where multiple virtual displays VD are arranged in the depth direction from the perspective of the user U. FIG. 31 is a flowchart for explaining an example of retreat operations for the virtual display VD according to Exemplary Embodiment 4. In FIG. 31, portions that correspond to FIG. 14 are denoted with the same signs. In the present exemplary embodiment, the processor 201 (see FIG. 5) likewise determines whether or not the collision avoidance function is on (step 11).

If a positive result is obtained in step 11, the processor 201 determines whether or not multiple virtual displays VD are organized in the depth direction from the perspective of the user U (step 51). In the present exemplary embodiment, being organized in the depth direction refers to a state of being arranged generally in a line. Consequently, the multiple virtual displays VD do not have to be the same shape, nor does the distance between the multiple virtual displays VD have to be the same. If a negative result is obtained in step 51, the processor 201 executes the processes from step 12 (see FIG. 14). In other words, it is determined whether the initial position of the virtual display VD is inside the first range RA, whether a real object RO exists inside the first range RA, and the like, and the virtual display VD is made to retreat if appropriate. A negative result is obtained in step 51 in the case where there is only a single virtual display VD or the case where multiple virtual displays VD are arranged side by side, for example.

If a positive result is obtained in step 51, the processor 201 sets the virtual display VD positioned frontmost as the target of collision avoidance (step 52), executes the processes from step 12 (see FIG. 14) on the set virtual display VD. This is because the user U will perform a gesture operation on the virtual display VD positioned frontmost, and consequently, determining the positional relationship between the second or any subsequent virtual displays VD and the real object RO is unnecessary. Moreover, by not considering the positional relationship between the second or any subsequent virtual displays VD and the nearby real object RO, a reduced computational load is achieved.

Retreat Examples

Figure 32:
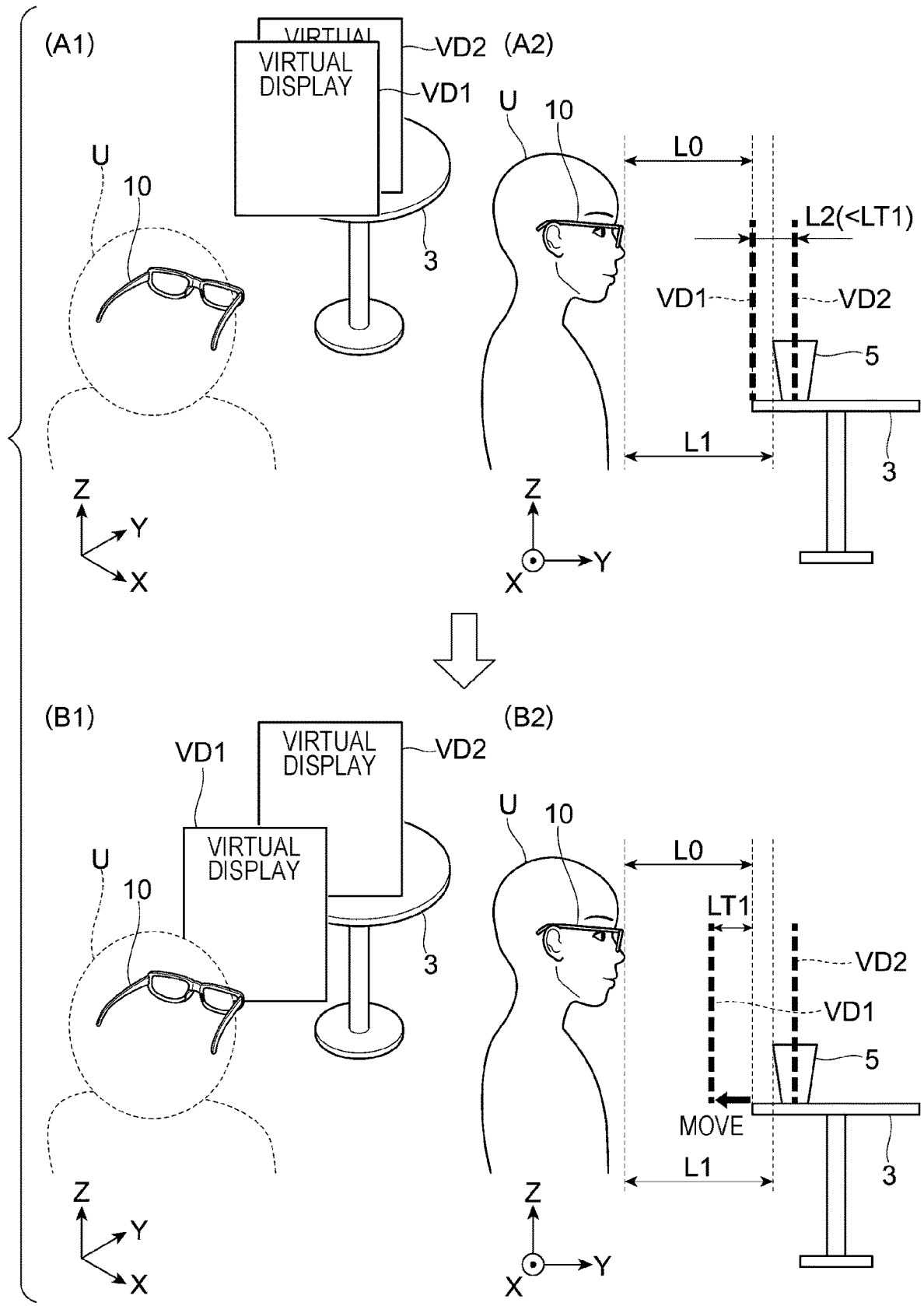
FIG. 32 is a diagram for explaining retreat operations in the case where two virtual displays are organized in the depth direction from the perspective of the user, in which (A1) and (A2) illustrate the positional relationship between the two virtual displays and the user at the initial position, and (B1) and (B2) illustrate how only the virtual display in front is made to retreat.

FIG. 32 is a diagram for explaining retreat operations in the case where two virtual displays VD1 and VD2 are organized in the depth direction from the perspective of the user U, in which (A1) and (A2) illustrate the positional relationship between the two virtual displays VD1 and VD2 and the user U at the initial position, and (B1) and (B2) illustrate how only the virtual display VD1 in front is made to retreat. In FIG. 32, portions that correspond to FIG. 15 are denoted with the same signs.

In the case of (A1) and (A2) of FIG. 32, the virtual display VD1 is the distance L2 closer to the user U from the drink 5, and the virtual display VD2 overlaps with the drink 5. In the case of not having the function according to the present exemplary embodiment, it would be necessary to perform the retreat process with respect to the drink 5 for each of the virtual displays VD1 and VD2. However, in the present exemplary embodiment, when the two virtual displays VD1 and VD2 are recognized as being arranged in a line, the target of the retreat is limited to only the virtual display VD1 positioned in front.

As a result, as illustrated in (B1) and (B2) of FIG. 32, the virtual display VD2 positioned behind overlaps with the drink 5, but the virtual display VD1 positioned in front is made to retreat the first distance LT1 forward from the drink 5. For this reason, the user U is able to perform a gesture operation on the virtual display VD1 without worrying about colliding with the drink 5. Note that the same also applies to the case where three or more virtual displays VD are organized.

Exemplary Embodiment 5

Figure 33:
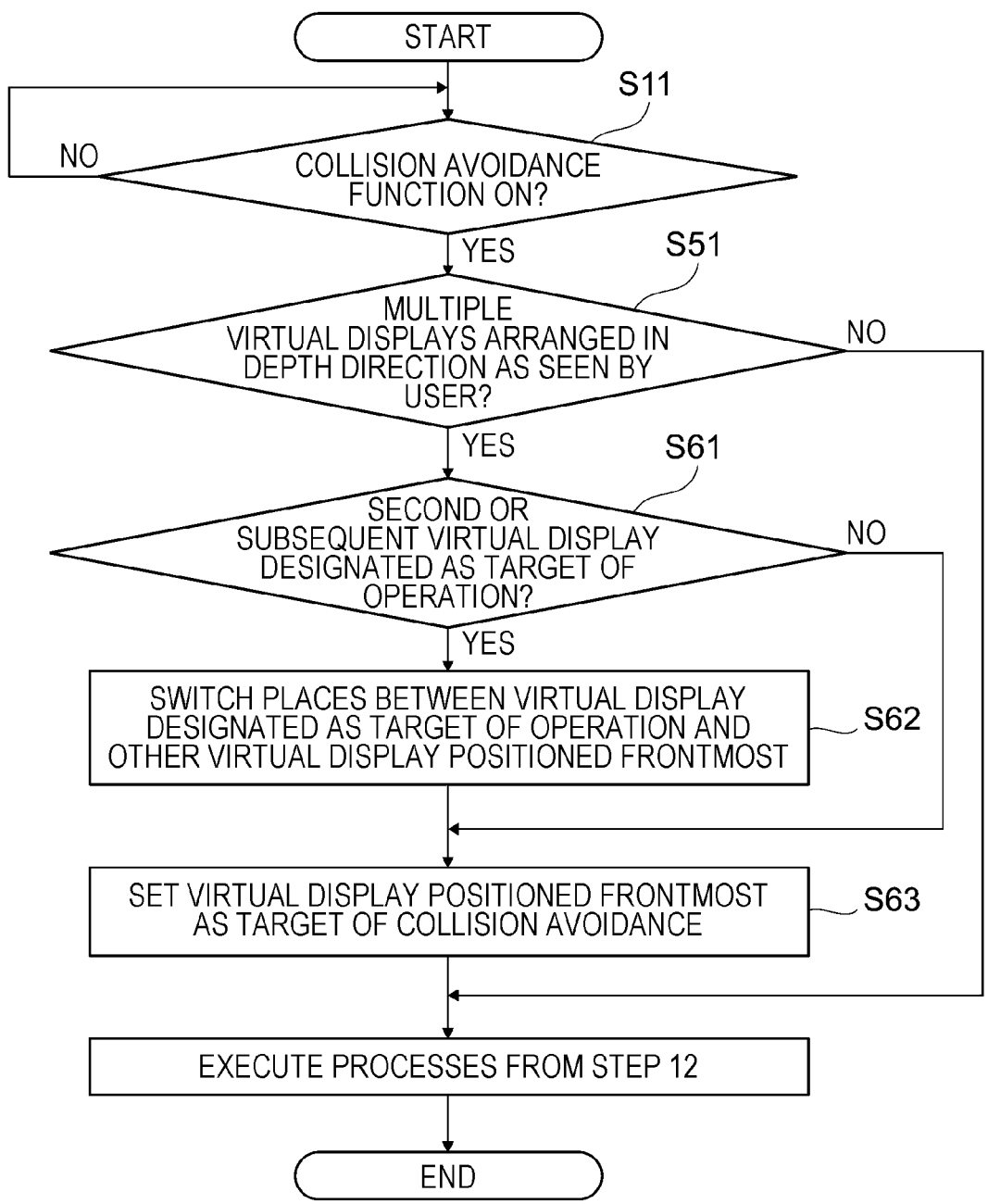
FIG. 33 is a flowchart for explaining an example of retreat operations for a virtual display according to Exemplary Embodiment 5.

The present exemplary embodiment describes a function in the case where multiple virtual displays VD are arranged in the depth direction from the perspective of the user U, the function being executed when the second or subsequent virtual display VD is designated. FIG. 33 is a flowchart for explaining an example of retreat operations for the virtual display VD according to Exemplary Embodiment 5. In FIG. 33, portions that correspond to FIG. 31 are denoted with the same signs. In the present exemplary embodiment, the processor 201 (see FIG. 5) likewise determines whether or not the collision avoidance function is on (step 11).

If a positive result is obtained in step 11, the processor 201 determines whether or not multiple virtual displays VD are organized in the depth direction from the perspective of the user U (step 51). If a negative result is obtained in step 51, the processor 201 executes the processes from step 12 (see FIG. 14). On the other hand, if a positive result is obtained in step 51, the processor 201 determines whether or not the second or subsequent virtual display VD is designated as the target of operation (step 61). In the case of the present exemplary embodiment, the virtual display VD is designated with a gesture operation by using a cursor proposed for the virtual display VD by Microsoft Corporation (registered trademark), for example.

Figure 34:
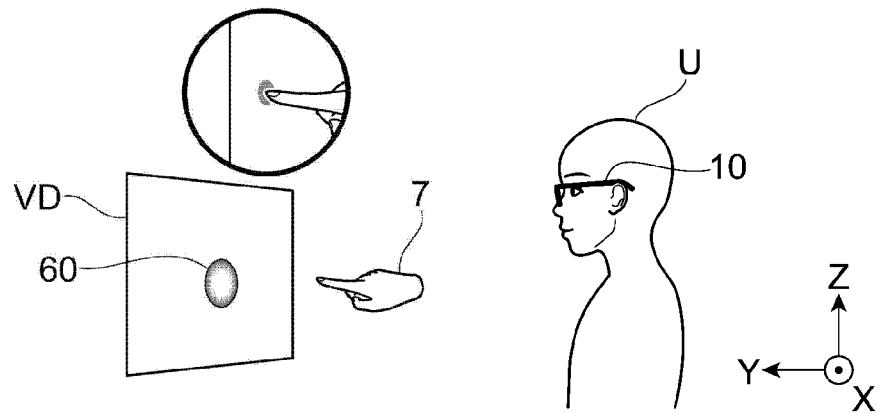
FIG. 34 is a diagram for explaining an example of a cursor used to manipulate the virtual display, in which (A) illustrates the cursor in the case where a fingertip on the user's right hand is distant from the virtual display, (B) illustrates the cursor in the case where the fingertip on the user's right hand approaches the virtual display, and (C) illustrates the cursor in the case where the fingertip on the user's right hand touches the virtual display.
Figure 34:
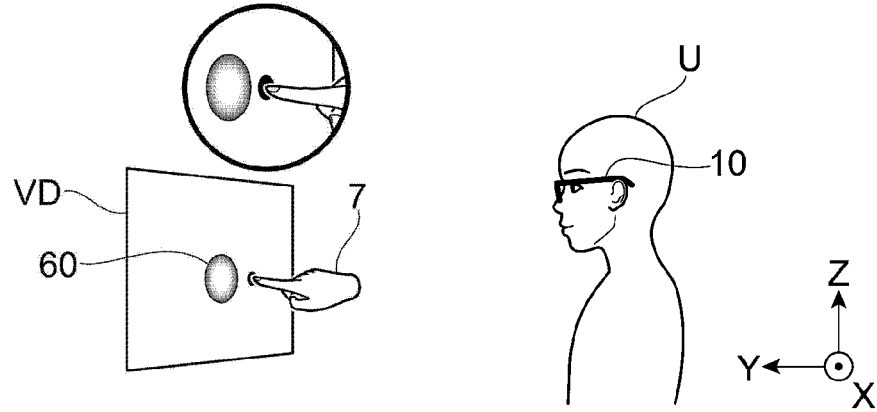
Figure 34:
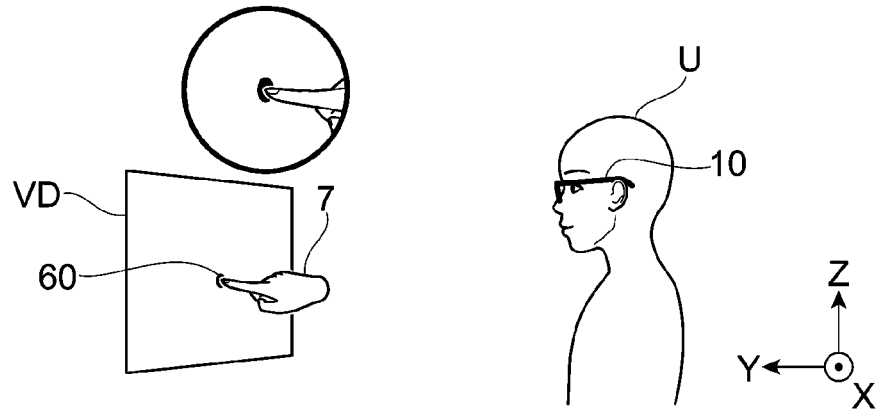

FIG. 34 is a diagram for explaining an example of a cursor 60 used to manipulate the virtual display VD, in which (A) illustrates the cursor 60 in the case where a fingertip on the right hand 7 is distant from the virtual display VD, (B) illustrates the cursor 60 in the case where the fingertip on the right hand 7 approaches the virtual display VD, and (C) illustrates the cursor 60 in the case where the fingertip on the right hand 7 touches the virtual display VD. Note that the distance between the virtual display VD and the fingertip of the right hand 7 is acquired using the positioning sensor 104 (see FIG. 3) and the camera 105 (see FIG. 3). By performing recognition processing on an image captured by the camera 105, the processor 201 (see FIG. 3) specifies the position of the fingertip of the user U inside the three-dimensional map generated using measurement results from the positioning sensor 104.

Obviously, the display position of the virtual display VD is not measured using the positioning sensor 104 or captured using the camera 105. However, because the processor 201 is aware of the display position of the virtual display VD inside the three-dimensional map, the processor 201 recognizes the positional relationship between the fingertip and the virtual display VD, and causes the recognized result to be reflected in the display position and size of the cursor 60. In the case of (A) of FIG. 34, the fingertip of the right hand 7 is distant from the virtual display VD, and therefore the diameter of the cursor 60 is larger than the other two. Note that in (A) of FIG. 34, an enlarged view of the area near the fingertip is illustrated inside a circle.

In (B) of FIG. 34, the state in which the fingertip of the right hand 7 has approached the virtual display VD is expressed by reducing the diameter and raising the brightness of the cursor 60. In (C) of FIG. 34, the state in which the fingertip of the right hand 7 has touched the virtual display VD is expressed by reducing the diameter further and raising the brightness of the cursor 60. From properties such as the display position and the diameter of the cursor 60, the user U is able to recognize relationships such as which virtual display VD is associated with a gesture operation by the user U.

Returning to the description of FIG. 33, if a positive result is obtained in step 61, the processor 201 causes the virtual display VD designated as the target of operation to switch places with the other virtual display VD disposed frontmost (step 62). Thereafter, or if a negative result is obtained in step 61, the processor 201 sets the virtual display VD positioned frontmost as the target of collision avoidance (step 63) and executes the processes from step 12 (see FIG. 14).

Retreat Examples

Figure 35:
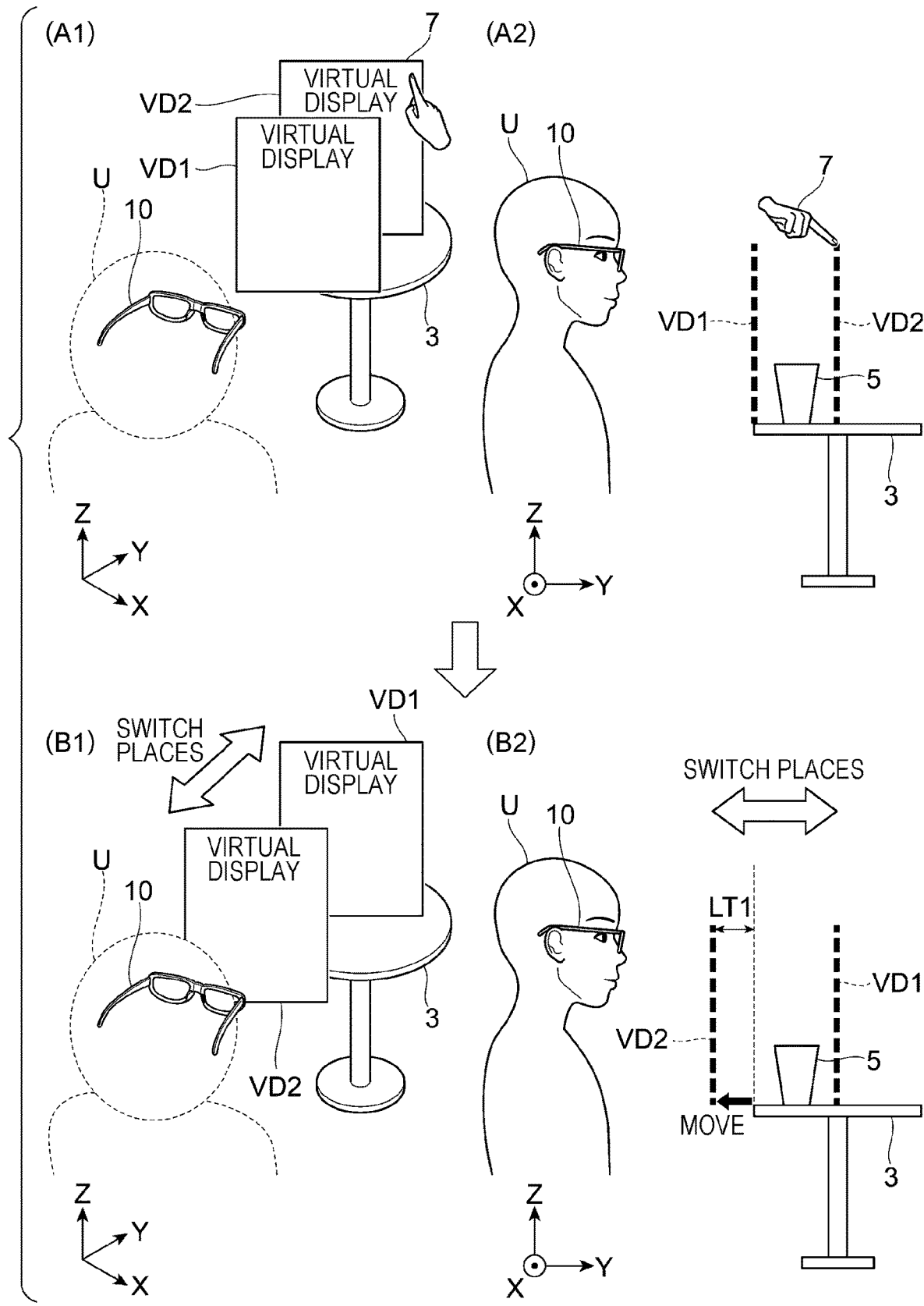
FIG. 35 is a diagram for explaining an example of causing the deeper of two virtual displays to retreat in the direction from a real object and toward the user, in which (A1) and (A2) illustrate the positional relationship between the two virtual displays and the user at the initial position, and (B1) and (B2) illustrate the positional relationship between the two virtual displays and the user after the retreat process is executed.

FIG. 35 is a diagram for explaining an example of causing the deeper virtual display VD2 of two virtual displays VD1 and VD2 to retreat in the direction from the real object RO and toward the user U, in which (A1) and (A2) illustrate the positional relationship between the two virtual displays VD1 and VD2 and the user U at the initial position, and (B1) and (B2) illustrate the positional relationship between the two virtual displays VD1 and VD2 and the user U after the retreat process is executed. In FIG. 35, portions that correspond to FIG. 15 are denoted with the same signs. In the case of (A1) and (A2) of FIG. 35, the user U brings the fingertip of the right hand 7 close to the virtual display VD2 positioned behind. If the distance between the fingertip and the virtual display VD2 reaches a predetermined distance or less, the processor 201 recognizes that the virtual display VD2 positioned behind has been designated.

In (B1) and (B2) of FIG. 35, the virtual display VD1 that had been positioned in front in the initial position is moved to the back, and the virtual display VD2 that had been positioned behind in the initial position is moved to the front. In other words, the virtual displays VD1 and VD2 have switched places compared to the order of arrangement in the initial position. Moreover, a retreat process is executed such that the virtual display VD2 moved to the front is also moved the first distance LT1 away from the drink 5. Incidentally, the display position of the virtual display VD1 positioned behind after switching places remains in the same place as the initial position. By adopting the function described in the present exemplary embodiment, there is a reduced possibility of a collision with the real object RO such as the drink 5 existing nearby when a gesture operation is performed on the designated virtual display VD2. Furthermore, the computational load demanded by the retreat process is reduced.

Exemplary Embodiment 6

Figure 36:
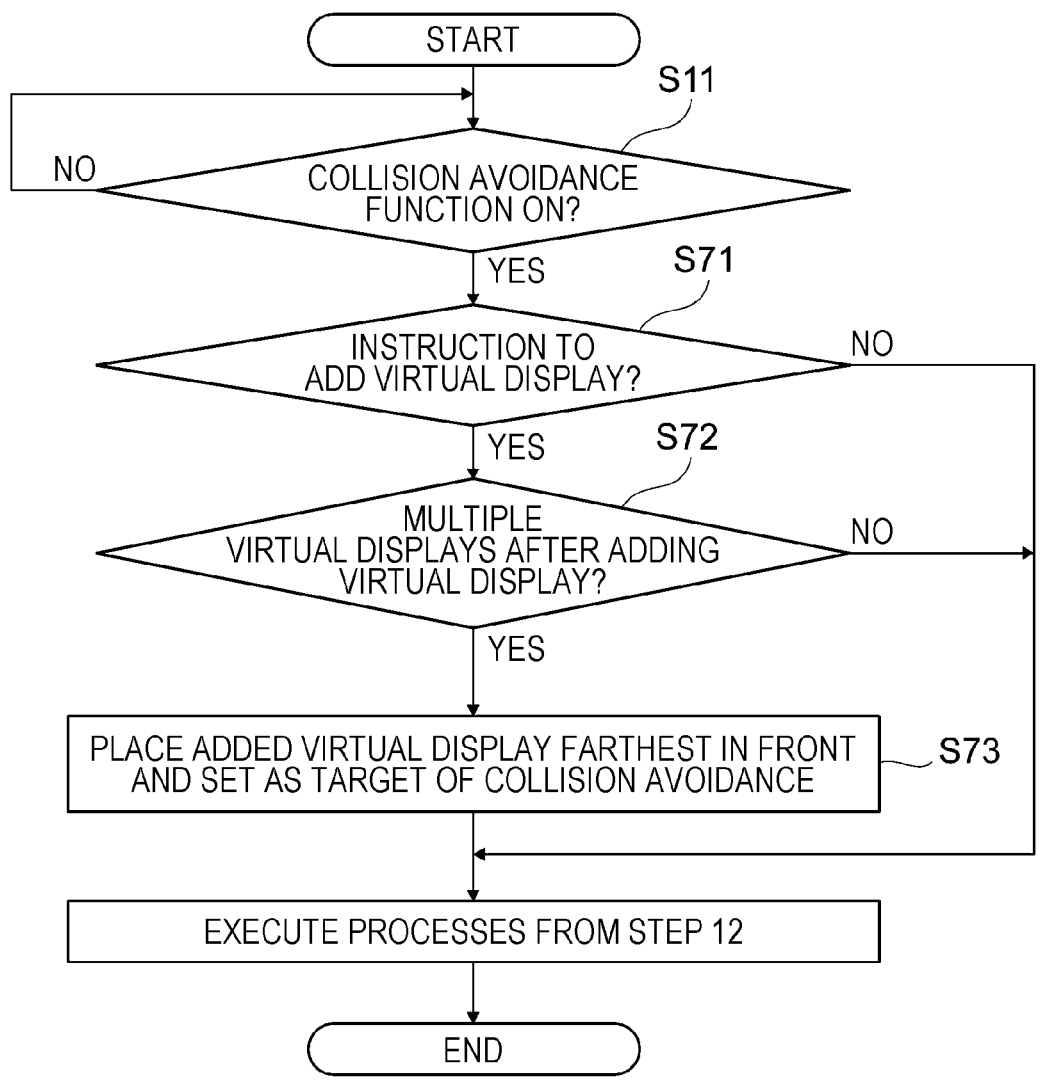
FIG. 36 is a flowchart for explaining an example of retreat operations for a virtual display according to Exemplary Embodiment 6.

The present exemplary embodiment describes a function executed in the case where a new virtual display VD to be displayed is added to an existing virtual display. FIG. 36 is a flowchart for explaining an example of retreat operations for the virtual display VD according to Exemplary Embodiment 6. In FIG. 36, portions that correspond to FIG. 14 are denoted with the same signs. In the present exemplary embodiment, the processor 201 (see FIG. 5) likewise determines whether or not the collision avoidance function is on (step 11).

If a positive result is obtained in step 11, the processor 201 determines whether or not there is an instruction to add a virtual display VD (step 71). The addition instruction may be an instruction to display a specific display through speech or the reception of an operation in association with the display of a separate window such as a pop-up display or a dialog box, for example. If a negative result is obtained in step 71, the processor 201 executes the processing operations from step 12 (see FIG. 14). If a positive result is obtained in step 71, the processor 201 determines whether or not there are multiple virtual displays VD after adding a virtual display VD (step 72).

In the case where an instruction to display a virtual display VD is given in a state in which no virtual display VD is being displayed, for example, the processor 201 obtains a negative result in step 72. If a negative result is obtained in step 72, the processor 201 likewise executes the processing operations from step 12 (see FIG. 14). If a positive result is obtained in step 72, the processor 201 places the added virtual display VD farthest in front and sets the added virtual display VD as the target of collision avoidance (step 73). In the case of the present exemplary embodiment, the added virtual display VD is disposed in front of the virtual display VD being displayed. For this reason, the display position of the virtual display VD currently being displayed is adjusted with reference to the display position of the newly added virtual display VD. After step 73, the processor 201 executes the processing operations from step 12 (see FIG. 14).

Retreat Examples

Figure 37:
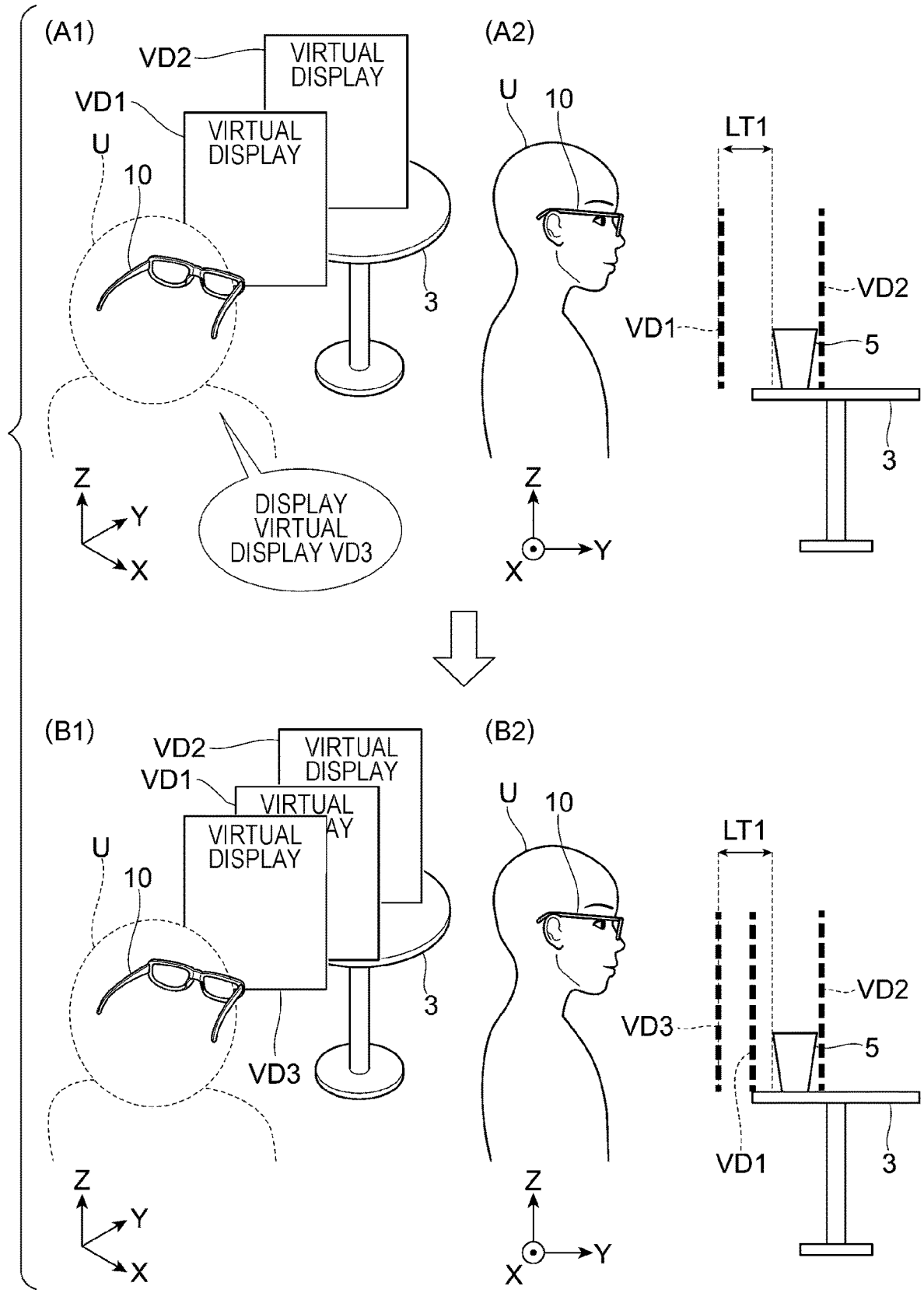
FIG. 37 is a diagram for explaining an example of retreating in the case where an instruction to add a third virtual display is given while two virtual displays are being displayed, in which (A1) and (A2) illustrate the positional relationship between the two virtual displays and the user at the initial position, and (B1) and (B2) illustrate the positional relationship between the three virtual displays and the user after the retreat process is executed.

FIG. 37 is a diagram for explaining an example of retreating in the case where an instruction to add a third virtual display VD3 is given while two virtual displays VD1 and VD2 are being displayed, in which (A1) and (A2) illustrate the positional relationship between the two virtual displays VD1 and VD2 and the user U at the initial position, and (B1) and (B2) illustrate the positional relationship between the three virtual displays VD1, VD2, and VD3 and the user U after the retreat process is executed. In FIG. 37, portions that correspond to FIG. 15 are denoted with the same signs.

In the case of (A1) and (A2) of FIG. 37, two virtual displays VD1 and VD2 are being displayed in front of the user U. By the way, the display position of the virtual display VD1 positioned in front is retreated the first distance LT1 from the drink 5 toward the user U. The user U in (A1) and (A2) of FIG. 37 is using speech to instruct the xR device 10 to "display virtual display VD3". The virtual display VD3 here is different from the virtual displays VD1 and VD2 being displayed. Consequently, the instruction given through speech in this case is determined to be an instruction to add a virtual display VD.

The xR device 10 receiving the instruction places the third virtual display VD3 inside the virtual space. (B1) and (B2) of FIG. 37 illustrate an example of the placement in the virtual space. In the case of (B1) and (B2) of FIG. 37, the virtual display VD3 arranged frontmost is displayed at a position retreated the first distance LT1 from the drink 5 toward the user U. However, this position is where the virtual display VD1 had been displayed before the addition instruction was received.

Consequently, the display position of the existing virtual display VD1 is adjusted to be at some position between the virtual display VD1 and the virtual display VD2 in the initial position. Even if the distance between the display positions of the second and subsequent virtual displays VD1 and VD2 and the drink 5 is less than the first distance LT1, a collision when performing a gesture operation is not a concern. This is because the user U treats the virtual display VD3 positioned frontmost as the target of a gesture operation, and even if the user U designates the virtual display VD1 or the virtual display VD2 as the target of operation, the display positions will switch places.

Exemplary Embodiment 7

Figure 38:
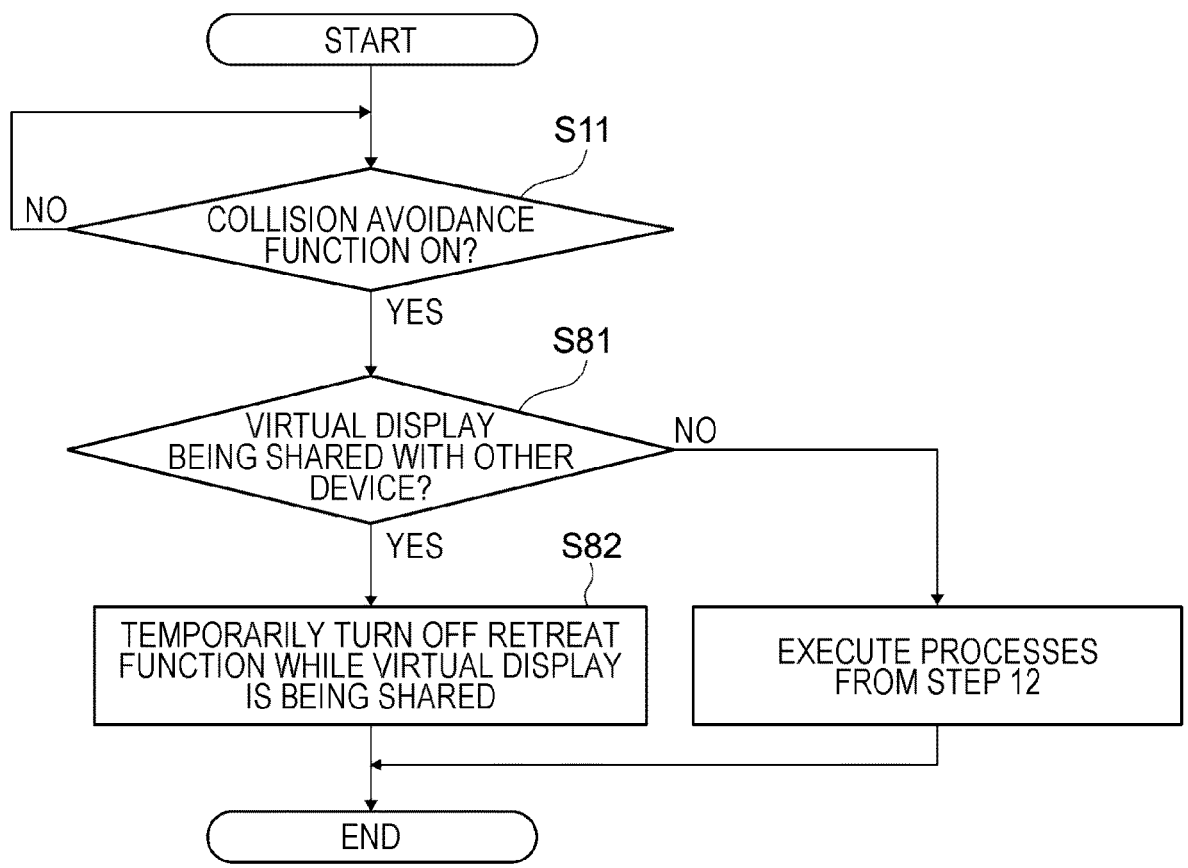
FIG. 38 is a flowchart for explaining an example of retreat operations for a virtual display according to Exemplary Embodiment 7.

The present exemplary embodiment describes a case where a single virtual display VD is shared by multiple persons. FIG. 38 is a flowchart for explaining an example of retreat operations for the virtual display VD according to Exemplary Embodiment 7. In FIG. 38, portions that correspond to FIG. 14 are denoted with the same signs. In the present exemplary embodiment, the processor 201 (see FIG. 5) likewise determines whether or not the collision avoidance function is on (step 11).

If a positive result is obtained in step 11, the processor 201 determines whether or not the virtual display VD is being shared with another device (step 81). In the case of the present exemplary embodiment, the sharing of the virtual display VD does not simply mean that the same virtual display VD is visible to multiple persons, but instead refers to a state where the display position of the virtual display VD is associated such that a single display appears to exist in a real space. Consequently, in the case where a shared virtual display VD is being viewed in totally separate locations, a negative result is obtained in step 81.

Figure 39A:
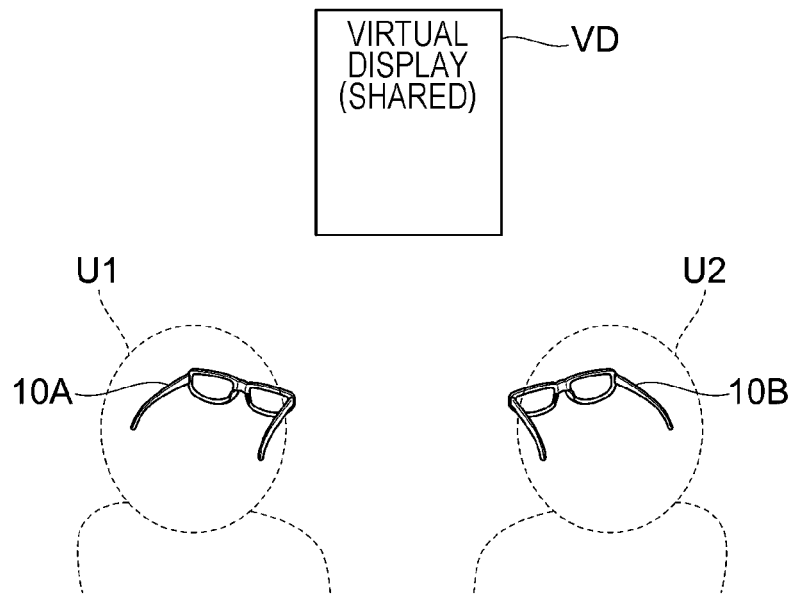
Figure 39B:
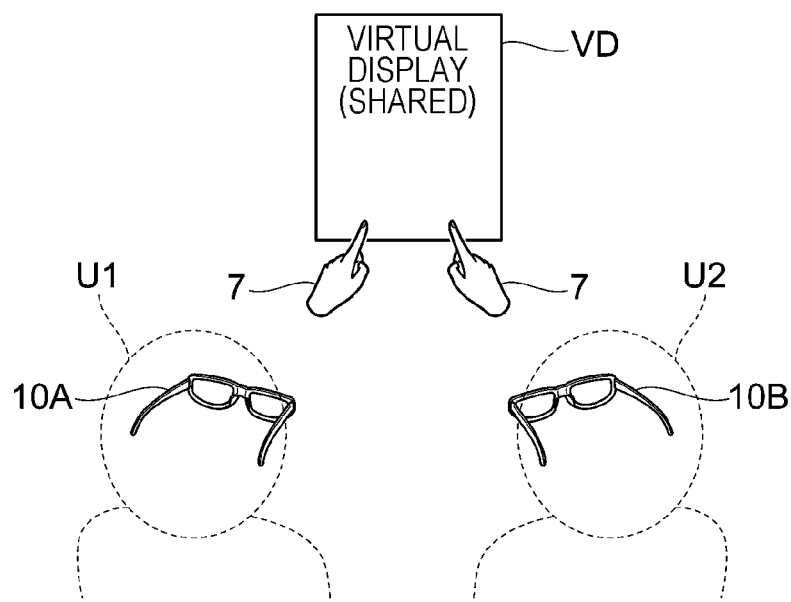

If a negative result is obtained in step 81, the processor 201 executes the processes from step 12 (see FIG. 14). If a positive result is obtained in step 81, the processor 201 temporarily turns off the retreat function while the virtual display VD is being shared (step 82). In other words, an exception process for the retreat process is executed. FIGS. 39A and 39B are diagrams for explaining a case where a single virtual display VD is shared by multiple persons, in which FIG. 39A illustrates a state before two users U1 and U2 perform gesture operations and FIG. 39B illustrates a state after the two users U1 and U2 start performing gesture operations. In FIGS. 39A and 39B, portions that correspond to FIG. 1 are denoted with the same signs.

In FIG. 39A, a single virtual display VD is shared by a user U1 and a user U2. However, the two users are not performing gesture operations on the virtual display VD. For this reason, a real object RO to retreat from is not detected near the virtual display VD by either the xR device 10A being worn by the user U1 or the xR device 10B being worn by the user U2. In FIG. 39B, both of the users U1 and U2 have started performing gesture operations. In this case, from the perspective of the user U1, the right hand 7 of the user U2 is recognized as a real object RO existing inside the first range RA. Similarly, from the perspective of the user U2, the right hand 7 of the user U1 is recognized as a real object RO existing inside the first range RA.

According to the other exemplary embodiments described above, in this case, the display position of the virtual display VD seen by the user U1 is made to retreat in the direction away from the right hand 7 of the user U2, and the display position of the virtual display VD seen by the user U2 is made to retreat in the direction away from the right hand 7 of the user U1. The virtual display VD is not real, and therefore it is technically possible to cause the virtual display VD to retreat in a different direction for each user. However, in the example of FIGS. 39A and 39B, the virtual display VD is being shared by the users U1 and U2, and consequently the retreat function is forcibly turned off. For this reason, the users U1 and U2 are able to proceed with a conversation or discussion while looking at the places where each other's fingers are pointing. In other words, although a physical display does not exist in a real space, substantially the same experience is shareable among multiple persons.

Exemplary Embodiment 8

Figure 40A:
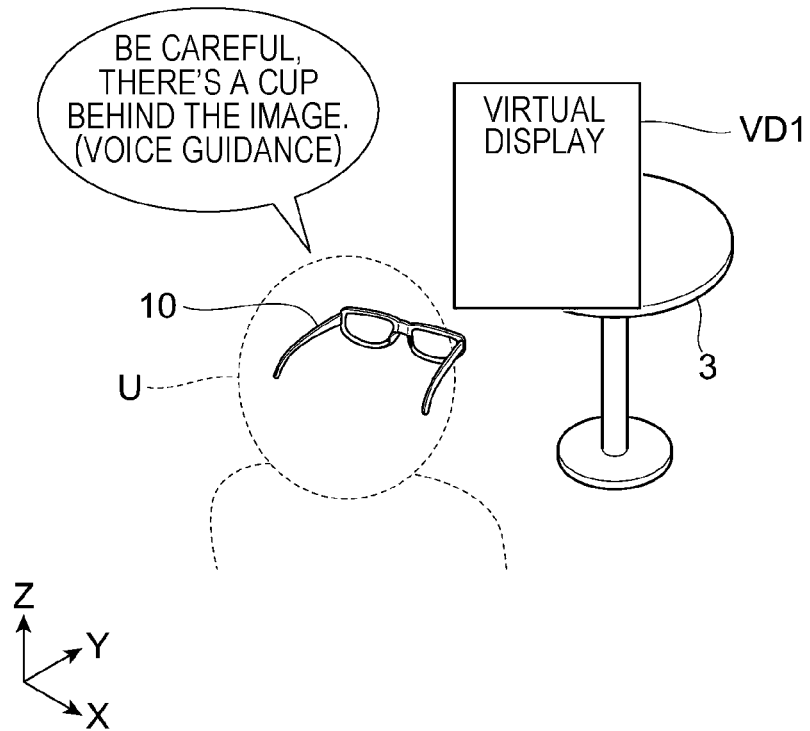
Figure 40B:
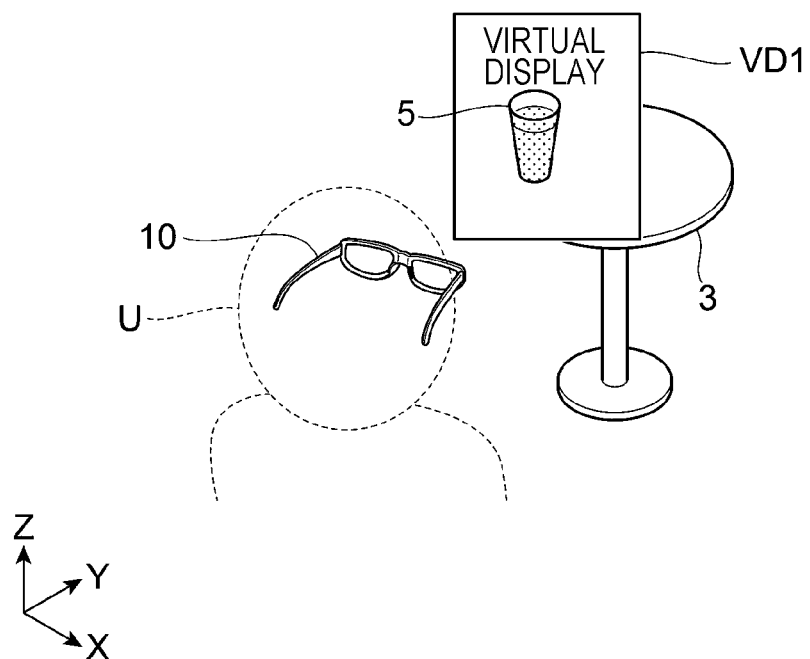

The present exemplary embodiment describes a method of giving an advance notification about the existence of a real object RO to be careful around when performing a gesture operation. FIGS. 40A and 40B are diagrams for explaining an example of a method of notifying the user U seeing the virtual display VD about the existence of a real object RO, in which FIG. 40A illustrates an example of notification through sound and FIG. 40B illustrates an example of notification through a combined image.

In the case of FIG. 40A, the user U is notified about the existence of the drink 5 behind the virtual display VD by voice guidance that says, "Be careful, there's a cup behind the image." or the like. The voice guidance is executed irrespectively of the execution of the retreat process. For example, the voice guidance is output in combination with the process of causing the virtual display VD to retreat. However, the voice guidance may also be output without executing the retreat process even if the distance between the virtual display VD and the drink 5 is less than the first distance LT1.

In the case of FIG. 40B, an image of the drink 5 captured by the camera 105 (see FIG. 2) is combined with the virtual display VD. When combining the image, it is possible to combine an unmodified image captured by the camera 105, but an image processed to emphasize the existence of the drink 5 may also be combined. For example, an image obtained by extracting the outline of the drink 5 may be combined with the virtual display VD, or the transmittance of the image of the drink 5 may be raised before combining the image with the virtual display VD. Obviously, the above are examples of image processing.

Figure 41A:
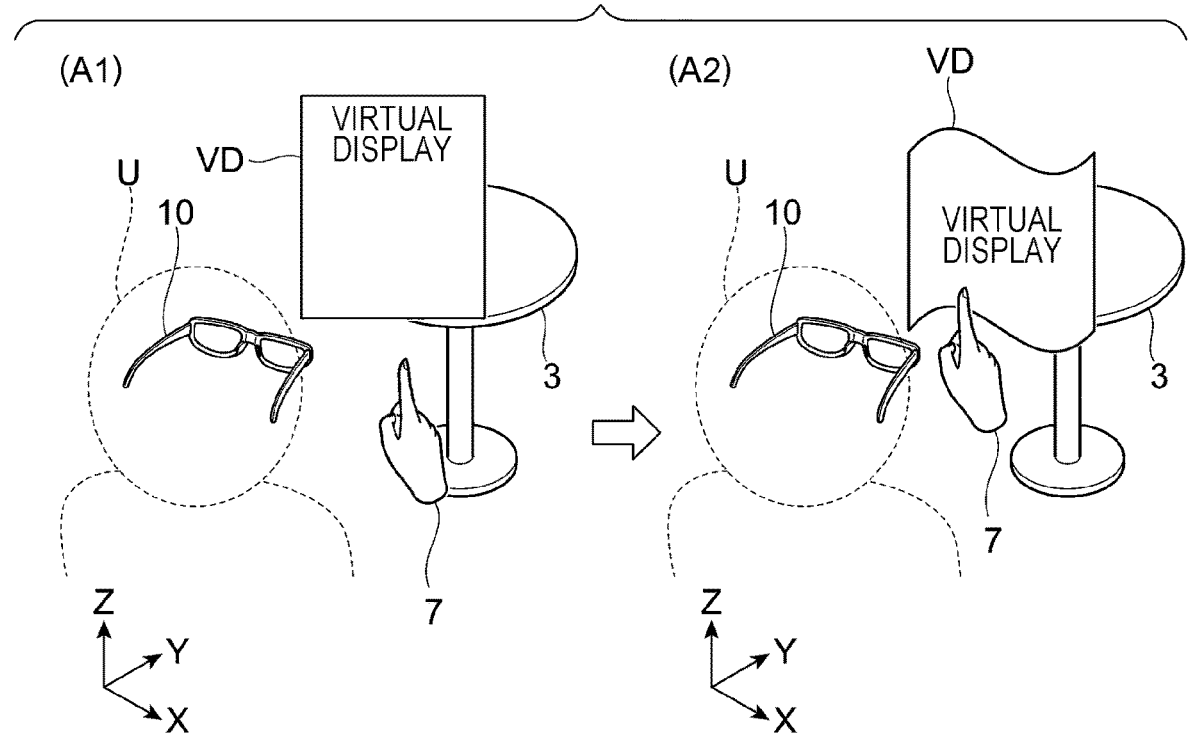
FIGS. 41A and 41B are diagrams for explaining an example of another method of notifying a user seeing a virtual display about the existence of a real object, in which (A1) and (A2) of FIG. 41A illustrate a method of deforming the virtual display, and (B1) and (B2) of FIG. 41B illustrate a method of combining the virtual display with an image alerting the user.
Figure 41B:
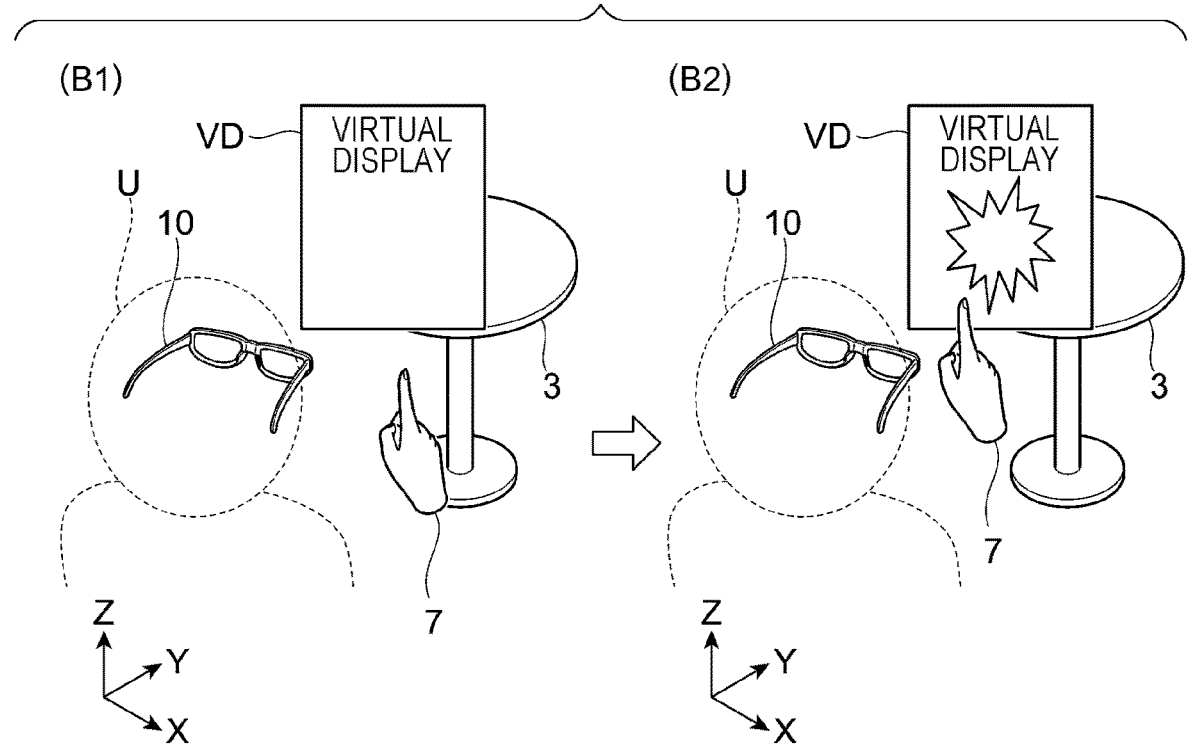

FIGS. 41A and 41B are diagrams for explaining an example of another method of notifying the user U seeing the virtual display VD about the existence of a real object RO, in which (A1) and (A2) of FIG. 41a illustrate a method of deforming the virtual display VD, and (B1) and (B2) of FIG. 41B illustrate a method of combining the virtual display VD with an image alerting the user U. In FIGS. 41A and 41B, portions that correspond to FIG. 15 are denoted with the same signs. In (A1) of FIG. 41A, the right hand 7 of the user U is away from the surface of the virtual display VD. Consequently, the virtual display VD remains in an initial state. On the other hand, in (A2) of FIG. 41A, the right hand 7 of the user U has approached the surface of the virtual display VD. At this time, if the distance between the right hand 7 and the virtual display VD is a predetermined threshold or less, the virtual display VD is deformed from the initial state to disturb or discomfort the user U.

Also, the deformation in (A2) of FIG. 41A is an example, and the virtual display VD may also be deformed into a shape that is split to the left and right. In this case, if the real object RO hidden behind the virtual display VD is visible through the gap, the user U will not knock over the real object RO with his or her right hand 7. Obviously, if the user U is given advance notice of the existence of the real object RO behind through the deformation of the virtual display VD, a collision with the real object RO is preemptively avoided. In the case of (B1) of FIG. 41B, the right hand 7 of the user U likewise is away from the surface of the virtual display VD. Consequently, the virtual display VD remains in an initial state. On the other hand, in (B2) of FIG. 41B, the right hand 7 of the user U has approached the surface of the virtual display VD. However, in the case of (B2) of FIG. 41B, a picture or image representing danger is superimposed onto the center of the virtual display VD. In this case, the user U likewise is able to receive advance notice about the danger of touching the virtual display VD.

Exemplary Embodiment 9

Figure 42:
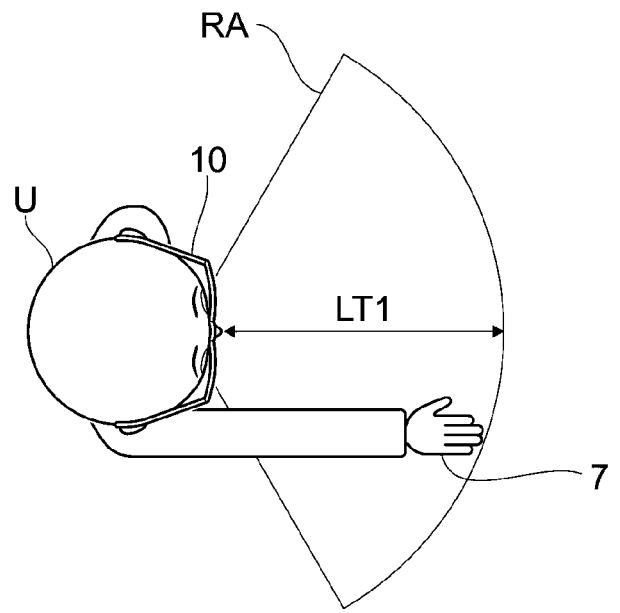
FIG. 42 is a diagram for explaining the adjustment of a threshold prescribing the first range according to a history of measuring the range of motion of the user's right hand when performing a gesture operation on the virtual display, in which (A) illustrates the first range according to an initial setting and (B) illustrates the first range adjusted according to the range of motion of the gesture operation by the user.
Figure 42:
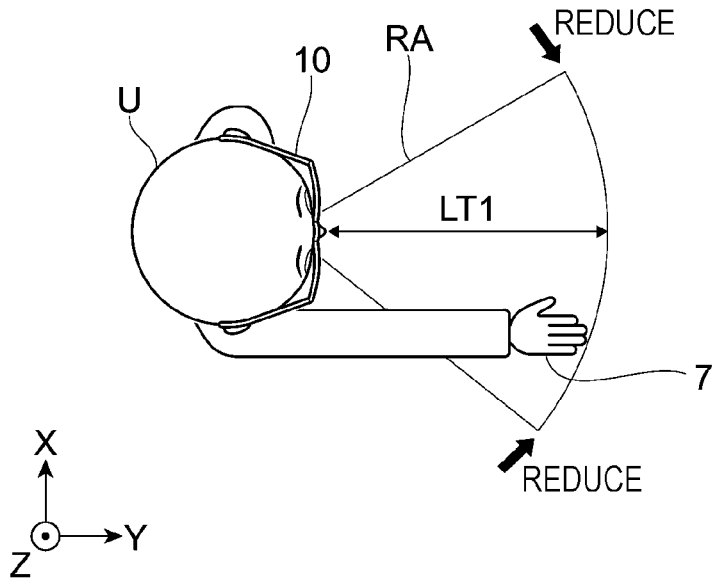

The present exemplary embodiment describes a function of changing or adjusting a threshold or the like prescribing the first range RA on the basis of a measurement history of gesture operations performed on the virtual display VD by the user U. FIG. 42 is a diagram for explaining the adjustment of a threshold prescribing the first range RA according to a history of measuring the range of motion of the right hand 7 when performing a gesture operation on the virtual display VD, in which (A) illustrates the first range RA according to an initial setting and (B) illustrates the first range RA adjusted according to the range of motion of the gesture operation by the user U. In FIG. 42, portions that correspond to FIGS. 6A and 6B are denoted with the same signs. Note that (A) and (B) of FIG. 42 both illustrate overhead views of the user U.

In the case of (A) of FIG. 42, the first range RA is symmetrical with respect to the forward direction of the user U. By the way, the positioning sensor 104 and the camera 105 are attached to the xR device 10 (see FIG. 1) and continually measure the distance to a real object RO existing near the user U. The target of positioning in this case also includes a body part or the like being used to perform a gesture operation by the user U wearing the xR device 10. Consequently, the range of motion of the body part or the like associated with a gesture operation may be measured in an ongoing way and accumulated as a measurement history.

Note that the body part of the like of the user U is identifiable by image processing performed by the camera 105.

The first range RA illustrated in (B) of FIG. 42 is the first range RA that has been changed or adjusted using a result of analyzing the history of accumulated measurement data. In this example, the portions on the left and right sides of the user U are reduced. As a result, the area in the horizontal plane of the changed first range RA is reduced to approximately half the area of the initial state. If the area in the horizontal plane of the first range RA decreases, or in other words if the volume in three dimensions decreases, the range of measurement by the positioning sensor 104 is narrowed, thereby resulting in a corresponding reduction in the computational load, and a longer use time is anticipated. Note that the change or adjustment of the first range RA according to the measurement history is not limited to the horizontal plane, and is executed with respect to the range in any direction, including vertically. In other words, the first range RA is changed or adjusted in a three-dimensional way.

By the way, the change or adjustment of the first range RA is not limited to the case where the area in the horizontal plane is reduced compared to the initial state. For example, the first range RA may be expanded in the case where the position where a gesture operation with respect to the virtual display VD is received lies outside the initially set first range RA. The expansion may be executed if a gesture operation outside the range is detected even once, or may be executed on the condition that the gesture operation outside the range is detected multiple times in the same location.

Furthermore, it is also possible that a collision between a body part or the like of the user U and the real object RO may be detected during a gesture operation. In this case, because the distance to the real object RO before the collision is measured, it is possible to infer that the area up to the collided real object RO is included in the range of motion of the body part or the like of the user U. By using information about the position where the collision with the real object RO is detected to change or adjust the shape of the first range RA, it is possible to cause the virtual display VD to retreat in the future.

Exemplary Embodiment 10

Figure 43:
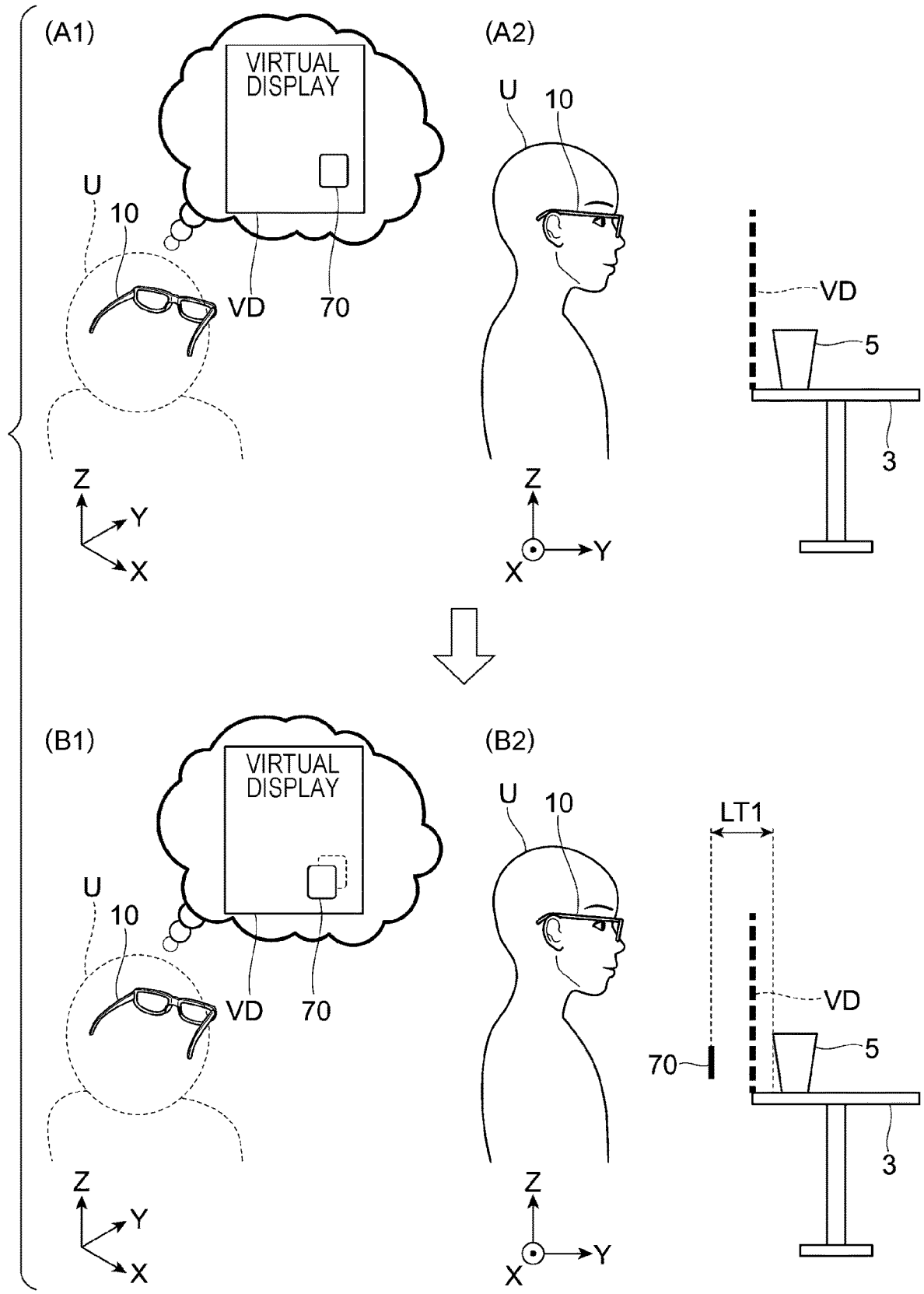
FIG. 43 is a diagram for explaining an example of causing the virtual display to retreat according to Exemplary Embodiment 10, in which (A1) and (A2) illustrate the positional relationship between the virtual display and the user at the initial position, and (B1) and (B2) illustrate the positional relationship between the retreated virtual display and the user.

The present exemplary embodiment describes a function of causing only an icon of the virtual display VD to retreat from a nearby real object RO. FIG. 43 is a diagram for explaining an example of causing the virtual display VD to retreat according to Exemplary Embodiment 10, in which (A1) and (A2) illustrate the positional relationship between the virtual display VD and the user U at the initial position, and (B1) and (B2) illustrate the positional relationship between the retreated virtual display VD and the user U. In FIG. 43, portions that correspond to FIG. 15 are denoted with the same signs.

The virtual display VD illustrated in (A1) and (A2) of FIG. 43 includes an icon 70 that is the target of a gesture operation. In the case of the foregoing exemplary embodiments, the entire virtual display VD is made to retreat with respect to the drink 5. However, in the gesture operation, areas other than the icon 70 basically are not tapped. For this reason, in the present exemplary embodiment, only the icon 70 is separated from the rest of the virtual display VD or a virtual display VD of a duplicate of the icon 70 is made to retreat the first distance LT1 from the drink 5.

In the example illustrated in (B1) and (B2) of FIG. 43, the portion corresponding to the icon 70 is extracted from the virtual display VD and made to retreat the first distance LT1 in the direction approaching the user U. In this case, the user U performs the gesture operation on the icon 70 floating in front of the virtual display VD, and the possibility that a body part or the like will collide with the drink 5 is lowered in the same way as the other exemplary embodiments. Moreover, whereas moving the entire virtual display VD has a large discomforting effect on the user U, moving only the icon 70 does not discomfort the user U as much and has an effect of calling attention to the gesture operation.

Retreat Example 2

Figure 44:
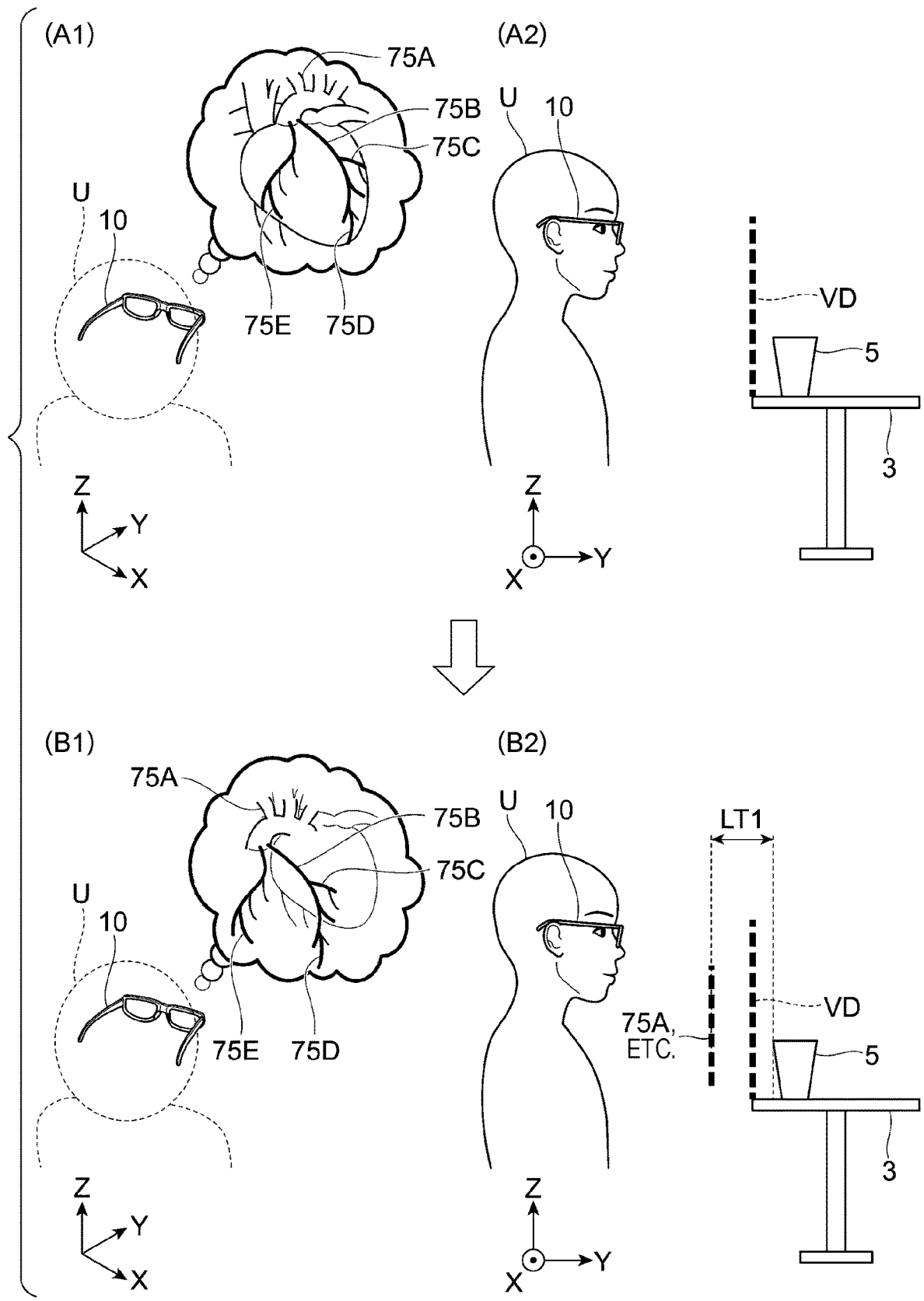
FIG. 44 is a diagram for explaining another example of causing the virtual display to retreat according to Exemplary Embodiment 10, in which (A1) and (A2) illustrate the positional relationship between the virtual display and the user at the initial position, and (B1) and (B2) illustrate the positional relationship between the retreated virtual display and the user.

FIG. 44 is a diagram for explaining another example of causing the virtual display VD to retreat according to Exemplary Embodiment 10, in which (A1) and (A2) illustrate the positional relationship between the virtual display VD and the user U at the initial position, and (B1) and (B2) illustrate the positional relationship between the retreated virtual display VD and the user U. In FIG. 44, portions that correspond to FIG. 15 are denoted with the same signs. In the case of FIG. 44, the virtual display VD is a diagram of a heart. The target of a gesture operation by the user U is arteries.

Accordingly, in (B1) and (B2) of FIG. 44, the portion corresponding to the target of the gesture operation, namely an aorta 75A, a left main trunk artery 75B, a left circumflex artery 75C, a left anterior descending artery 75D, and a right coronary artery 75E, are extracted from the rest of the virtual display VD illustrating the heart and made to retreat the first distance LT1 in the direction approaching the user U. In this case, the gesture operation likewise may be performed without knocking over the drink 5 behind the virtual display VD. Also, because the arterial portions are close to the user U, it is also easy for the user U to check the fine area that is the target of the gesture operation.

The arteries in the present exemplary embodiment are an example of an icon. Note that not all of the arteries have to be retreated, and it is possible to cause only some of the arteries to retreat in the portion where the cursor 60 (see FIG. 34) is located. This is because there is a high probability that the arteries where the cursor 60 is located are the target of the gesture operation, and there is a high probability that other areas are not the target of the gesture operation.

Retreat Example 3

Figure 45:
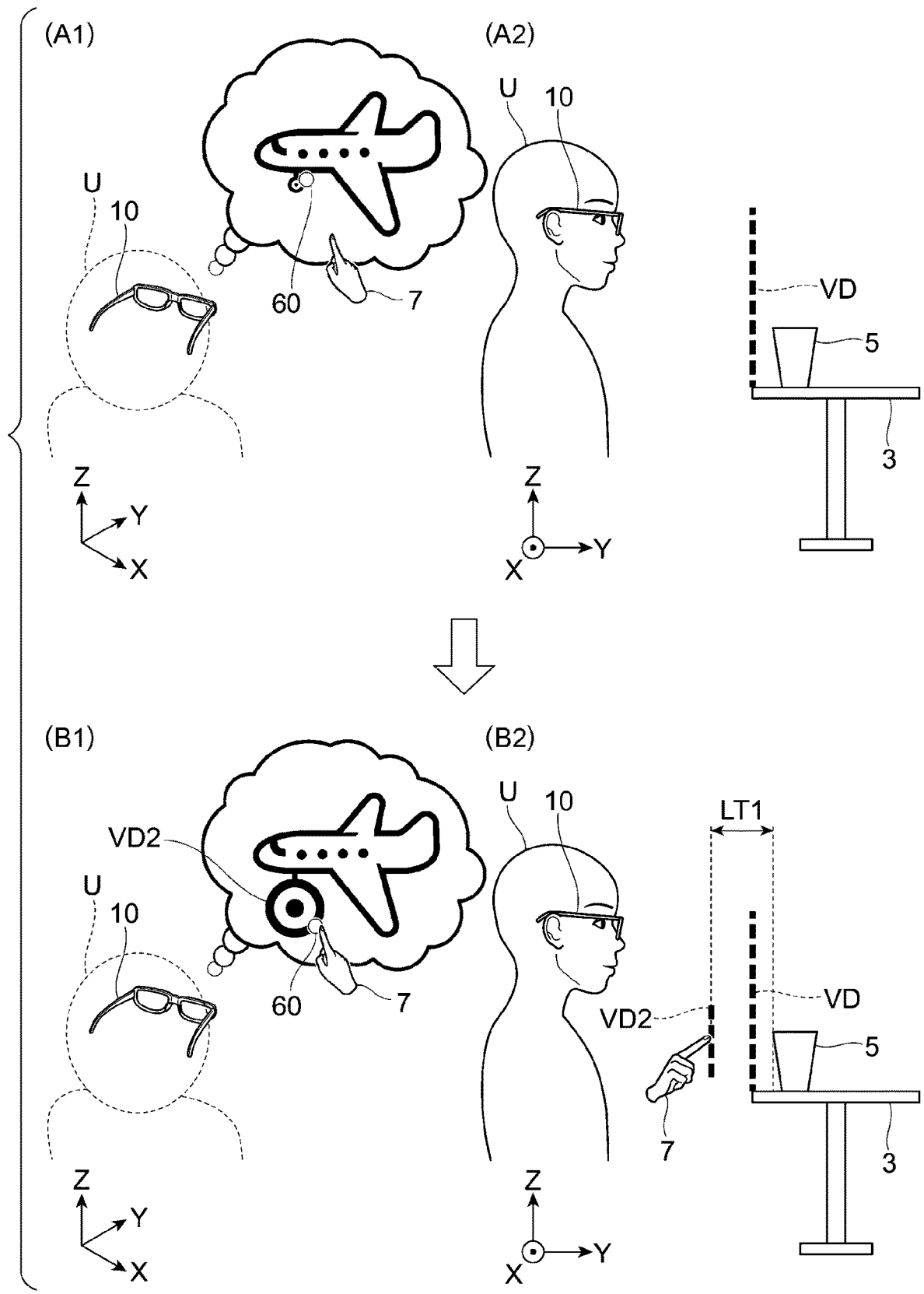
FIG. 45 is a diagram for explaining yet another example of causing the virtual display to retreat according to Exemplary Embodiment 10, in which (A1) and (A2) illustrate the positional relationship between the virtual display and the user at the initial position, and (B1) and (B2) illustrate the positional relationship between the retreated virtual display and the user.

FIG. 45 is a diagram for explaining yet another example of causing the virtual display VD to retreat according to Exemplary Embodiment 10, in which (A1) and (A2) illustrate the positional relationship between the virtual display VD and the user U at the initial position, and (B1) and (B2) illustrate the positional relationship between the retreated virtual display VD and the user U. In FIG. 45, portions that correspond to FIG. 15 are denoted with the same signs. In (A1) and (A2) of FIG. 45, the virtual display VD is in the initial position, and therefore is positioned directly in front of the drink 5. If a gesture operation is performed in this state, there is a possibility that a body part or the like will knock over the drink 5.

However, on the virtual display VD, the cursor 60 is displayed in the location pointed to by a fingertip on the right hand 7 of the user U is pointing to. Also, the distance between the virtual display VD and the fingertip on the right hand 7 is expressed by changes in the dimensions of the cursor 60. In the case of (A1) of FIG. 45, the cursor 60 is positioned on a front wheel portion. If the diameter of the cursor 60 is less than a predetermined threshold, the processor 201 extracts the front wheel portion as an independent object, and sets the extracted object as the target of the retreat process as a new virtual display VD2.

As a result, as illustrated in (B1) and (B2) of FIG. 45, the virtual display VD2 corresponding to the front wheel portion is made to retreat to a position the first distance LT1 away from the drink 5. This point is the same as the arteries in FIG. 44. However, in the case of (B1) of FIG. 45, the display of the real object corresponding to the front wheel portion is enlarged. Consequently, unlike a simple retreat, an additional visual effect enabling easier observation of the retreated object is achieved.

Retreat Example 4

Figure 46:
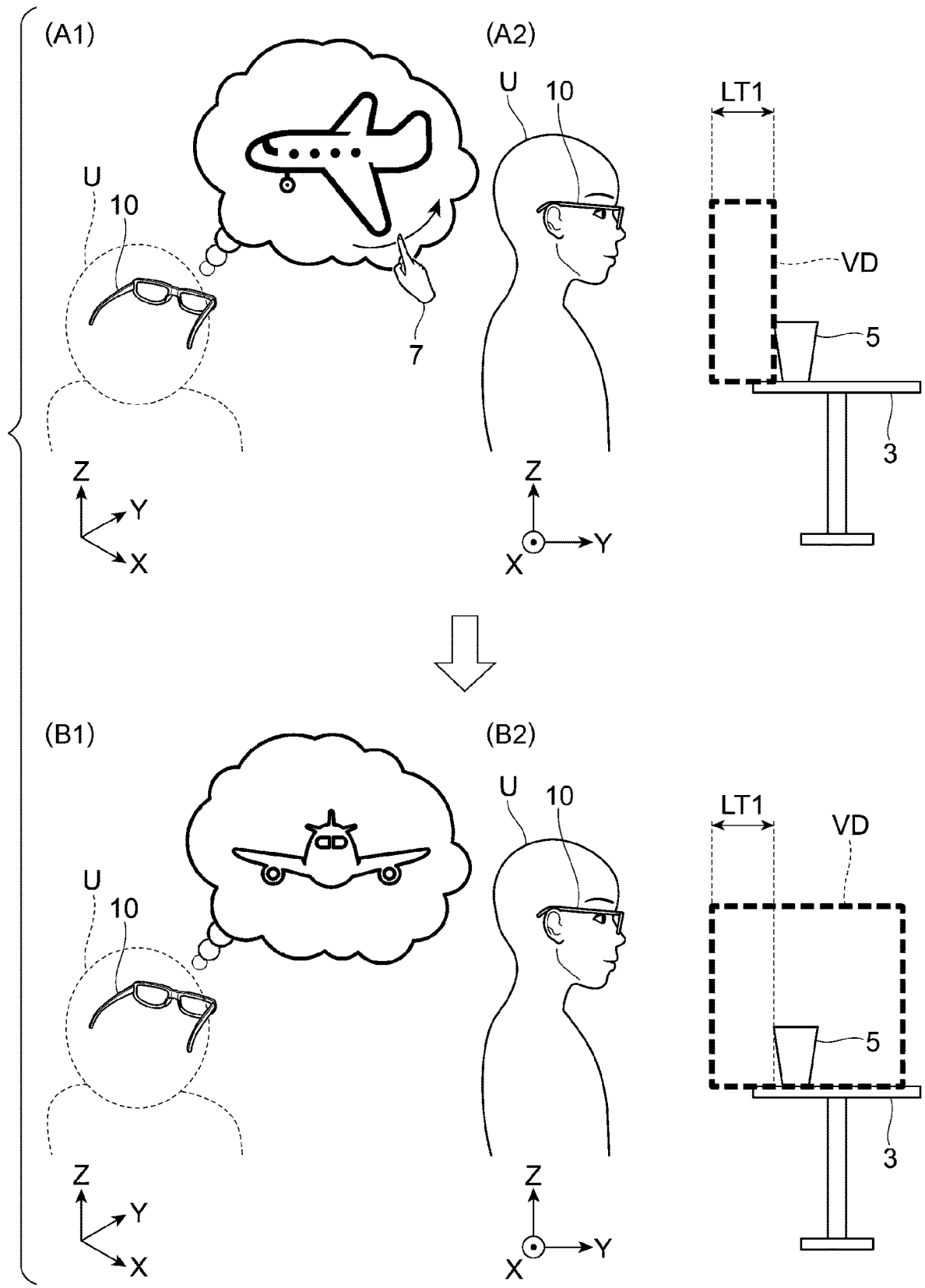
FIG. 46 is a diagram for explaining yet another example of causing the virtual display to retreat according to Exemplary Embodiment 10, in which (A1) and (A2) illustrate the positional relationship between the virtual display and the user at the initial position, and (B1) and (B2) illustrate the positional relationship between the retreated virtual display and the user.

FIG. 46 is a diagram for explaining yet another example of causing the virtual display VD to retreat according to Exemplary Embodiment 10, in which (A1) and (A2) illustrate the positional relationship between the virtual display VD and the user U at the initial position, and (B1) and (B2) illustrate the positional relationship between the retreated virtual display VD and the user U. In FIG. 46, portions that correspond to FIG. 15 are denoted with the same signs. In the case of FIG. 46, the virtual display VD is a scale model of an airplane. In other words, the virtual display VD is a three-dimensional shape. Consequently, in (A2) of FIG. 46, the dashed line indicating the virtual display VD is not a straight line but instead multiple lines expressing a rectangular shape.

Note that in (A2) of FIG. 46, the portion of the solid virtual display VD closest to the user U is positioned the first distance LT1 away from the drink 5. This is in accordance with the thinking that basically the part closest to the user U is the target of a gesture operation. In (A1) of FIG. 46, the fingertip on the right hand 7 is touching the tip of the left wing of the airplane and giving an instruction for rotation in the horizontal plane. Note that in the gesture operation, the fingertip of the user U moves through a space located the first distance LT1 away from the drink 5. Consequently, the possibility of the gesture operation knocking over the drink 5 is low.

(B1) and (B2) of FIG. 46 illustrate a state in which the rotation of the airplane has ended and the nose of the airplane is facing the user U. In this case, because the user U performs a gesture operation on the nose that is facing forward where the distance between the airplane and the user U is the shortest, there is a possibility that the first distance LT1 will be secure with respect to the drink 5. As illustrated in (B2) of FIG. 46, the fuselage portion of the airplane forming the virtual display VD includes the drink 5, but in the case of performing a gesture operation on the fuselage portion or the tail of the airplane, the direction of the airplane may be changed such that the portion of interest is positioned in front of the user U, thereby making it possible to avoid a collision with the drink 5 when performing the gesture operation.

Retreat Example 5

Figure 47:
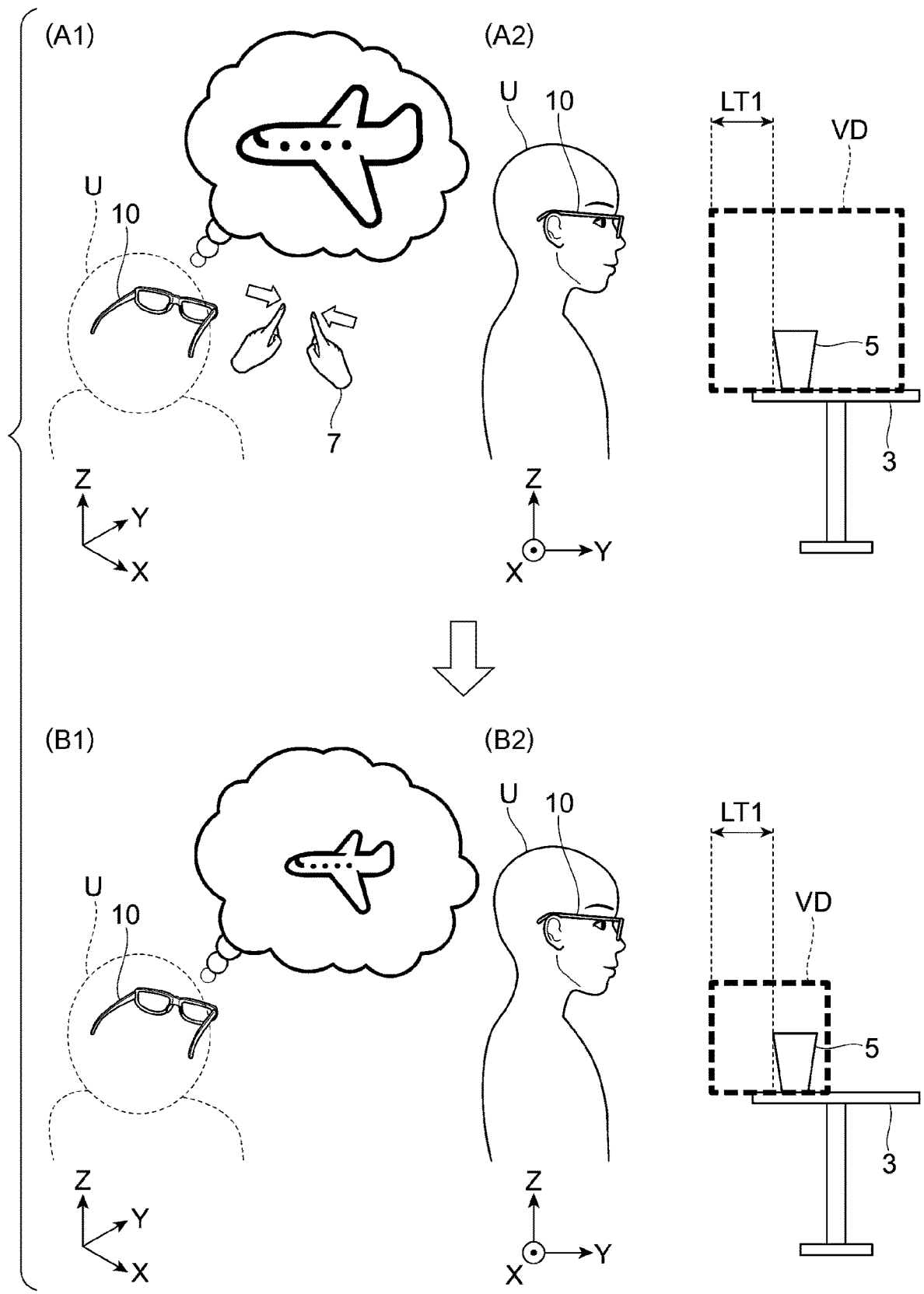
FIG. 47 is a diagram for explaining yet another example of causing the virtual display to retreat according to Exemplary Embodiment 10, in which (A1) and (A2) illustrate the positional relationship between the virtual display before a reduction transformation and the user, and (B1) and (B2) illustrate the positional relationship between the virtual display after the reduction transformation and the user.

FIG. 47 is a diagram for explaining yet another example of causing the virtual display VD to retreat according to Exemplary Embodiment 10, in which (A1) and (A2) illustrate the positional relationship between the virtual display VD before a reduction transformation and the user U, and (B1) and (B2) illustrate the positional relationship between the virtual display VD after the reduction transformation and the user U. In FIG. 47, portions that correspond to FIG. 15 are denoted with the same signs. In the case of FIG. 47, the virtual display VD likewise is a scale model of an airplane. In other words, the virtual display VD is a three-dimensional shape. Consequently, in (A2) of FIG. 47, the dashed line indicating the virtual display VD is not a straight line but instead multiple lines expressing a rectangular shape.

(A1) and (A2) of FIG. 47 illustrate a case where the display scale of the virtual display VD is too large. A display scale that is too large may make it rather inconvenient to perform a gesture operation. Accordingly, in (A1) of FIG. 47, the user U performs a gesture operation of bringing his or her hands together to give an instruction for reducing the display scale of the virtual display VD. Note that since (A2) of FIG. 47 illustrates the virtual display VD before the reduction, the dashed lines representing the virtual display VD cover a large area. Incidentally, the frontmost position of the virtual display VD is located the first distance LT1 away from the drink 5. (B1) of FIG. 47 illustrates how the virtual display VD looks after a reduction transformation. Because a reduction transformation has been performed, the dashed lines representing the virtual display VD in (B2) of FIG. 47 cover a smaller area. In this case, the frontmost position of the virtual display VD likewise is located the first distance LT1 away from the drink 5.

Retreat Example 6

Figure 48:
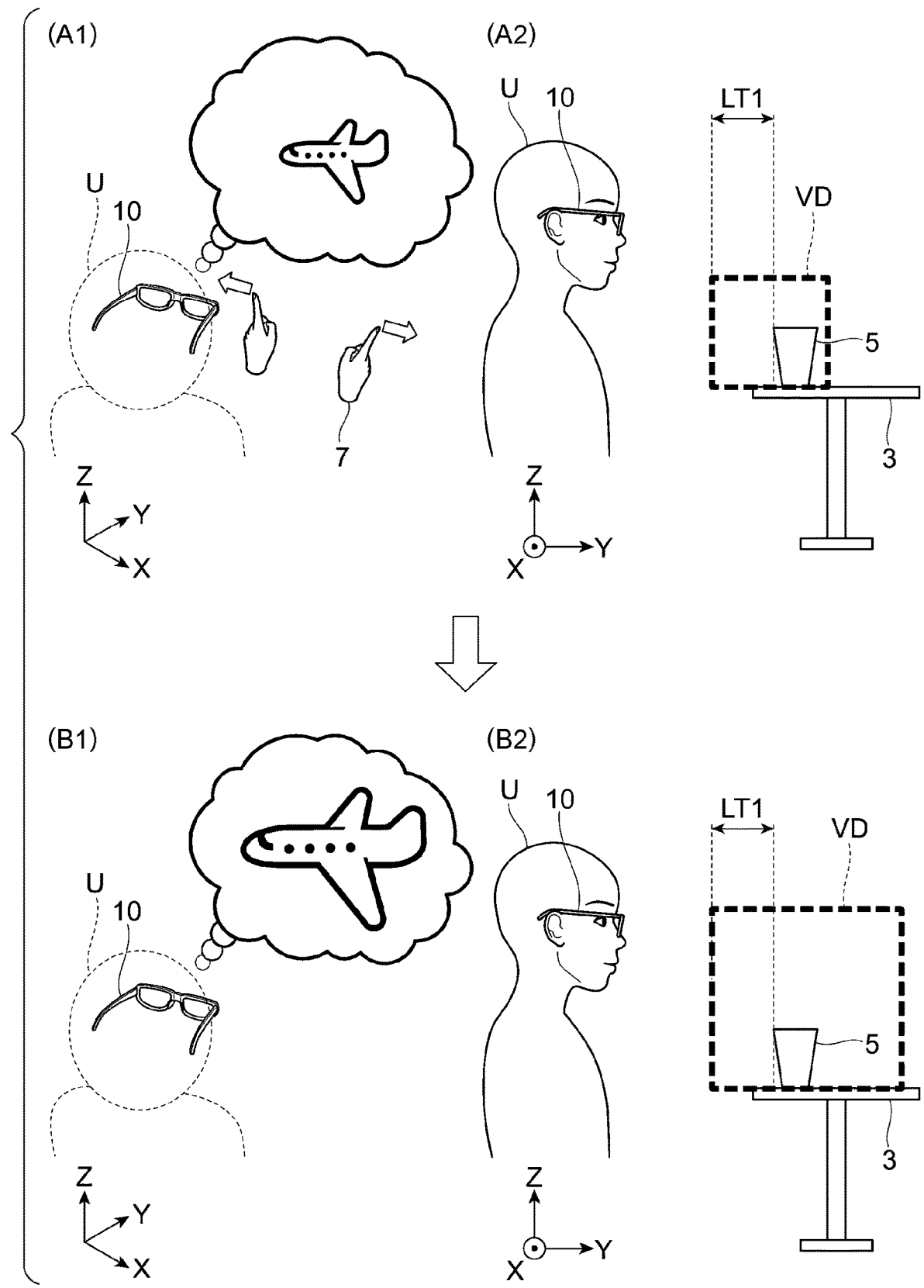
FIG. 48 is a diagram for explaining yet another example of causing the virtual display to retreat according to Exemplary Embodiment 10, in which (A1) and (A2) illustrate the positional relationship between the virtual display before an enlargement transformation and the user, and (B1) and (B2) illustrate the positional relationship between the virtual display after the enlargement transformation and the user.

FIG. 48 is a diagram for explaining yet another example of causing the virtual display VD to retreat according to Exemplary Embodiment 10, in which (A1) and (A2) illustrate the positional relationship between the virtual display VD before an enlargement transformation and the user U, and (B1) and (B2) illustrate the positional relationship between the virtual display VD after the enlargement transformation and the user U. In FIG. 48, portions that correspond to FIG. 15 are denoted with the same signs. In the case of FIG. 48, the virtual display VD likewise is a scale model of an airplane. In other words, the virtual display VD is a three-dimensional shape. Consequently, in (A2) of FIG. 48, the dashed line indicating the virtual display VD is not a straight line but instead multiple lines expressing a rectangular shape.

(A1) and (A2) of FIG. 48 illustrate a case where the display scale of the virtual display VD is too small. A display scale that is too small may make it inconvenient to perform a gesture operation. Accordingly, in (A1) of FIG. 48, the user U performs a gesture operation of spreading out his or her hands to give an instruction for enlarging the display scale of the virtual display VD. Note that since (A2) of FIG. 48 illustrates the virtual display VD before the enlargement, the dashed lines representing the virtual display VD cover a small area. Incidentally, the frontmost position of the virtual display VD is located the first distance LT1 away from the drink 5. (B1) of FIG. 48 illustrates how the virtual display VD looks after an enlargement transformation. Because an enlargement transformation has been performed, the dashed lines representing the virtual display VD in (B2) of FIG. 47 cover a larger area. In this case, the frontmost position of the virtual display VD likewise is located the first distance LT1 away from the drink 5.

Exemplary Embodiment 11

Figure 49A:
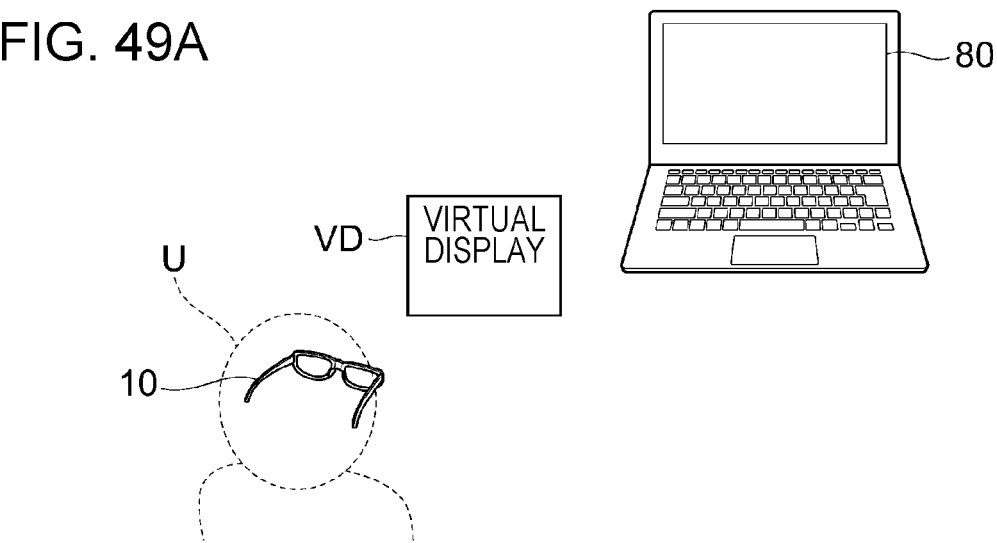
Figure 49B:
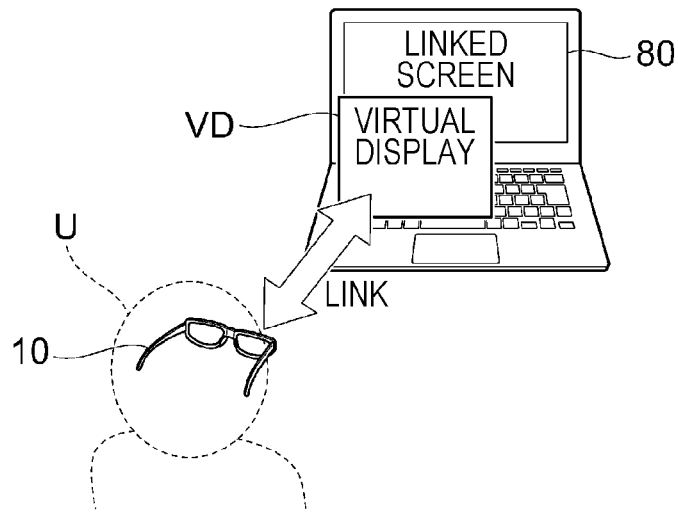
Figure 49C:
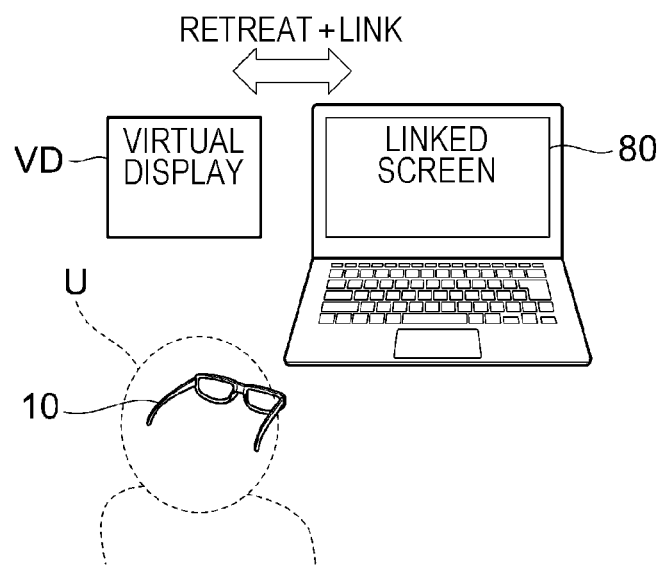

The present exemplary embodiment describes a case of adding a retreat function associated with the linking of the virtual display VD with a real monitor. FIGS. 49A to 49C are diagrams for explaining a case where the virtual display VD that the user U is seeing is linked to a display screen on a real monitor 80, in which FIG. 49A illustrates the virtual display VD and the display screen of the monitor 80 before linking, FIG. 49B illustrates the virtual display VD and the display screen of the monitor 80 after linking, and FIG. 49C illustrates a state in which the virtual display VD is made to retreat such that the virtual display VD and the monitor 80 are arranged side by side. The monitor 80 here is one example of a display device.

In FIG. 49A, there a long distance between the user U and the monitor 80. Consequently, the xR device 10 and a computer that displays images on the monitor 80 are not linked. For this reason, the contents of the screens displayed on the virtual display VD and the monitor 80 are independent of one another. Note that the monitor 80 in FIG. 49A is the display of a laptop computer. In FIG. 49B, the user U has approached and is generally in front of the monitor 80. Consequently, the virtual display VD is displayed in front of the monitor 80 from the perspective of the user U.

If the distance between the xR device 10 and the monitor 80 is less than a predetermined distance, image linking between the computer that displays images on the monitor 80 and the xR device 10 is executed. FIG. 49B illustrates the screens after image linking, and consequently the content of the display on the monitor 80 has been replaced by a screen linked to the virtual display VD. As FIG. 49B demonstrates, even if images are linked, in a state in which the two screens are overlapping, the visibility of the monitor 80 is lowered, and touching the monitor 80 when performing a gesture operation is a concern.

In the present exemplary embodiment, the direction of retreat is set to a direction alongside the monitor 80 on the condition that the virtual display VD is positioned the first distance LT1 in front of the monitor 80. For this reason, the virtual display VD in FIG. 49C is made to retreat to a position on the left side of the monitor 80 from the perspective of the user U. Consequently, the user U is able to perform work while looking at both screens. Note that after image linking is started, the position of the virtual display VD is locked to the retreat position even if the user U faces in the direction of the monitor 80, for example. For this reason, the display position of the virtual display VD does not vary every time the user U faces a different direction, and a stable work environment is achieved.

Exemplary Embodiment 12

Figure 50A:
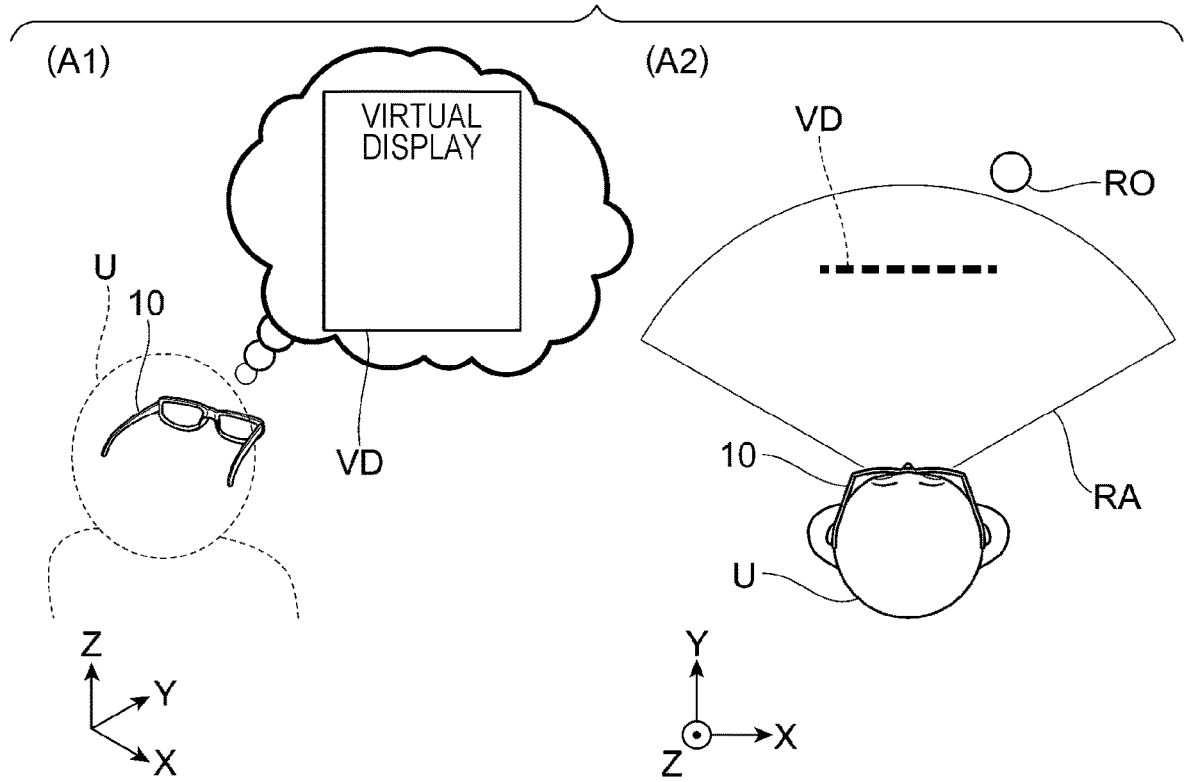
FIGS. 50A and 50B are diagrams for explaining a function of extending the shape of the first range in the direction where an icon included on the virtual display is positioned, in which (A1) and (A2) of FIG. 50A illustrate the first range in the case where the icon is not included on the virtual display, and (B1) and (B2) of FIG. 50B illustrate the first range in the case where the icon is included on the virtual display.
Figure 50B:
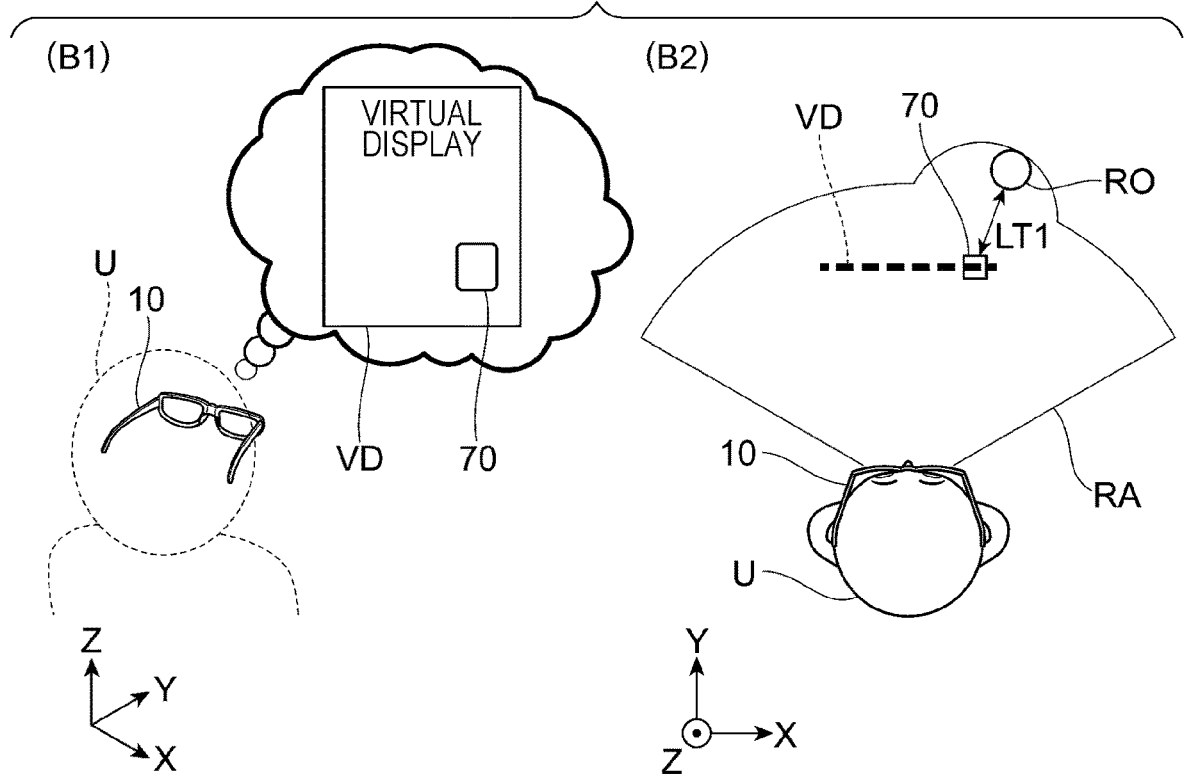

FIGS. 50A and 50B are diagrams for explaining a function of extending the shape of the first range RA in the direction where an icon 70 included on the virtual display VD is positioned, in which (A1) and (A2) of FIG. 50A illustrate the first range RA in the case where the icon 70 is not included on the virtual display VD, and (B1) and (B2) of FIG. 50B illustrate the first range RA in the case where the icon 70 is included on the virtual display VD. In FIGS. 50A and 50B, portions that correspond to FIG. 15 are denoted with the same signs. Note that (A2) of FIG. 50A and (B2) of FIG. 50B illustrate overhead views of the user U.

The icon 70 is not included on the virtual display VD illustrated in (A1) of FIG. 50A. For this reason, the first range RA illustrated in (A2) of FIG. 5 has the same fan shape of the initial state. Note that in the case of (A2) of FIG. 50A, a real object RO is positioned outside the first range RA. A retreat of the virtual display VD in the present exemplary embodiment is executed with respect to a real object RO included in the first range RA. For this reason, in the case of (A2) of FIG. 50A, a retreat process is not executed even if the real object RO is near the virtual display VD. As a result, there is a possibility that a body part or the like will collide with the real object RO when a gesture operation is performed.

The icon 70 is included on the virtual display VD illustrated in (B1) of FIG. 50B, and the first range RA is expanded in the direction where the icon 70 exists. In the case of (B2) of FIG. 50B, the real object RO is included in the expanded first range RA. Consequently, the virtual display VD is made to retreat the first distance LT1 away from the real object RO. As a result of causing the virtual display VD to retreat, there is a reduced possibility that a body part or the like will accidentally collide with the real object RO when performing a gesture operation on the icon 70.

Exemplary Embodiment 13

Figure 51A:
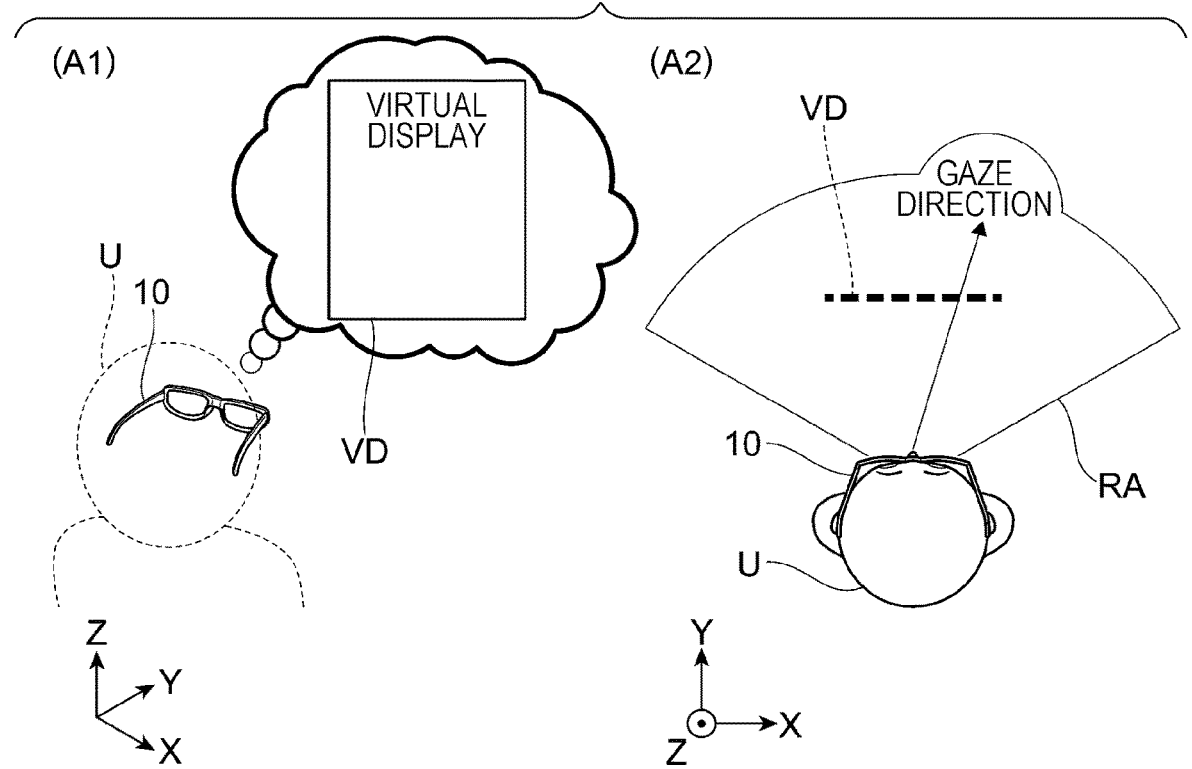
FIGS. 51A and 51B are diagrams for explaining a function of expanding the first range in the direction of the user's gaze, in which (A1) and (A2) of FIG. 51A illustrate the shape of the first range in the case where the user's gaze direction is ahead to the right, and (B1) and (B2) of FIG. 51B illustrate the shape of the first range in the case where the user's gaze direction is ahead to the left.
Figure 51B:
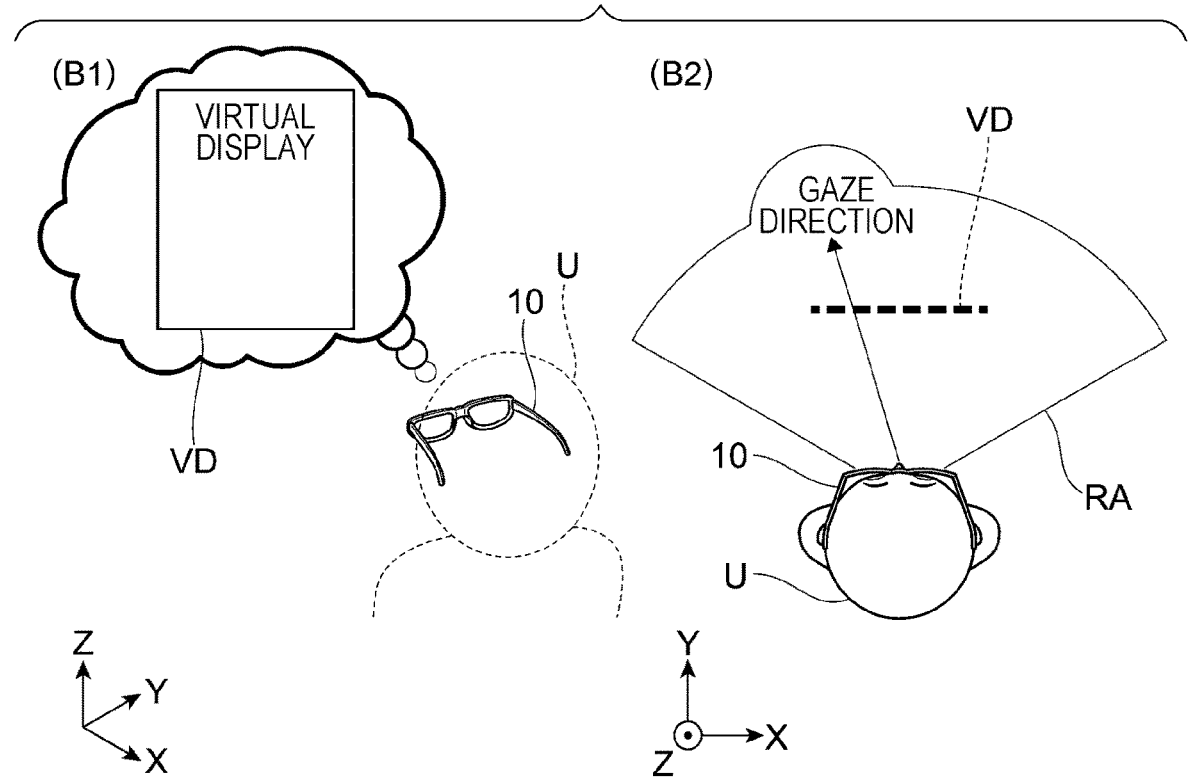

FIGS. 51A and 51B are diagrams for explaining a function of expanding the first range RA in the direction of the gaze of the user U, in which (A1) and (A2) of FIG. 51A illustrate the shape of the first range RA in the case where the gaze direction of the user U is ahead to the right, and (B1) and (B2) of FIG. 51B illustrate the shape of the first range RA in the case where the gaze direction of the user U is ahead to the left. In FIGS. 51A and 51B, portions that correspond to FIG. 15 are denoted with the same signs. Note that (A2) of FIG. 51A and (B2) of FIG. 51B illustrate overhead views of the user U. This is because there is a high probability that a gesture operation will be executed with respect to a region in the gaze direction of the user U.

Figure 52A:
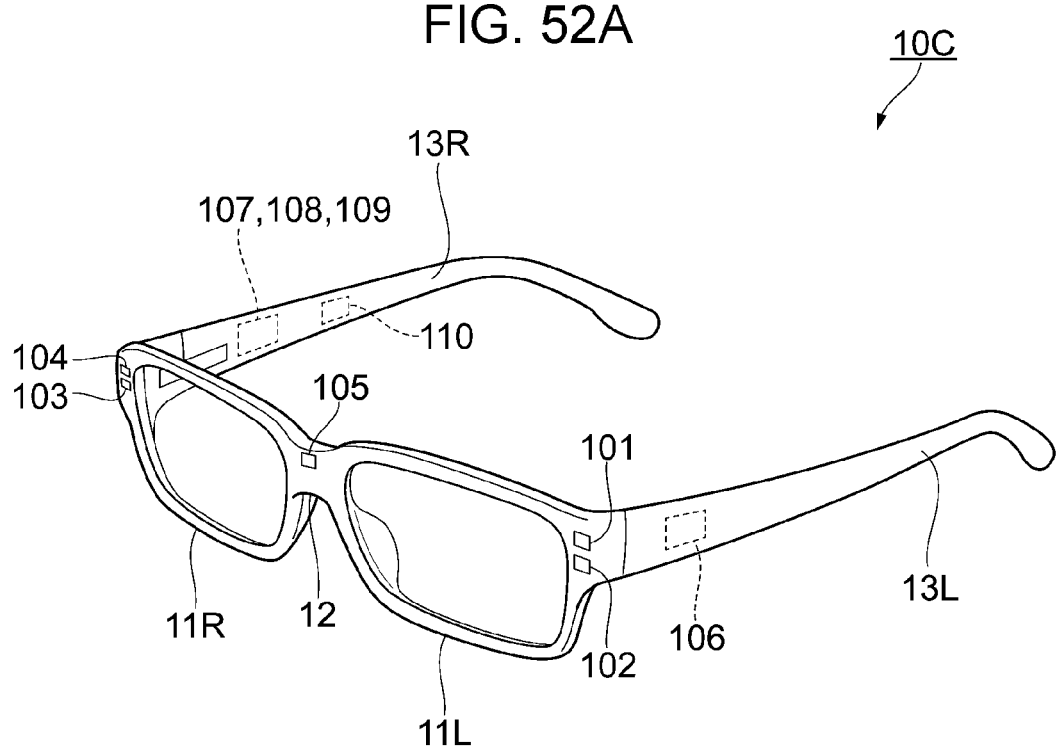
Figure 52B:
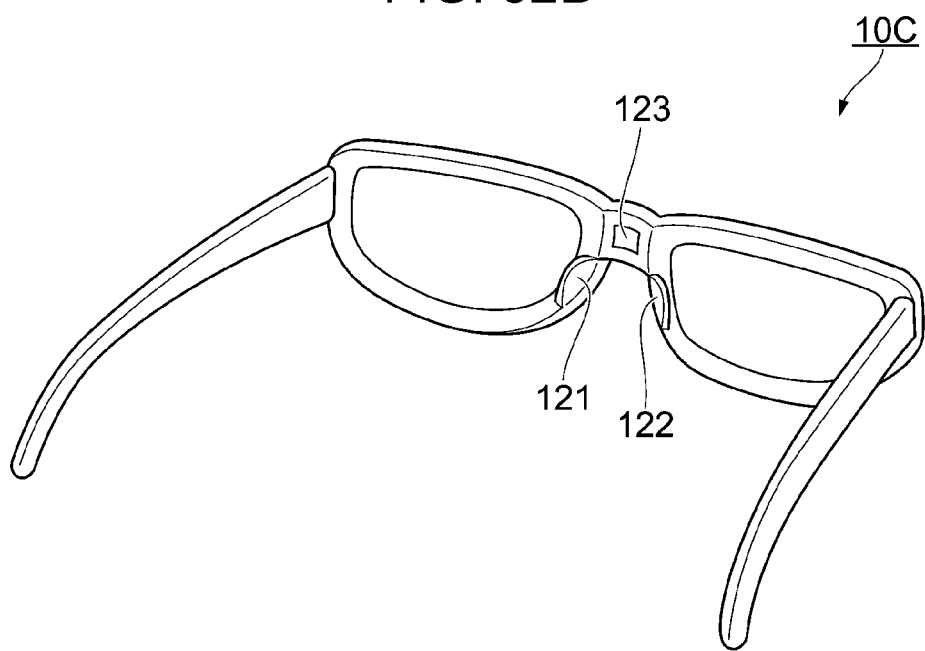

In the case of the present exemplary embodiment, the gaze direction of the user U is estimated using an eye potential measured by an xR device 10C (see FIGS. 52A and 52B). FIGS. 52A and 52B are diagrams for explaining an example of the appearance of the xR device 10C used in Exemplary Embodiment 13, in which FIG. 52A illustrates an example of the appearance of the xR device 10C as viewed from the front and FIG. 52B illustrates an example of the appearance of the xR device 10C as viewed from the perspective of the user U. In FIGS. 52A and 52B, portions that correspond to FIG. 2 are denoted with the same signs.

The appearance illustrated in FIG. 52A is the same as the appearance illustrated in FIG. 2. In the case of FIG. 52B, a left electrode 121 is provided on the left nose pad and a right electrode 122 is provided on the right nose pad of the xR device 10C, and a center electrode 123 that contacts the skin between the eyebrows is provided. The left electrode 121 contacts the left side of the nose of the user U wearing the xR device 10C. The right electrode 122 contacts the right side of the nose of the user U wearing the xR device 10C. The distance from the left eye of the user U to the left electrode 121 is substantially equal to the distance from the right eye of the user U to the right electrode 122. The center electrode 123 is provided near-midway between the left electrode 121 and the right electrode 122.

Figure 53:
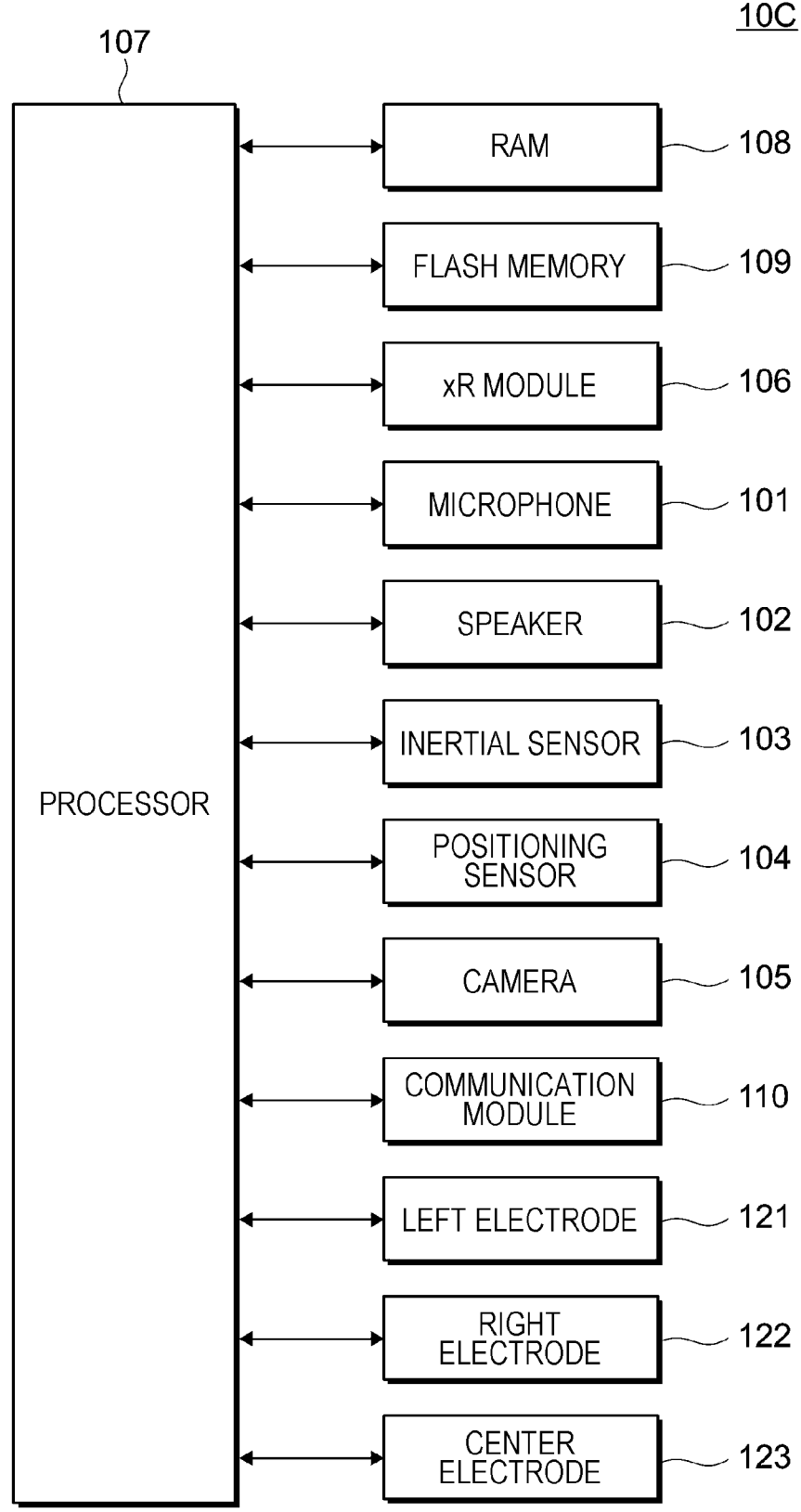
FIG. 53 is a diagram for explaining an example of a hardware configuration of the xR device used in Exemplary Embodiment 13.

FIG. 53 is a diagram for explaining an example of a hardware configuration of the xR device 10C used in Exemplary Embodiment 13. In FIG. 53, portions that correspond to FIG. 3 are denoted with the same signs. The xR device 10C illustrated in FIG. 53 differs from the hardware configuration described using FIG. 3 in that the left electrode 121, the right electrode 122, and the center electrode 123 are connected to the processor 107. In the left electrode 121, the right electrode 122, and the center electrode 123, an eye potential corresponding to the movements of the left and right eyeballs is measured.

Figure 54:
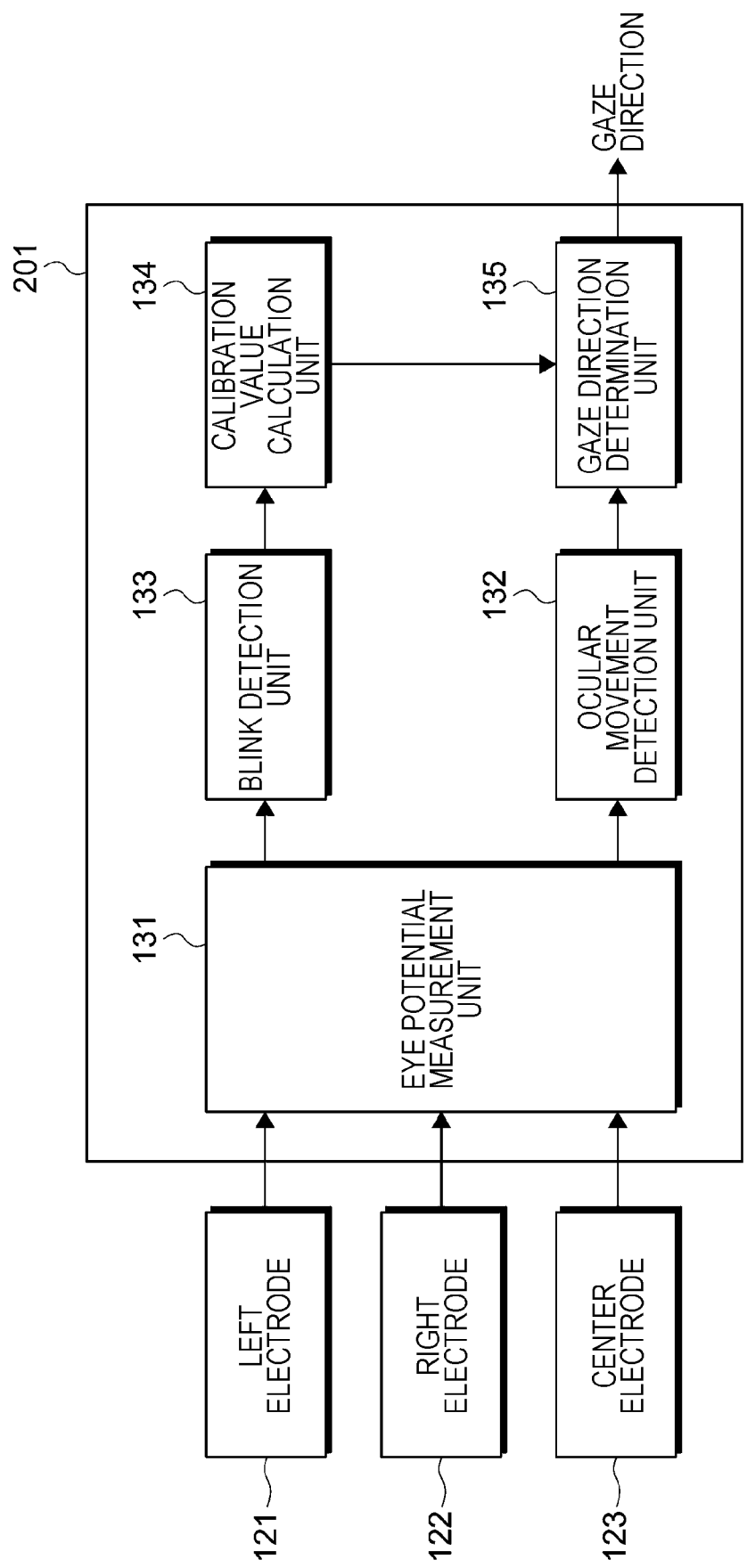
FIG. 54 is a diagram for explaining a configuration of functional units related to gaze detection.

FIG. 54 is a diagram for explaining a configuration of functional units related to gaze detection. In the present exemplary embodiment, the processor 201 of the information terminal 20 linked to the xR device 10C executes gaze detection. The processor 201 achieves functions related to gaze detection by executing a program. An eye potential measurement unit 131 accepts the input of a potential value measured by the left electrode 121, a potential value measured by the right electrode 122, and a potential value measured by the center electrode 123. For example, the eye potential measurement unit 131 acquires the potential value of the left electrode 121 with respect to the potential value of the center electrode 123 as a left eye potential, and acquires the potential value of the right electrode 122 with respect to the potential value of the center electrode 123 as a right eye potential. The eye potential measurement unit 131 supplies the left and right eye potentials as time series data to an ocular movement detection unit 132 and a blink detection unit 133.

The ocular movement detection unit 132 detects ocular movement of the user U on the basis of the time series data of the left and right eye potentials acquired from the eye potential measurement unit 131. The ocular movement detection unit 132 specifies the direction of the eyeballs, or in other words the gaze direction, on the basis of a characteristic waveform appearing in the time series data of the left and right eye potentials. The blink detection unit 133 specifies a blink interval on the basis of the time series data of the left and right eye potentials. The calibration value calculation unit 134 calculates a calibration value for the ocular movement on the basis of the value of the eye potential associated with the blinking detected by the blink detection unit 133. The calculated calibration value is supplied to a gaze direction determination unit 135. The gaze direction determination unit 135 uses the calibration value to calibrate the gaze direction detected by the ocular movement detection unit 132, and outputs a calibrated gaze direction. Note that this type of technology is described in Japanese Unexamined Patent Application Publication No. 2018-75254, for example.

Exemplary Embodiment 14

Figure 55A:
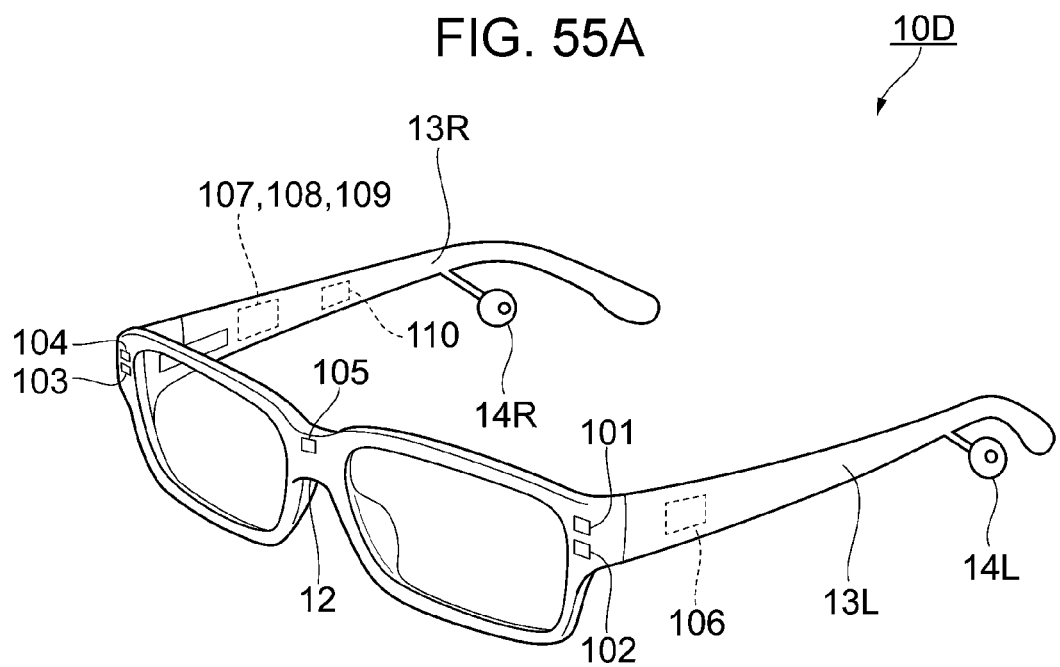
Figure 55B:
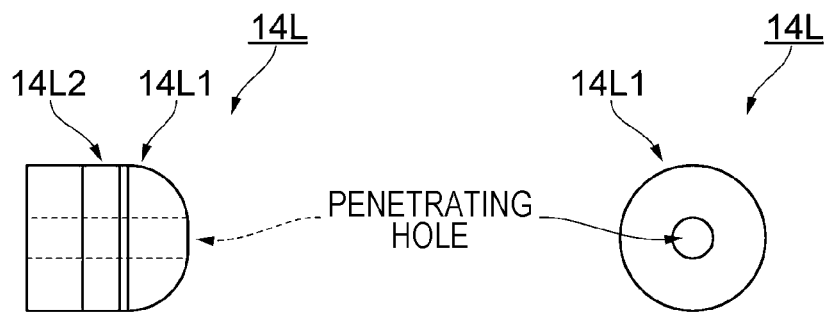
Figure 55C:
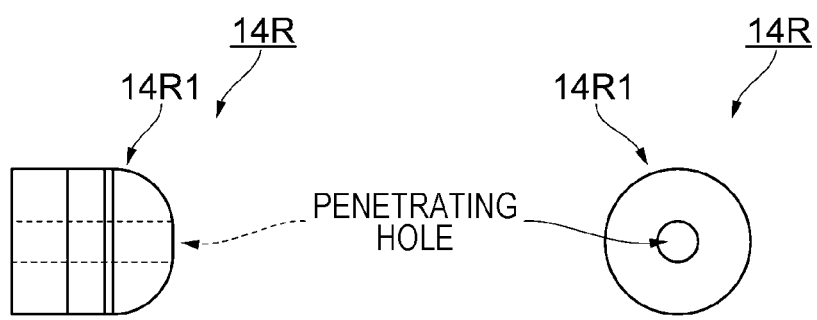

The present exemplary embodiment describes a function of using a brain wave signal measured in the ear canal of the user U to predict a gesture operation by the user U, and utilize the prediction to cause the virtual display VD to retreat. FIGS. 55A to 55C are diagrams for explaining an example of the appearance of an xR device 10D used in Exemplary Embodiment 14, in which FIG. 55A illustrates an example of the appearance of the xR device 10D as viewed from the front, FIG. 55B illustrates an example of the configuration of an earphone tip 14L attached to a temple 13L, and FIG. 55C illustrates an example of the configuration of an earphone tip 14R attached to a temple 13R. In FIGS. 55A to 55C, portions that correspond to FIG. 2 are denoted with the same signs.

The earphone tips 14L and 14R illustrated in FIG. 55A are generally tubular members that are used by being inserted into the outer ear canal. A penetrating hole is formed near the central axis of the tubular earphone tips 14L and 14R. For this reason, the user U is able to hear external sounds even when the earphone tips 14L and 14R are inserted into the outer ear canal. In other words, the earphone tips 14L and 14R are open-type members that do not seal the outer ear canal. The earphone tip 14L illustrated in FIG. 55B is provided with a dome-shaped electrode 14L1 that contacts the inner sides of the outer ear canal and a ring-shaped electrode 14L2 that contacts the ear cavity. The electrode 14L1, the electrode 14L2, and an electrode 14R1 all contain conductive rubber. This is to measure electrical signals appearing on the skin. Note that the electrodes 14L1 and 14L2 are electrically isolated by an insulator.

The electrode 14L1 is a terminal used to measure potential variations arising in a brain wave (electroencephalogram (EEG)), and is hereinafter referred to as the "EEG measurement terminal". The electrode 14L2 is a terminal used to measure a ground potential, and is hereinafter referred to as the "GND terminal". On the other hand, the earphone tip 14R illustrated in FIG. 55C is provided with a dome-shaped electrode 14R1 that contacts the inner sides of the outer ear canal. The electrode 14R1 is a terminal used to measure a reference (REF) potential, and is hereinafter referred to as the "REF terminal". In the case of the present exemplary embodiment, the electrodes 14R1 and 14L1 are electrically shorted.

Potential variations arising in a brain wave are measured as the differential signal of the electrical signals measured by the electrodes 14L1 and 14L2. In the field of brain science, all potential variations originating from a source other than the brain wave are called artifacts. In the field of brain science, it is thought that an electrical signal measuring a brain wave almost always includes artifacts. In the present exemplary embodiment, the origin of potential variations is not distinguished, and the potential variations measured by the earphone tips 14L and 14R are referred to as an electrical signal measuring a brain wave.

By the way, the components of an artifact are classified into components of physiological origin, components originating from the measurement system, such as the electrodes, and components originating from external equipment and the environment. Among these three components, the components other than those of physiological origin may be measured as noise measured by the earphone tips 14L and 14R. Noise may be measured as an electrical signal in the state in which the electrodes 14R1 and 14L1 are electrically shorted. Note that the possibility of measuring a brain wave with the earphone tips 14L and 14R is described in literature such as Japanese Unexamined Patent Application Publication No. 2021-90136, for example.

Figure 56:
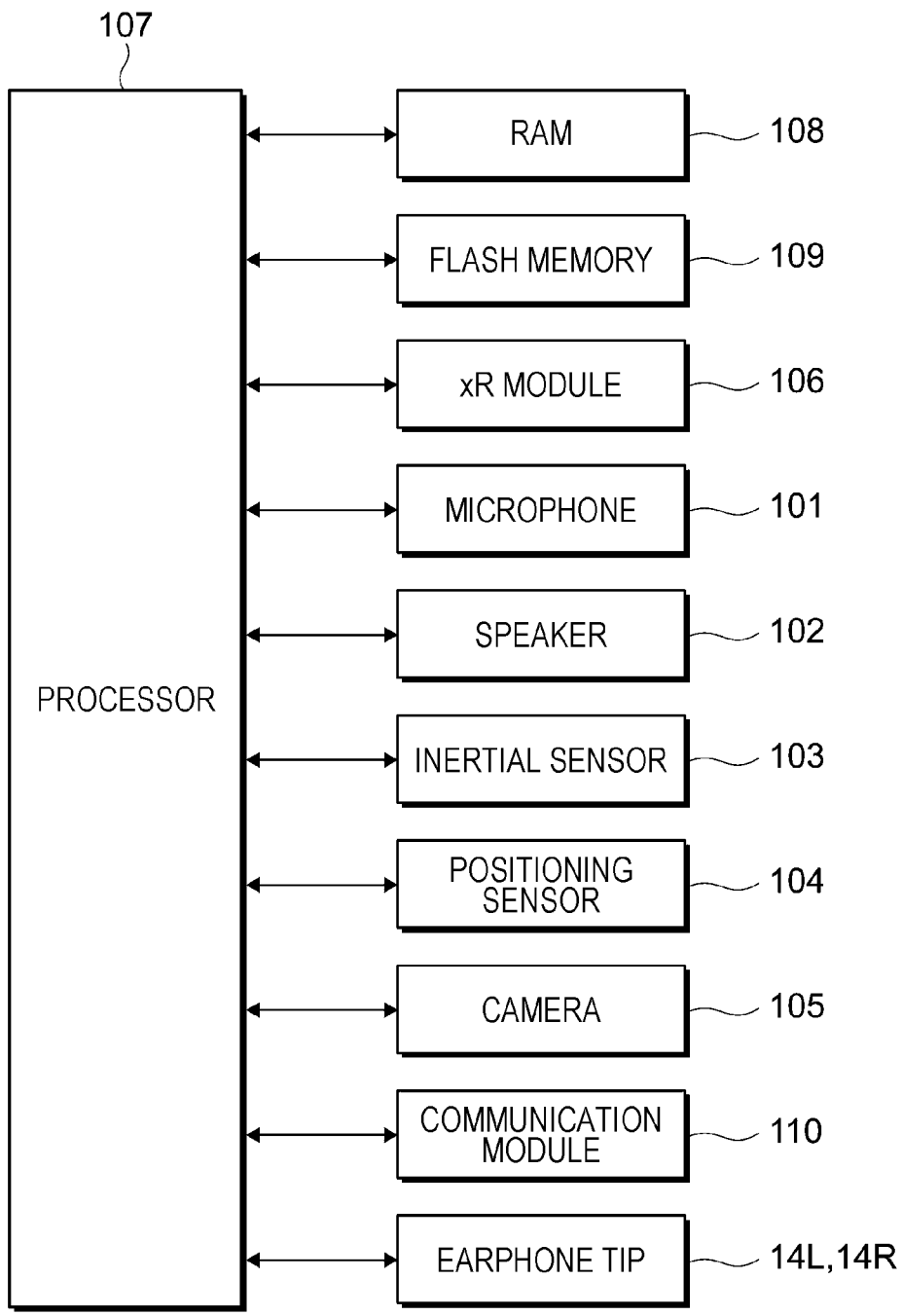
FIG. 56 is a diagram for explaining an example of a hardware configuration of the xR device used in Exemplary Embodiment 14.

FIG. 56 is a diagram for explaining an example of a hardware configuration of the xR device 10D used in Exemplary Embodiment 14. In FIG. 56, portions that correspond to FIG. 3 are denoted with the same signs. In the case of the xR device 10D illustrated in FIG. 56, electrical signals measured by the electrodes 14L1, 14L2, and 14R1 provided on the earphone tips 14L and 14R are supplied to the processor 107. Note that in the present exemplary embodiment, an electrical signal arising from a brain wave is measured by the earphone tips 14L and 14R, but it is also possible to provide a substitute for the earphone tips 14L and 14R by installing electrodes corresponding to the electrodes 14L1, 14L2, and 14R1 on the inner portions of the temples 13L and 13R in contact with the sides of the head near the ears.

Figure 57:
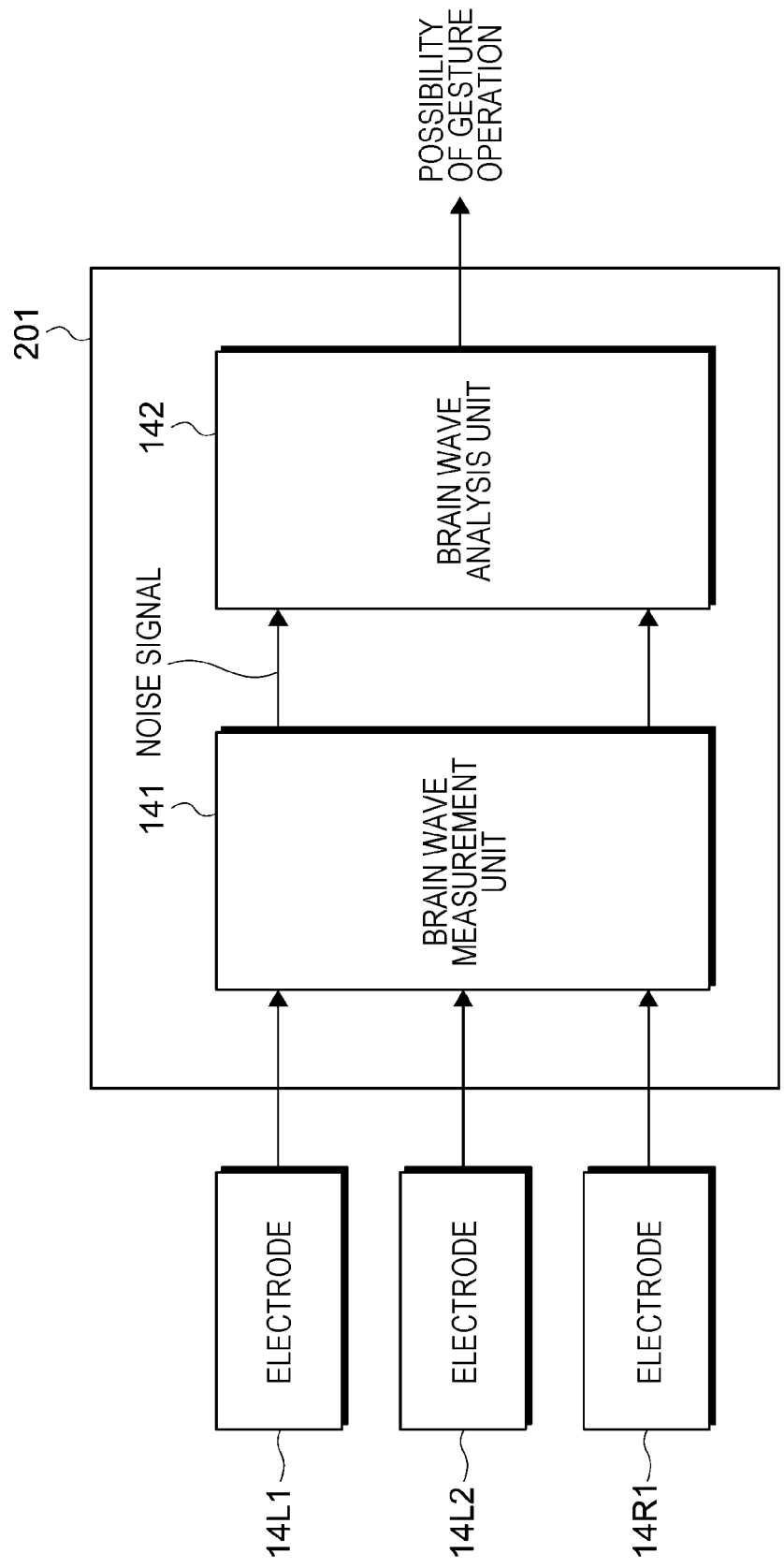
FIG. 57 is a diagram for explaining a configuration of functional units that use a brain wave to detect a sign of a gesture operation.

FIG. 57 is a diagram for explaining a configuration of functional units that use a brain wave to detect a sign of a gesture operation. In the present exemplary embodiment, the processor 201 of the information terminal 20 linked to the xR device 10D executes gaze detection. The processor 201 achieves a function of detecting a sign of a gesture operation by executing a program.

A potential value measured by the electrodes 14L1 and 14L2 of the earphone tip 14L and a potential value measured by the electrode 14R1 of the earphone tip 14R are inputted into a brain wave measurement unit 141. The brain wave measurement unit 141 measures an electrical signal corresponding to a brain wave from the potential difference between the electrodes 14L1 and 14L2. On the other hand, the brain wave measurement unit 141 measures a noise signal from the potential difference between the electrodes 14L1 and 14R1. A brain wave analysis unit 142 removes the influence of the noise signal from the electrical signal corresponding to a brain wave, and predicts the possibility of a gesture operation by the user U. For example, artificial intelligence is used to predict the possibility of a gesture operation. The brain wave analysis unit 142 uses a trained model that has been trained using electrical signals or patterns appearing immediately before a gesture operation occurs as teaching data for example, and has thereby learned a relationship that outputs a numerical value expressing the possibility that a gesture operation will be executed immediately afterward.

Figure 58:
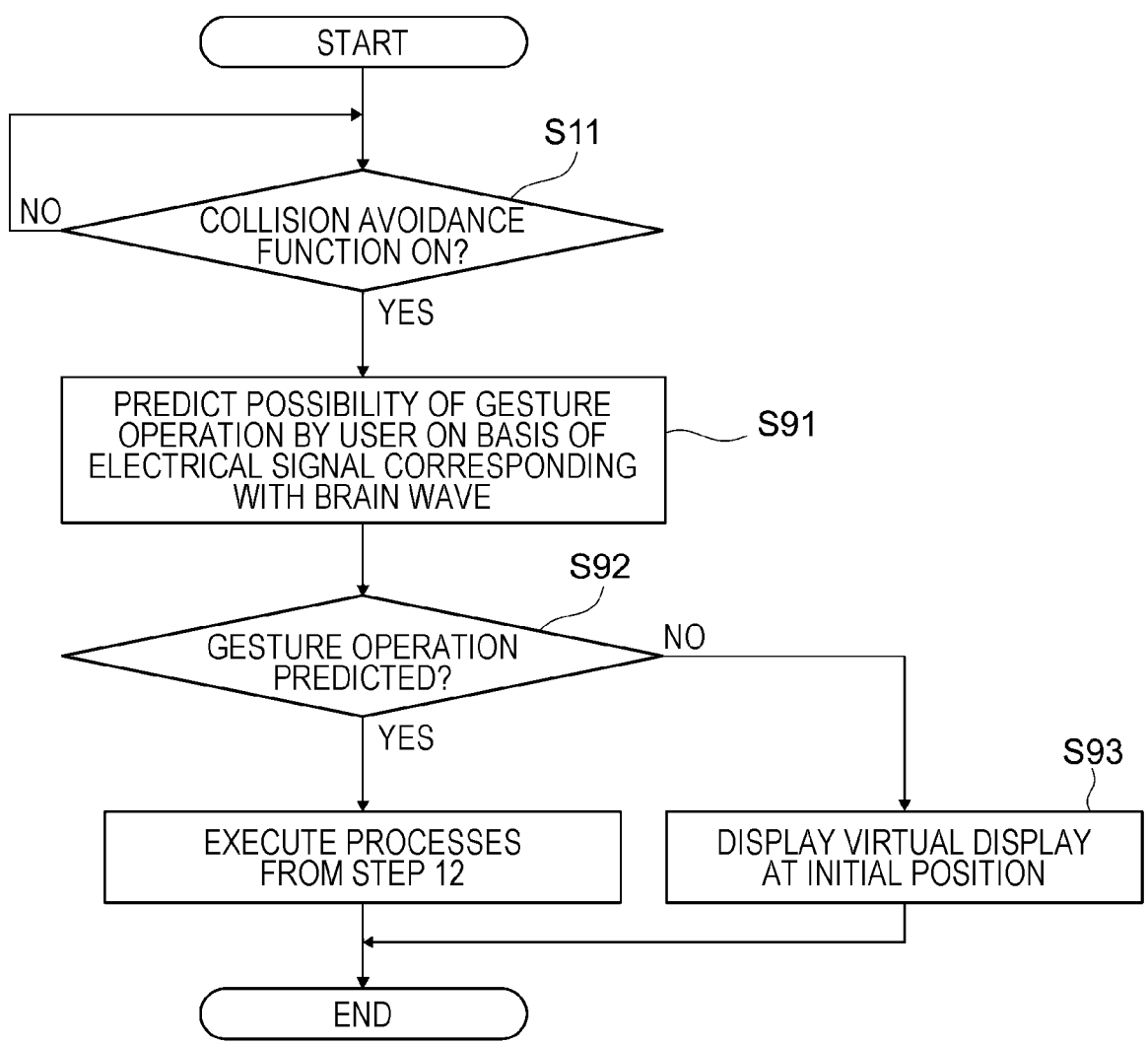
FIG. 58 is a flowchart for explaining an example of retreat operations for a virtual display according to Exemplary Embodiment 14.

FIG. 58 is a flowchart for explaining an example of retreat operations for the virtual display VD according to Exemplary Embodiment 14. In FIG. 58, portions that correspond to FIG. 14 are denoted with the same signs. In the present exemplary embodiment, the processor 201 (see FIG. 5) likewise determines whether or not the collision avoidance function is on (step 11). If a positive result is obtained in step 11, the processor 201 predicts the possibility of a gesture operation by the user U on the basis of the electrical signal corresponding to a brain wave (step 91). Next, the processor 201 determines whether or not a gesture operation is predicted (step 92).

If a positive result is obtained in step 92, the processor 201 executes the processes from step 12 (see FIG. 14). On the other hand, if a negative result is obtained in step 92, the processor 201 displays the virtual display VD at the initial position and ends the process (step 93). According to the above processing operations, a process for determining whether to cause the virtual display VD to retreat is not executed while a gesture operation is not predicted. Consequently, the processing load is reduced correspondingly, and a longer use time is anticipated.

Figure 59:
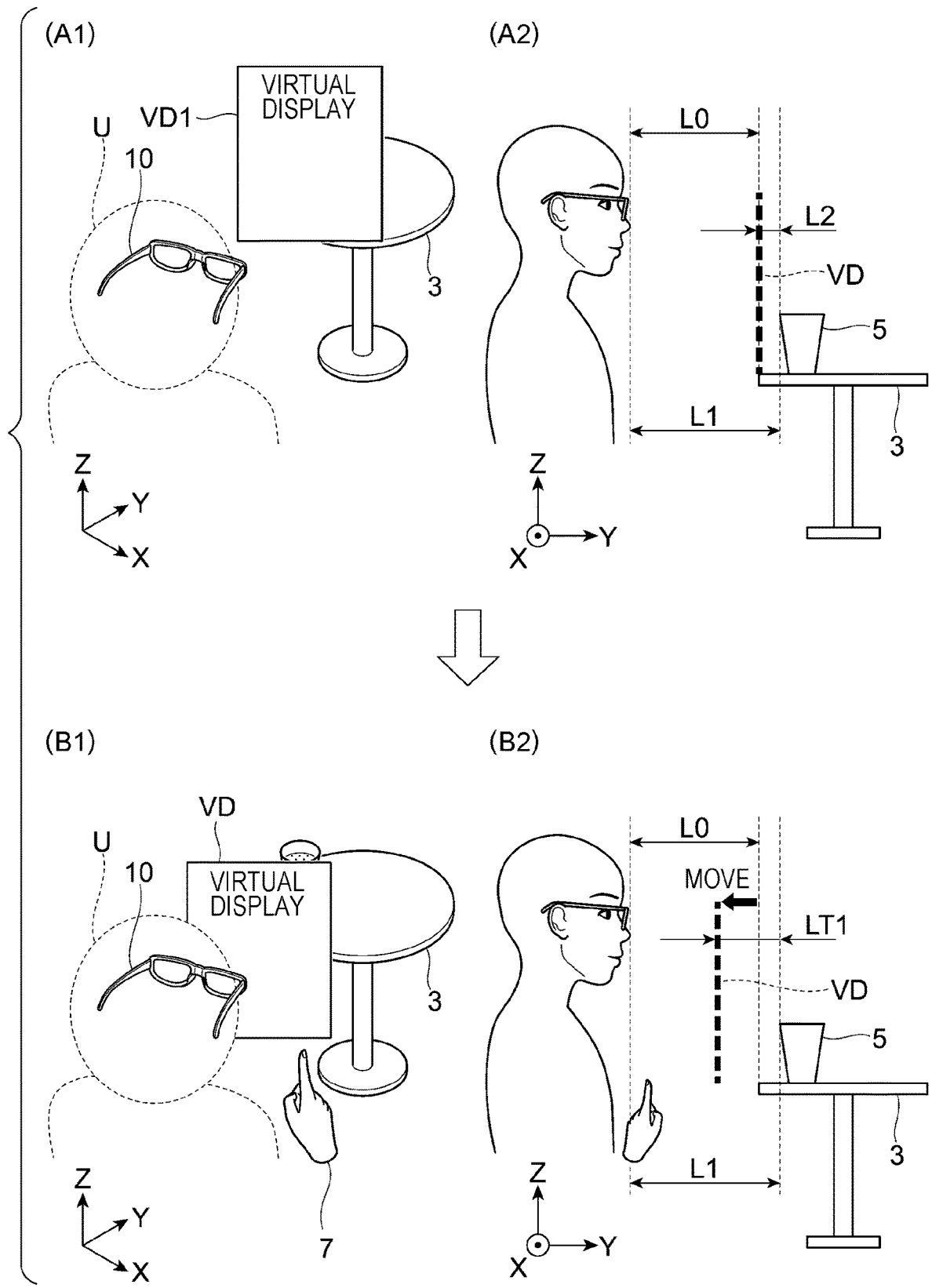
FIG. 59 is a diagram for explaining differences in the retreat process depending on whether a gesture operation is or is not predicted, in which (A1) and (A2) illustrate the positional relationship between the virtual display and the user in the case where a gesture operation is not predicted, and (B1) and (B2) illustrate the positional relationship between the virtual display and the user in the case where a gesture operation is predicted.

FIG. 59 is a diagram for explaining differences in the retreat process depending on whether a gesture operation is or is not predicted, in which (A1) and (A2) illustrate the positional relationship between the virtual display VD and the user U in the case where a gesture operation is not predicted, and (B1) and (B2) illustrate the positional relationship between the virtual display VD and the user U in the case where a gesture operation is predicted. In (A1) and (A2) of FIG. 59, a gesture operation is not predicted, and therefore a retreat of the virtual display VD is not executed even in the case where the distance L2 between the virtual display VD and the drink 5 is less than the first distance LT1.

On the other hand, in (B1) and (B2) of FIG. 59, a gesture operation is predicted, and therefore the virtual display VD is made to retreat on the basis of the relationship between the distance L2 between the virtual display VD and the drink 5 and the first distance LT1 or the like. Note that in the present exemplary embodiment, the electrodes 14L1, 14L2, and 14R1 are used to measure a brain wave, but properties such as myoelectric potential, heartbeat, cardioelectric potential, pulse, or pulse wave may also be measured. In other words, properties such as myoelectric potential, heartbeat, cardioelectric potential, pulse, or pulse wave may also be measured at the head. Properties such as myoelectric potential, including a brain wave, are an example of physiological data.

Exemplary Embodiment 15

Figure 60A:
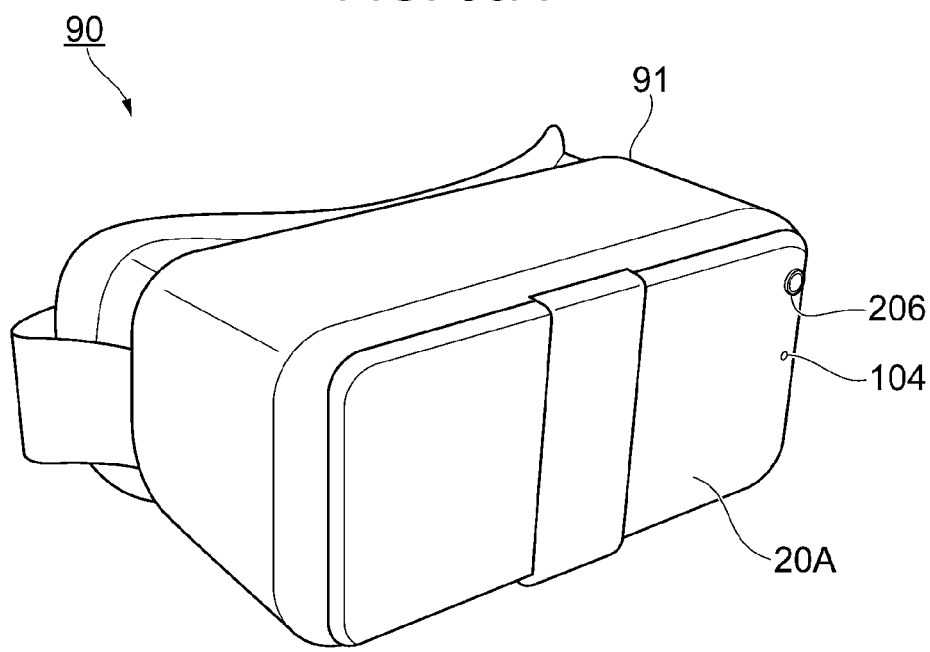
Figure 60B:
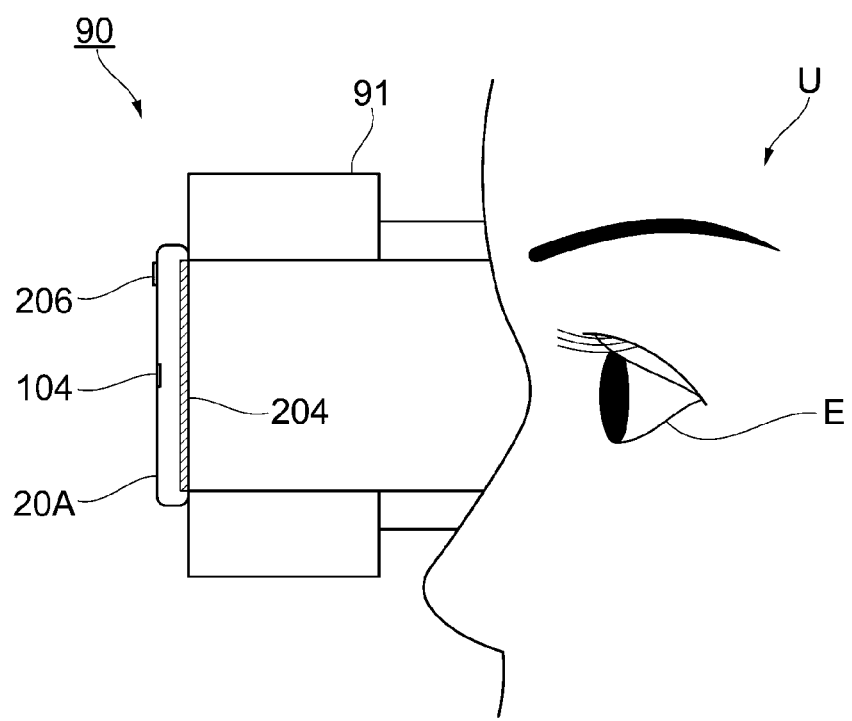

Exemplary Embodiments 1 to 14 describe cases anticipating a device such as a glasses-style xR device 10 (see FIG. 1) that allows a real space to be observed by seeing through the device, but the present exemplary embodiment describes a non-see-through xR device. FIGS. 60A and 60B are diagrams for explaining a usage example of an information processing system 90 anticipated by Exemplary Embodiment 15, in which FIG. 60A illustrates an example of the appearance of the information system 90 and FIG. 60B is a diagram for explaining a worn state. In FIGS. 60A and 60B, portions that correspond to FIGS. 3, 4, and 5 are denoted with the same signs. The information processing system 90 described with reference to FIGS. 60A and 60B uses an information terminal 20A such as a smartphone attached to a head-mounted display 91. In the case of the present exemplary embodiment, an image of the area in front of the user U captured by a camera 206 is combined with the virtual display VD and displayed on a display 204.

In addition to the camera 206, a positioning sensor 104 is attached to the information terminal 20A illustrated in FIGS. 60A and 60B. The positioning sensor 104 is the same as the positioning sensor 104 used in the xR device 10 (see FIG. 1). The distance to a real object RO positioned near the user U is measured by the positioning sensor 104. In other words, the information terminal 20A according to the present exemplary embodiment is a device combining the hardware and functions of the xR device 10 and the information terminal 20 according to Exemplary Embodiment 1. The information terminal 20A here is an example of an information processing system and also an example of an information processing apparatus.

Exemplary Embodiment 16

Figure 61A:
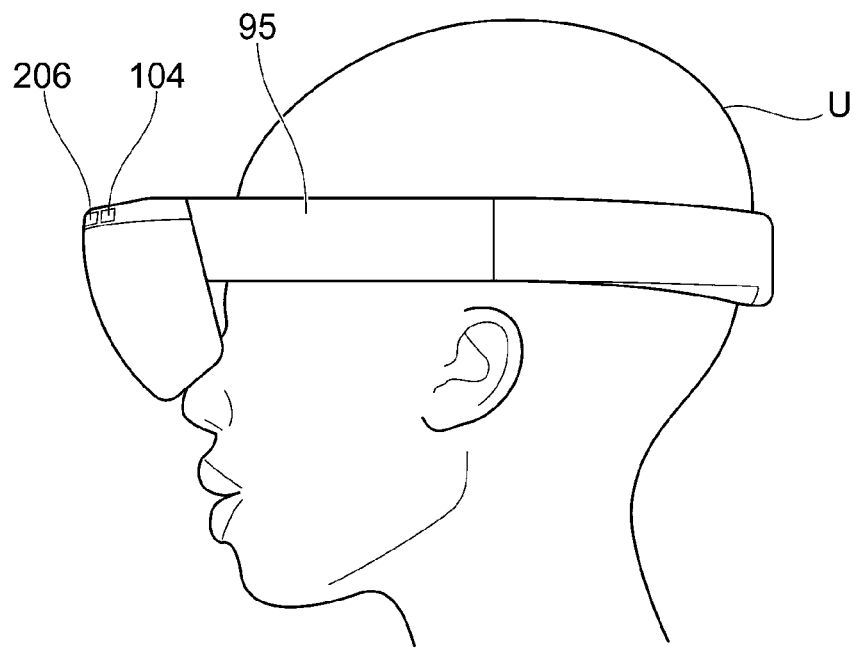
Figure 61B:
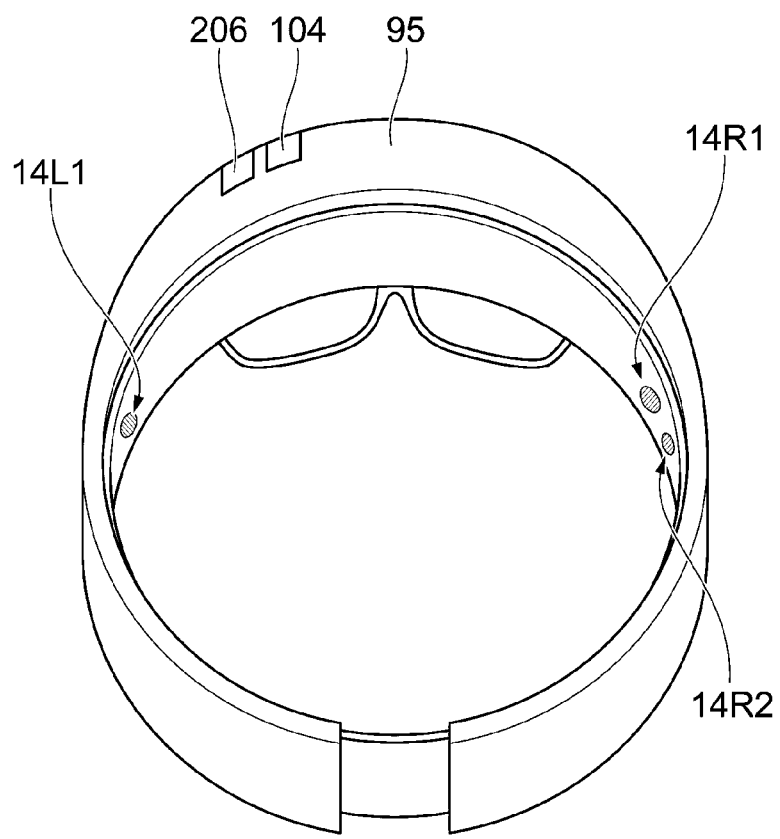

The present exemplary embodiment describes another exemplary configuration of a head-mounted device. FIGS. 61A and 61B are diagrams for explaining a usage example of a headset 95 anticipated by Exemplary Embodiment 16. In FIGS. 61A and 61B, portions that correspond to FIGS. 3, 4, and 5 are denoted with the same signs. FIG. 61A illustrates an example of wearing the headset 95 and FIG. 61B illustrates an example of the arrangement of electrodes 14L1, 14R1, and 14R2 disposed on the inner side of the headset 95 for measuring an electrical signal corresponding to a brain wave. The headset 95 illustrated in FIGS. 61A and 61B is also one form of a see-through xR device.

The headset 95 illustrated in FIGS. 61A and 61B imagines a configuration in which electrodes 14L1, 14R1, and 14R2 are attached to a HoloLens (registered trademark) by Microsoft Corporation (registered trademark), for example. The electrodes 14L1, 14R1, and 14R2 are attached at places that contact the ears on a ring-shaped member worn on the head of the user U. Note that a positioning sensor 104 and a camera 206 are provided on the front part of the headset 95. The headset 95 here is an example of an information processing system and also an example of an information processing apparatus.

Other Exemplary Embodiments (1) The foregoing describes exemplary embodiments of the present disclosure, but the technical scope of the present disclosure is not limited to the scope described in the foregoing exemplary embodiments. It is clear from the claims that a variety of modifications or alterations to the foregoing exemplary embodiments are also included in the technical scope of the present disclosure.

(2) For example, the foregoing exemplary embodiments illustrate examples of a glasses-style device and a headset device worn on the head as specific examples of the xR device 10, but the xR device 10 may also be a contact lens-style device. In the case of a contact lens-style device, the positioning sensor 104 is worn by the user U as a necklace or the like. Note that a contact lens-style device is an example of an information processing system.

(3) In Exemplary Embodiment 1 above, the information terminal 20 that links with the xR device 10 executes the function of causing the virtual display VD to retreat a predetermined distance away from a real object RO, but the same function may also be achieved by the xR device 10 alone or as a service provided by a server on a network. The server and the xR device 10 in this case are an example of an information processing system.

(4) In the exemplary embodiments above, the term "processor" refers to hardware in a broad sense. Examples of the processor include general processors (e.g., CPU), dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
    a device configured to cause a user to see visual information in which a virtual object is superimposed onto information about a real space;
    an acquirer configured to acquire a position of a real object in the real space; and
    a processor configured to:
        move the virtual object in a direction away from the real object, so that the virtual object is not superimposed onto the real object, in response to determining that the real object is positioned inside a predetermined range from the device.

2. The information processing system according to claim 1, wherein:
    the predetermined range prescribes a region used by the user to perform a gesture operation on the virtual object.

3. The information processing system according to claim 2, wherein:
    the predetermined range is set using registration information about the user who uses the device.

4. The information processing system according to claim 3, wherein:
    the registration information specifies a body part used to perform the gesture operation.

5. The information processing system according to claim 2, wherein:
    the processor is configured to set the predetermined range through a measurement of a gesture operation related to a registration of a range of motion of the gesture operation.

6. The information processing system according to claim 5, wherein:
    the processor is configured to correct the predetermined range according to a result of a measurement performed by the acquirer.

7. The information processing system according to claim 5, wherein:
    the processor is configured to correct the predetermined range according to a body part frequently used to perform the gesture operation.

8. The information processing system according to claim 5, wherein:
    the processor is configured to expand the predetermined range in correspondence with a gaze direction of the user.

9. The information processing system according to claim 5, wherein:
    the processor is configured to, in response to an icon being the virtual object, expand the predetermined range in a direction of the icon.

10. The information processing system according to claim 1, wherein:
    the processor is configured to move the virtual object to a position where a gesture operation is performable by the user.

11. The information processing system according to claim 10, wherein:
    the processor is configured to, in response to the virtual object being displayed in front of the real object from a perspective of the user, move the virtual object closer to the device.

12. The information processing system according to claim 11, wherein:
    the processor is configured to move the virtual object such that the moved virtual object is a predetermined first distance away from the real object.

13. The information processing system according to claim 12, wherein:
    the processor is configured to, in response to a distance between the moved virtual object and the device being less than a predetermined second distance, prohibit the virtual object from coming closer to the device than the second distance.

14. The information processing system according to claim 10, wherein:
    the processor is configured to, in response to the real object being inside the predetermined range for a predetermined time or longer, move the virtual object in a direction away from the real object.

15. The information processing system according to claim 10, wherein:
    the processor is configured to, in response to, the virtual object satisfying a predetermined condition, not move the virtual object in a direction away from the real object.

16. The information processing system according to claim 15, further comprising:
    a sensor configured to detect physiological data about the user, wherein:

the processor is configured to, in response to an operation on the virtual object not being predicted through a detection signal from the sensor, not move the virtual object even if the real object is positioned inside the predetermined range.

17. The information processing system according to claim 15, wherein:
the processor is configured to, in response to the virtual object not including an icon treated as a target of an operation, not move the virtual object in a direction away from the real object.

18. The information processing system according to claim 10, wherein:
the processor is configured to, in response to a plurality of virtual objects displayed in front of the real object from a perspective of the user being positioned inside the predetermined range, move the plurality of virtual objects together.

19. The information processing system according to claim 10, wherein:
the processor is configured to, in response to a plurality of virtual objects being positioned inside the predetermined range, move only the virtual object displayed farthest in front of the real object from a perspective of the user.

20. The information processing system according to claim 10, wherein:
the processor is configured to, in response to a subset of a plurality of virtual objects being displayed in front of the real object from a perspective of the user and a remainder of the plurality of virtual objects being displayed separately behind the real object, if an operation on a virtual object positioned behind the real object being detected, move a display position of the virtual object designated as a target of the operation to the front of the real object from the perspective of the user.

21. The information processing system according to claim 10, wherein:
the processor is configured to, in response to an instruction to display a virtual object different from the virtual object being displayed, display the different virtual object farthest in front of the real object from a perspective of the user.

22. The information processing system according to claim 1, wherein:
the processor is configured to, in response to a plurality of real objects being inside the predetermined range, move the virtual object such that the moved virtual object is a predetermined first distance away from one of the plurality of real objects.

23. The information processing system according to claim 1, wherein:
the processor is configured to, in response to the real object being a movable object, control a movement of the virtual object using a prediction regarding a motion of the movable object.

24. The information processing system according to claim 23, wherein:
the processor is configured to, in response to the movable object is being a nearby person, predict a movement destination of the person using a detection of motion of the person.

25. The information processing system according to claim 23, wherein:
the processor is configured to, in response to a plurality of users seeing the virtual object associated with a same position inside the real space, not move the virtual object even if the existence of another user seeing the virtual object is detected inside the predetermined range.

26. The information processing system according to claim 23, wherein:
the processor is configured to in response to information related to a movement of the movable object being acquired, predict a movement destination of the movable object.

27. The information processing system according to claim 1, wherein:
the processor is configured to issue an advance notification in response to a real object with a possibility of collision being detected inside the predetermined range.

28. The information processing system according to claim 27, wherein:
the processor is configured to display an image of the real object as the virtual object.

29. The information processing system according to claim 27, wherein:
the processor is configured to issue a notification regarding an existence of the real object by deforming a shape of the virtual object.

30. The information processing system according to claim 1, wherein:
the processor is configured to separate and move, from the virtual object, a portion treated as a target of an operation.

31. The information processing system according to claim 1, wherein:
the processor is configured to move the virtual object inside a range visible to the user.

32. The information processing system according to claim 1, wherein:
the processor is configured to, in response to the virtual object being a solid shape, change a direction of the virtual object according to a gesture operation by the user.

33. The information processing system according to claim 1, wherein:
the processor is configured to, in response to a dimension of the virtual object exceeding a predetermined reference, reduce a display scale of the virtual object to within the predetermined reference.

34. The information processing system according to claim 1, wherein:
the processor is configured to, in response to a dimension of the virtual object being smaller than a predetermined reference, enlarge a display scale of the virtual object to the predetermined reference or greater.

35. The information processing system according to claim 1, wherein:
the processor is configured to, in response to a display device that links with the device being positioned inside the predetermined range, move the virtual object to a position beside the display device.

36. The information processing system according to claim 35, wherein:
the processor is configured to, in response to the display device being detected inside a field of view of the user, to link the virtual object to the display device.

37. The information processing system according to claim 1, wherein the real object is an object other than the user.

38. A non-transitory computer readable medium storing a program, which if executed, causes a computer of an information processing apparatus to execute a process, the information processing apparatus including a device configured to cause a user to see visual information in which a virtual object is superimposed onto information about a real space and an acquirer configured to acquire a position of a real object in the real space, the process comprising:

moving the virtual object in a direction away from the real object, so that the virtual object is not superimposed onto the real object, in response to determining that the real object is positioned inside a predetermined range from the device.

39. A non-transitory computer readable medium storing a program, which if executed, causes a computer that links with an information processing apparatus to execute a process, the information processing apparatus including a device configured to cause a user to see visual information in which a virtual object is superimposed onto information about a real space and an acquirer configured to acquire a position of a real object in the real space, the process comprising:

moving the virtual object in a direction away from the real object, so that the virtual object is not superimposed onto the real object, in response to determining that the real object is positioned inside a predetermined range from the device.

40. An information processing system comprising:

a device configured to cause a user to see visual information in which a virtual object is superimposed onto information about a real space;

an acquirer configured to acquire a position of a real object in the real space; and a processor configured to:
move the virtual object in a direction away from the real object in a case where the real object is positioned inside a predetermined range from the device;
move the virtual object to a position where a gesture operation is performable by the user;
in response to the virtual object being displayed in front of the real object from a perspective of the user, move the virtual object closer to the device; and
move the virtual object such that the moved virtual object is a predetermined first distance away from the real object.

41. The information processing system according to claim 40, wherein the processor is configured to, in response to a distance between the moved virtual object and the device being less than a predetermined second distance, prohibit the virtual object from coming closer to the device than the second distance.

* * * * *